(12) United States Patent
Hammerschmidt et al.

(10) Patent No.: US 12,015,916 B2
(45) Date of Patent: Jun. 18, 2024

(54) SIGNALING TECHNIQUES USING FRAGMENTED AND MULTI-PARTITIONED UWB PACKETS

(71) Applicant: Apple Inc., Cupertino, CA (US)

(72) Inventors: Joachim S. Hammerschmidt, Mountain View, CA (US); Santhoshkumar Mani, Santa Clara, CA (US); Eren Sasoglu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 17/453,165

(22) Filed: Nov. 1, 2021

(65) Prior Publication Data

US 2022/0141657 A1 May 5, 2022

Related U.S. Application Data

(60) Provisional application No. 63/229,482, filed on Aug. 4, 2021, provisional application No. 63/108,862, filed on Nov. 2, 2020.

(51) Int. Cl.
*H04W 12/06* (2021.01)
*H01Q 5/25* (2015.01)
(Continued)

(52) U.S. Cl.
CPC ............. *H04W 12/06* (2013.01); *H01Q 5/25* (2015.01); *H04L 25/0212* (2013.01); *H04W 12/0431* (2021.01)

(58) Field of Classification Search
CPC ............. H04W 12/06; H04W 12/0431; H04W 12/0471; H01Q 5/25; H04L 25/0212; H04L 25/0224
See application file for complete search history.

(56) References Cited

U.S. PATENT DOCUMENTS 7,990,310 B2   8/2011   Kwak et al.
10,470,156 B2  11/2019  Seth et al.
(Continued)

OTHER PUBLICATIONS

"Machine Translation of JP Publication No. JP-4779560-B2," filed Oct. 12, 2005 and published in Sep. 28, 2011. 42 pages.
(Continued)

*Primary Examiner* — Jean B Corrielus
(74) *Attorney, Agent, or Firm* — Kilpatrick Townsend & Stockton LLP

(57) ABSTRACT

Techniques are provided for utilizing a hybrid of ultra-wideband (UWB) and narrowband (NB) signaling to provide more efficient operating range and operating efficiency. In one example, a first device may transmit a first packet via an NB signal to a second device, whereby the first packet comprises information indicating to the second device a time period for reception of a second (UWB) packet. In this example, the second packet may comprise a first partition and a second partition, whereby the first partition comprises a first plurality of fragments and the second partition comprising a second plurality of fragments. The respective fragments of each plurality of fragments may be transmitted via a UWB signal. The first device may then transmit the first plurality of fragments, and then subsequently transmit the second plurality of fragments to the second device, the first and second pluralities respectively being associated with different fragment types.

20 Claims, 48 Drawing Sheets

(51) Int. Cl.
*H04L 25/02* (2006.01)
*H04W 12/0431* (2021.01)

(56) References Cited

U.S. PATENT DOCUMENTS

| | | | |
|---|---|---|---|
| 10,637,531 | B2 | 4/2020 | Rasmussen |
| 11,323,294 | B2 * | 5/2022 | Tertinek ............ H04L 25/03292 |
| 2005/0238113 | A1 | 10/2005 | Santhoff et al. |
| 2007/0081505 | A1 | 4/2007 | Roberts |
| 2008/0248768 | A1 * | 10/2008 | Doi .................. H04W 52/0245 |
| | | | 455/127.5 |
| 2020/0220751 | A1 | 7/2020 | Pelissier et al. |
| 2021/0105736 | A1 * | 4/2021 | Tancerel .................. G01S 5/10 |
| 2022/0140971 | A1 | 5/2022 | Hammerschmidt et al. |
| 2022/0141076 | A1 | 5/2022 | Hammerschmidt et al. |

OTHER PUBLICATIONS

Cordaro, Jay et al., Follow-Up to New Preamble Proposal for 10BASE-T1S. IEEE 802 3cg Task Force (version 1.0). Jan. 17, 2018. 13 pages.

Hammerschmidt et al., "Project: IEEE P802.15 Working Group for Wireless Personal Area Networks (WPANs)—Narrowband assisted multi-millisecond USWB" doc.: <15-21-0409-00-04ab>. Jul. 2021. 10 pages.

Luo, Xiliang et al., "Project: IEEE P802.15 Working Group for Wireless Personal Area Networks (WPANs)—Golay Complementary Sequences: Preamble Construction for UWB Ranging beyond" doc.:< 15-21-0409-00-04ab>. May 9, 2022. 13 pages.

\* cited by examiner

| | PRO | CON |
|---|---|---|
| UWB signaling | • large bandwidth allows precise multipath channel sounding and high speed data transmission | • high complexity and corresponding power consumption<br>• low emissions limits per regulatory test interval |
| NB signaling | • low complexity and low power consumption<br>• high resilience against interference<br>• less stringent emissions limits | • not suitable for efficient, high-precision channel sounding |

*FIG. 10*

```
┌─────────────────────────────────────────────────────────────────────┐
│ TRANSMITTING, BY A FIRST DEVICE, A FIRST PACKET VIA A NARROWBAND    │
│ (NB) SIGNAL TO A SECOND DEVICE, THE FIRST PACKET COMPRISING         │
│ INFORMATION INDICATING TO THE SECOND DEVICE A TIME PERIOD FOR       │
│ RECEPTION OF A SECOND PACKET, THE SECOND PACKET COMPRISING A        │
│ FIRST PARTITION AND A SECOND PARTITION, THE FIRST PARTITION         │
│ COMPRISING A FIRST PLURALITY OF FRAGMENTS AND THE SECOND            │
│ PARTITION COMPRISING A SECOND PLURALITY OF FRAGMENTS, AND           │
│ RESPECTIVE FRAGMENTS OF EACH PLURALITY OF FRAGMENTS BEING           │
│ TRANSMITTED VIA AN ULTRA-WIDEBAND (UWB) SIGNAL 4302                 │
└─────────────────────────────────────────────────────────────────────┘
                                  ↓
┌─────────────────────────────────────────────────────────────────────┐
│ TRANSMITTING, BY THE FIRST DEVICE, THE FIRST PLURALITY OF FRAGMENTS │
│ TO THE SECOND DEVICE VIA THE ULTRA-WIDEBAND SIGNAL, THE RESPECTIVE  │
│ FRAGMENTS OF THE FIRST PLURALITY OF FRAGMENTS BEING ASSOCIATED      │
│ WITH A FIRST FRAGMENT TYPE 4304                                     │
└─────────────────────────────────────────────────────────────────────┘
                                  ↓
┌─────────────────────────────────────────────────────────────────────┐
│ TRANSMITTING, BY THE FIRST DEVICE, THE SECOND PLURALITY OF FRAGMENTS│
│ TO THE SECOND DEVICE VIA THE ULTRA-WIDEBAND SIGNAL, THE RESPECTIVE  │
│ FRAGMENTS OF THE SECOND PLURALITY OF FRAGMENTS BEING ASSOCIATED     │
│ WITH A SECOND FRAGMENT TYPE 4306                                    │
└─────────────────────────────────────────────────────────────────────┘
```

*FIG. 43*

SIGNALING TECHNIQUES USING FRAGMENTED AND MULTI-PARTITIONED UWB PACKETS

CROSS-REFERENCES TO RELATED APPLICATIONS

This application claims priority under 35 U.S.C. § 119(e) to U.S. Provisional Application No. 63/108,862, filed on Nov. 2, 2020, entitled "TECHNIQUES FOR HYBRIDIZED ULTRA-WIDEBAND AND NARROWBAND SIGNALING" and U.S. provisional application No. 63/229,482, filed Aug. 4, 2021, entitled "SIGNALING TECHNIQUES USING FRAGMENTED AND MULTI-PARTITIONED UWB PACKETS," the contents of which are herein incorporated by reference. This application is also related to U.S. patent application Ser. No. 17/453,164, filed Nov. 1, 2021 entitled, "SEQUENCES FOR ULTRA-WIDEBAND RANGING," (which claims priority to U.S. Provisional Application No. 63/233,109, filed Aug. 13, 2021 entitled, "SEQUENCES FOR ULTRA-WIDEBAND RANGING") and U.S. patent application Ser. No. 17/453,163, filed Nov. 1, 2021, entitled, "ANNOUNCING UWB/NBA-UWB-MMS RANGING ROUNDS VIA NARROWBAND BASED ADVERTISEMENTS," (which claims priority to U.S. Provisional Application No. 63/233,598, filed Aug. 16, 2021 entitled, "ANNOUNCING UWB/NBA-UWB-MMS RANGING ROUNDS VIA NARROWBAND BASED ADVERTISEMENTS") the contents of all of which are herein incorporated by reference.

BACKGROUND

Wireless devices can employ short-range wireless applications for many different tasks. For example, a wireless device (e.g., a key fob) may be configured such that when the device comes within a certain proximity of a vehicle (e.g., a car), the doors of the vehicle are automatically unlocked. It many cases, regulatory rules and/or other technical limitations may constrain the usage of a particular type of wireless signaling. These regulatory rules and/or technical limitations may vary between different types of wireless signaling. For example, regulatory rules governing ultra-wideband (UWB) signaling may vary from rules governing narrowband (NB) signaling, at least in part because they may utilize different spectral bands. In some cases, these regulatory rules and/or technical limitations make it difficult for systems to achieve a desired operating range and/or a desired operating efficiency.

BRIEF DESCRIPTION OF THE DRAWINGS

FIG. 10 is another simplified diagram illustrating potential advantages and disadvantages of at least some wireless systems that utilize UWB signaling and/or NB signaling, according to some embodiments.

FIG. 43 is a simplified flow diagram illustrating use of fragmented UWB signaling that involves a plurality of partitions of a UWB packet, according to some embodiments.

DETAILED DESCRIPTION

Figure 1:
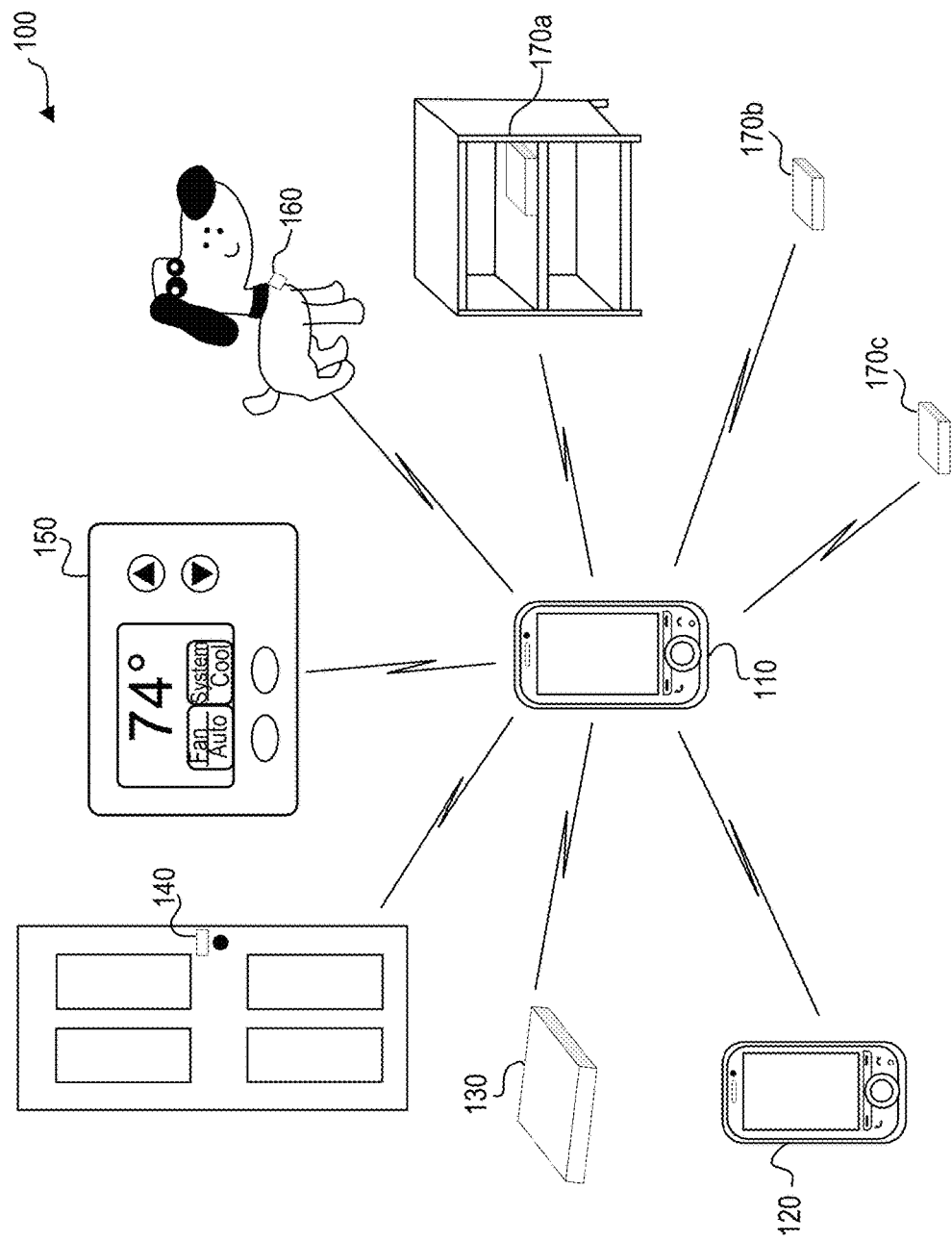
FIG. 1 is a simplified block diagram of example UWB-equipped devices, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure may provide techniques for utilizing a hybrid of ultra-wideband (UWB) and narrowband (NB) signaling to provide improved operating range and/or operating efficiency when performing wireless communication between devices. For example, techniques disclosed herein may enable a first device to efficiently determine a position (location) of a second device relative to the first device and/or efficiently determine a distance estimation (e.g., a range estimate) between the two devices. To illustrate, consider an example in which two devices, a first device and a second device, are capable of wireless communication. In this example, the hybrid signaling may be performed according to a ranging protocol, involving bi-directional NB and UWB signaling between the first device and the second device. The two devices may first perform an initial phase, during which there may be an initial device discovery and an initial (e.g., "coarse") synchronization between the two devices. In some examples, this initial phase may be performed by a wireless system of each device, for example, that is equipped to transmit wireless signals using Bluetooth Low Energy (BLE). During this initial phase, the wireless system of the first device may schedule a start time (e.g., a discrete time instant) for transmission of at least one packet (e.g., an "NB poll" packet) to the second device via an NB signal. The first device may also schedule a window (e.g., a time interval) for subsequent reception of a second packet (e.g., an "NB response" packet transmitted via another NB signal) by the first device from the second device.

Following this initial phase, the first device may then transmit the scheduled NB poll packet to the second device at the scheduled start time via the NB signal, whereby the packet may convey (e.g., indicate) one or more types of synchronization data to be used for a second (e.g., "fine") synchronization between the two devices. For example, the packet may include a synchronization ("sync") field and a data payload field. The data payload field may include scheduling data (e.g., which also may be known as "scheduling information"). The second device may extract a type of synchronization data from the sync field that corresponds to time and frequency synchronization information (e.g., T/F sync information) by using state-of-the-art synchronization and/or signal acquisition techniques. The second device may also extract another type of synchronization data from the data payload field that corresponds to scheduling data by using state-of-the-art demodulation and decoding techniques. The synchronization data may be used by the second device to schedule and assist in the reception of a plurality of data fragments to be subsequently transmitted by the first device to the second device via UWB signals in short bursts and distributed over multiple intervals. In this example, the scheduling data of the NB poll may also include scheduling information regarding the NB response packet transmission start time, enabling the second device to schedule transmission of the NB response packet to the first device at the NB response start time. The second device may subsequently transmit the NB response packet at the desired start time, whereby the NB response packet conveys second synchronization data, similar to as described above with respect to the synchronization data from the first device to the second device. This second synchronization data may be used by the first device to schedule and assist in the reception of a second plurality of fragments that may be subsequently transmitted by the second device to the first device via UWB signals distributed over multiple intervals. In this way, NB-signaling layers of each device may assist the respective UWB-signaling layers in synchronization and other functions. Note that the assistance in the reception of the UWB signals derived from the synchronization data conveyed via the NB signals may comprise configuration of the UWB receptions in terms of carrier frequency and sample frequency offsets relative to the respective associated (second or first) device.

The first device may then schedule and transmit the plurality of UWB fragments to the second device for reception at the second device according to the synchronization data that was previously obtained by the second device from the first device. In this example, the plurality of UWB data fragments may collectively represent a Channel Impulse Response Training Sequence (CIRTS) of a UWB-formatted packet. Upon receipt of the CIRTS from the first device (e.g., via aggregating the fragments), the second device may use the CIRTS to estimate a Channel Impulse Response (CIR) and/or determine other synchronization information (e.g., time and frequency information, scheduling data, etc.). After a turnaround time interval, which, in this example, may be a fixed time interval that is known by the first device, the second device may then, correspondingly, schedule and transmit the second plurality of UWB fragments to the first device for reception at the first device according to the second synchronization data that was previously obtained by the first device from the NB transmission of the second device. The first device may then, similarly compute a CIR estimate and/or obtain other synchronization information. Then, utilizing computed CIR information, and, taking into account (e.g., subtracting) the turnaround time, the first device may determine a time-of-flight (TOF) that is associated with a Line-of-Sight (LOS) path between the two devices. Accordingly, the first device may then be able to determine a range and/or position of the first device with respect to the second device. In this way, by utilizing a hybrid of NB and UWB signaling, embodiments improve upon operating range and/or efficiency when performing ranging and/or positioning via UWB signaling.

To further illustrate, consider a scenario in which a first device (e.g., an "initiator" device) and a second device (e.g., a "responder" device), respectively, include a hybrid wireless system (e.g., a hybrid wireless transceiver). Using the first device as a representative example device, the hybrid wireless system of the first device may include an ultra-wideband sub-system and a narrowband sub-system. Each subsystem may include wireless transmission and reception circuitry and functionality for NB and UWB signaling. Additionally, these two sub-systems may be tightly coupled together. For example, the hybrid wireless transceiver may include a shared time base unit, for example, including a Crystal Oscillator (XO) and/or a clocking and time-keeping apparatus. The shared time base unit may ensure that the NB and UWB subsystems generate signals that are tightly synchronized in time and frequency. The subsystems for a given device may also share Medium Access Control (MAC) functionality. The MAC functionality may utilize a common time base (e.g., based on the shared time base unit) to coordinate between the sub-systems on a given device. Additionally, radio and physical layer (PHY) functionality may also operate based on the common time base between the sub-systems.

Additionally, the hybrid wireless transceiver may include a hybrid system controller. The hybrid system controller may coordinate transmission and reception activities of both the NB and UWB sub-systems, as well as information exchange between the NB and UWB sub-systems. For example, the hybrid system controller may receive time and frequency synchronization information from the NB sub-system. In some embodiments, the hybrid system controller may also receive payload data information from the NB sub-system. The hybrid system controller may also schedule data transmission and reception conducted by the NB sub-system. The hybrid system controller may also provide time and frequency configuration information to the UWB sub-system. This may enable the UWB sub-system receiver to be more precisely configured (e.g., synchronized), based on the time and frequency information extracted from the NB signaling. Since the time base unit is shared between the NB and UWB sub-systems, including any frequency offsets relative to an associated device, this configuration information helps tailor the UWB reception for incoming UWB signals (e.g., corresponding to CIRTS fragments) and thereby improve the receiver efficiency as well as performance for the CIR estimation. The hybrid system controller may also use data received from NB signals to schedule UWB transmission or reception activities, based on certain transmission/reception parameters (e.g., carrier frequency, UWB bandwidth, etc.). In turn, the hybrid system controller may also receive UWB reception information including synchronization data (e.g., time and frequency configuration information) and CIR information. Although embodiments described herein may refer to individual components of the hybrid wireless transceiver as performing particular operations, embodiments should not be construed to be so limited. For example, the hybrid system controller may reside within one of the subsystems (e.g., NB or UWB) described herein. Any suitable division of operations between one or more software and/or hardware components may be suitable to perform embodiments described herein.

Continuing with the illustration introduced above, consider a scenario in which the first device and the second device conduct a bi-directional exchange of data (e.g., CIRTS fragments) between the two devices. As described herein, the two devices may perform a "coarse" initial synchronization. In one example, whereby the first device operates as an "initiator" device and the second device operates as a "responder" device, the first device may schedule a start time (e.g., a discrete time) to transmit a packet to the second device via an NB signal that conveys synchronization data (e.g., including time and frequency synchronization information). The second device may also correspondingly schedule a window to receive the packet via the NB signal from the first device. It should be understood that, in some embodiments, a time may be associated with a particular start time (e.g., a discrete time instant). In some embodiments, a time may be associated with a time interval (e.g., a window and/or time slot), depending on the context. In some embodiments, data exchanged during the initial phase information may enable the two devices to be aligned (e.g., clock-synchronized) to be within approximately a desired time delta (e.g., a 1 millisecond (ms) delta) between clock apparatuses of the two devices (e.g., managed by the respective shared time base units). In some embodiments, the initial phase may also be used to perform initial device discovery and other connection setup operations. In some embodiments, this initial phase may be performed on each device by a separate wireless system from the hybrid wireless transceiver. For example, the separate wireless system may utilize a Bluetooth Low Energy (BLE) protocol and/or reside on a separate System on Chip (SOC) device from the hybrid wireless transceiver. In some embodiments, the initial phase including such operations as service advertisement/discovery, connection setup, or coarse synchronization may be performed by the same system that performs operations of the hybrid wireless transceiver described herein, notably by the NB sub-system in some embodiments.

Upon completion of the initial phase, the first (initiator) device may transmit the packet via the NB signal to the second device at the scheduled start time. As described herein, the NB packet may include data that conveys synchronization data to the second device. For example, the packet may include data such as Preamble, a Start-of-Frame Delimiter and/or other Synchronization fields. In some embodiments, this packet data may be used by the second device to extract synchronization data (e.g., from a sync field of the packet), for example, corresponding to time and/or frequency synchronization information. In some embodiments, this packet data may be used to extract other synchronization data (e.g., from payload data of the packet), for example, corresponding to scheduling information. In one example, example, frequency synchronization information may correspond to a relative carrier frequency (which also may be known as "F sync" information), which can be used to synchronize Crystal Oscillator (XO) offsets of both devices, described further herein. In some examples, the F sync information may be used to configure a UWB receiver of one device to optimize its frequency correction circuits in preparation for receiving a UWB signal from the other device. In some examples, the time synchronization information (which also may be known as "T sync" information) may be used by a device to "anchor" a subsequent UWB exchange in accordance with a timekeeping apparatus of the device, described further herein. In some embodiments, the time and/or frequency information may be extracted based at least in part on detecting a pattern (e.g., an expected signal pattern associated with the synchronization header of the packet). As described herein, in some embodiments, the synchronization data may also correspond to scheduling information that is extracted from the packet payload data. The scheduling information may be used, in one example, to schedule reception by a device (e.g., the second device) of a subsequent UWB packet (e.g., and/or fragment) transmission from another device (e.g., the first device). It should be understood that, the packet payload data may also include other types of information (e.g., non-synchronization data, such as status information, control information, etc.).

It should be understood that different types of synchronization data may be included in transmissions between devices, depending on the context. In one non-limiting example, the first device (e.g., operating as an initiator device) may transmit data that conveys (e.g., indicates and/or enables extraction of) both time and frequency synchronization information as well as scheduling information. In this example, the second device may subsequently transmit data to the first device that conveys only time and/or frequency information. In another example, the data transmitted to the first device may also include scheduling information. In yet another example, data included within an NB packet may convey not only scheduling information to another device (e.g., the second (responder) device) for scheduling an NB response packet, but also may convey scheduling information for scheduling a subsequent UWB response transmission by the second device.

Continuing with the illustration above, the second device may then obtain and evaluate synchronization data from the packet. The synchronization data may be used by the second device to schedule a subsequent reception of a plurality of fragments received from the first device via respective UWB signals. As described herein, the packet may also contain scheduling data that the second device uses to schedule a second start time for transmission of a second packet to the first device via a second NB signal. Correspondingly, the first device may also schedule a time (e.g., and/or a time window) for reception of the second packet that is subsequently transmitted from the second device to the first device at the second start time. The second device may then transmit the second packet via the second NB signal to the first device at the second start time. Upon receiving the second packet during the scheduled window, the first device may obtain (e.g., extract) second synchronization data from the second packet. The first device may then utilize the second synchronization data extracted from the second packet to schedule and assist reception of a second plurality of fragments to be received from the second device.

Turning to the transmission and reception of UWB fragments by each device, the first device may schedule transmission of the plurality of fragments to the second device. The scheduling of transmission of the plurality of fragments may be in accordance with synchronization data that was conveyed to the second device by the first device via the NB signal. The first device may then transmit the plurality of fragments to the second device. As described further herein, each fragment of the plurality of fragments may be time-spaced from other fragments of the plurality of fragments by at least a predefined time interval (e.g., 1 ms). In one example, the plurality of fragments may collectively correspond to (e.g., represent) a CIRTS that is operable for computing a CIR estimate associated with wireless propagation paths between the first device and the second device. It should be understood that, because the CIRTS may be separated into multiple fragments (e.g., instead of being transmitted within a single fragment as part of a continuous UWB signal transmission), the overall amount of energy that may be emitted by the first device for the fragmented UWB transmission may be higher than that of a single UWB transmission when conforming to certain regional regulatory constraints that govern energy emissions for a given region. Also, the operating range for the overall UWB transmission may be greater than would otherwise be possible if the CIRTS were transmitted as a single data fragment or single UWB packet. This may be due in part to enabling a device to aggregate energy from multiple fragments. In some embodiments, as described further herein, the plurality of fragments may correspond to a particular type of sequence of fragments (e.g., Pseudo-Random Sequences (STS), Periodic Sequences, Golay Sequences). Also note that limiting the UWB to a single fragment (as opposed to a plurality of fragments) representing a CIRTS is already beneficial, as in a conventional UWB transmission the available emissions energy needs to be shared between the SHR (Sync Header) and the CIRTS, while in the hybrid system the functionality of the SHR is at least partly delegated to the NB system and thereby offloading the UWB system from various synchronization tasks.

Upon the plurality of fragments being transmitted by the first device via UWB signals, the second device may receive each fragment, and then subsequently obtain aggregated information from the plurality of fragments. For example, the second device may compute an estimated CIR based on the CIRTS that is represented within the plurality of fragments. In some embodiments, the second device may also obtain other data (e.g., synchronization data, scheduling data, etc.) from the plurality of fragments. Similar to the first device, the second device may then schedule transmission of the second plurality of fragments. The second plurality of fragments (e.g., UWB fragments) may be scheduled for transmission in accordance with the second synchronization data that was previously obtained by the first device from the second device (e.g., extracted based on sync header information of the second packet transmitted by the second device to the first device via the second NB signal). In some embodiments, the scheduling may also (and/or alternatively) be based on synchronization data obtained from one or more of the plurality of fragments received from the first device. The second device may then transmit the second plurality of fragments to the first device, similar to as described above with respect to the plurality of fragments transmitted from the first device to the second device. Upon receiving the second plurality of fragments, the first device may compute an estimated CIR based on the CIRTS that is represented by the second plurality of fragments. In some embodiments, the first device may also obtain synchronization data or other suitable data from the second plurality of fragments.

Upon the first device computing the estimated CTR based on the second plurality of fragments, the first device may further be able to compute a time-of-flight interval based in part on the CIR estimate. For example, the first device may determine a round-trip time interval that corresponds to a time delta between a first time that the plurality of fragments (e.g., a first fragment of the plurality of fragments) was transmitted to the second device, and a second time that the second plurality of fragments (e.g., a last fragment of the second plurality of fragments) was received by the first device from the second device. The first device may further determine a turnaround time interval that corresponds to a second time delta between a third time that the plurality of fragments was received by the second device from the first device, and a fourth time that the second plurality of fragments was transmitted by the second device to the first device. The first device may then subtract the turnaround time interval at the second device from the round-trip time interval to help in determining the time-of-flight (TOF). In some embodiments, the TOF may represent the distance (e.g., traveled by respective signals going through a direct line-of-sight (LOS) path between the two devices) divided by the speed of light, which can be exploited to estimate the distance from the TOF. In some embodiments, the turnaround time interval may be a fixed time interval that is known (e.g., in advance) by the first device (and/or the second device). In some embodiments, the second device may subsequently communicate relevant information (e.g., timestamp information via another NB signal) to the first device which may be used to determine the turnaround time at the second device and, based on that, the TOF. Based on the determining the TOF between the two devices, the first device may determine range and or relative positioning information between the two devices. In some embodiments, only the first device may determine to compute range/positioning information. In some embodiments, both the first device and the second device may determine to compute range/positioning information. For example, the second device may similarly receive information from the first device via an NB signal that enables it to compute or utilize a turnaround time interval at the first device, and subsequently compute a TOF/range information between the two devices. In some embodiments, the second device may also obtain the TOF result computed by the first device as a payload data NB transmission if and when the second device requires knowledge of the TOF.

In some embodiments, an exchange of one or more signals (e.g., NB signals and/or UWB signals) may be in accordance with one or more protocols. The use of a particular protocol may depend, for example, on the context and/or intended use for performing the signal exchange. For example, one protocol may correspond to a bi-directional exchange of NB signals (e.g., packets) and may include utilizing a redundant and/or duplicate NB packet exchange with a pseudo-random channel hopping sequence. This may improve reliability against interference and/or multi-path fading phenomena when performing an NB signaling to assist with coordinating the UWB signaling. In some embodiments of this protocol, the NB control information, which may correspond to what channels and/or how many hopping channels are used, may be pre-defined or exchanged via an out-of-band system (e.g., Bluetooth, BLE, or the like) during connection set-up (e.g., during the initial phase, as described herein). In another example of a protocol, a uni-directional NB exchange including redundant transmissions with channel hopping may be used. This may be useful, for example, in conjunction with utilizing a beaconing protocol to perform a uni-directional exchange of UWB fragments (e.g., transmitting a plurality of fragments from a first device to a second device, but not vice versa). For example, in one beaconing protocol, the second (receiver) device may be one of several devices (e.g., anchor devices) that interact with the first (initiator) device according to the beaconing protocol. In one example, the second device may subsequently perform ranging and/or positioning based on triangulation with one or more of the other devices, based in part on the estimated CIR.

In some embodiments, as described herein, a protocol may be utilized whereby a first device (e.g., initiator device) may determine a time-of-flight interval and/or range based on a fixed turnaround time interval that is known by the initiator device. In some embodiments, the turnaround time interval (e.g., including timestamp and/or status information) may be transmitted by the second device (e.g., the responder device) to the initiator device via an NB signal after the first device receives a plurality of fragments from the responder device.

In some embodiments, a protocol may be utilized where a uni-directional NB exchange is immediately followed by UWB fragments in the same direction. This may allow multiple responders to be involved in a ranging exercise, by letting them respond in a known sequence or a random order. In yet another protocol example, an interleaved ranging protocol may be utilized, whereby an initiator device and a responder device may utilize a same predetermined time interval to transmit individual fragments. In this example, instead of having the initiator device transmit to the responder device a plurality of fragments, followed by the responder device transmitting a second plurality of packets to the initiator device, the fragments within respective pluralities may be interleaved. This may reduce an overall time for performing ranging between the two devices.

In some embodiments, a UWB signaling protocol may be utilized whereby a UWB packet may be partitioned to include at least a first partition and a second partition. In some embodiments, each partition may be associated with different types of UWB fragments (e.g., a CIRTS, a Pseudo-Random Training Sequence (PRTS), a Data Payload, etc.). By enabling a UWB packet to be partitioned to send different types of fragments, additional use cases may be enabled (e.g., in addition to performing ranging between two devices). In one example, a first device transmits a first packet via an NB signal to a second device, whereby the first packet comprises data indicating to the second device a time period for reception of a second packet (e.g., a UWB packet). In this example, the second packet may be formatted to include a first partition and a second partition, the first partition including a first plurality of fragments (e.g., CIRTS type fragments), and the second partition including a second plurality of fragments (e.g., PRTS type fragments). The first device may then transmit the first plurality of fragments of the second packet, respectively, via a UWB signal. The first device may then transmit the second plurality of fragments of the second packet, respectively, via a UWB signal. In this example, the second device may be enabled to not only compute a CIR estimation and perform a propagation path extraction (e.g., based on the first plurality of fragments), but also may be able to authenticate the first propagation path extraction based in part on the second plurality of fragments (e.g., since the particular PRTS sequence may be shared only between the first device and the second device). In some embodiments, other use cases may also be enabled, for example, including audio and/or data payloads within a UWB packet (e.g., in addition to a plurality of CIRTS fragments also included within the packet).

The embodiments of the present disclosure provide several technical advantages over existing techniques. In one example, embodiments of the present disclosure enable a hybrid wireless system to perform hybridized signaling that includes tightly coordinated UWB signaling and NB signaling. For example, as described herein, an NB sub-system (e.g., an NB signaling layer) of the hybrid wireless system may be used to assist with one or more functions of a UWB sub-system (e.g., a UWB signaling layer). These sub-systems may be tightly coupled based on a common (e.g., shared) time base and shared MAC functionality on a given physical device, as described here. The one or more functions of the NB signaling layer may include, for example, coordinating time and frequency synchronization between UWB signaling layers of respective devices, performing control, management, and/or status signaling between the devices, etc. Meanwhile, the UWB signaling layer may perform short impulse radio bursts distributed over a time interval (e.g., a multitude of milliseconds (MMS)). The bursts may represent a fragmented UWB transmission (e.g., of a Channel Impulse Response Training Sequence (CIRTS)/ Scrambled Time Sequence (STS).

In some embodiments, the hybrid wireless system may enable the NB signaling layer to be responsible for conveying synchronization data such as time and frequency synchronization information, for example, conveyed via the sync header (SHR) of a conventional UWB packet, which may be more efficient than distributing the SHR over multiple SHR fragments via the UWB signaling layer. For example, transmitting multiple SHR fragments in a case where the arrival time of each fragment is not known in advance may require significant memory for buffering and/or significant amounts of processing power. Accordingly, the amount of memory and/or processing power may be reduced by utilizing the NB signaling layer instead of utilizing a conventional UWB SHR. Meanwhile, the CIRTS/STS portion of the UWB packet may be fragmented according to a UWB fragmenting protocol. The receiver of the fragmented packet may utilize the synchronization data communicated via the NB signaling so that the receiver may accurately schedule reception (e.g., arrival time) of subsequently received UWB fragments. By enabling fragmentation of a UWB transmission, embodiments may enable a receiver of a UWB transmission to achieve higher performance when measuring the propagation channel for extraction of geometrical and/or positioning metrics such as distance (e.g., range) or angle. For example, a UWB waveform utilized for a given measurement cycle may be fragmented into short bursts (e.g., fragmented multi-millisecond (MMS) signaling) and distributed over multiple regulatory (e.g. emissions) test intervals (e.g., in accordance with the regulatory rules for a particular region). A receiver device may take advantage of the energy that is "raked in" (e.g., aggregated) from various intervals (e.g., for each short burst), thus enabling a more accurate CIR estimation. Based in part on this CIR estimation, a time-of flight, range, position (localization), and/or angle-of arrival (AOA) estimation may be determined. Thus, by utilizing a hybrid wireless system that is capable of tightly coordinated NB and UWB signaling, embodiments enable at least improved operating range and operating efficiency for UWB-based signaling.

FIG. 1 is a simplified block diagram of example UWB-equipped devices, according to some embodiments. In some embodiments, various types of Ultra-Wideband (UWB) devices may be improved, at least with respect to operating range, operating efficiency, and/or other feature enhancements. In some embodiments described herein, UWB transmissions are split into short bursts of packet fragments that are distributed over multiple regulatory/emissions measurement intervals in order to increase the energy radiated by a UWB transmitter per each transmission.

Due to its large bandwidth (BW) of 500 MHz or more, one beneficial use case of UWB is that of "ranging." In some embodiments, ranging may correspond to the precise measurement of the time-of-flight (TOF) of the radio waves between two UWB-equipped devices A and B and the estimation of the distance (e.g., the "range") between these devices. The large BW may help to resolve dense electromagnetic reflections that may be present in the vicinity of the devices, such as floors, ceilings, walls, furniture, cars, plants, appliances, or other human-made or natural objects in indoor or outdoor environments. Measuring the ToF/Range between devices such as mobile phones, wireless audio speakers, TV's, desktop or laptop computers, door locks for homes or cars, or other consumer devices may be beneficial to enable novel user experiences.

Figure 2:
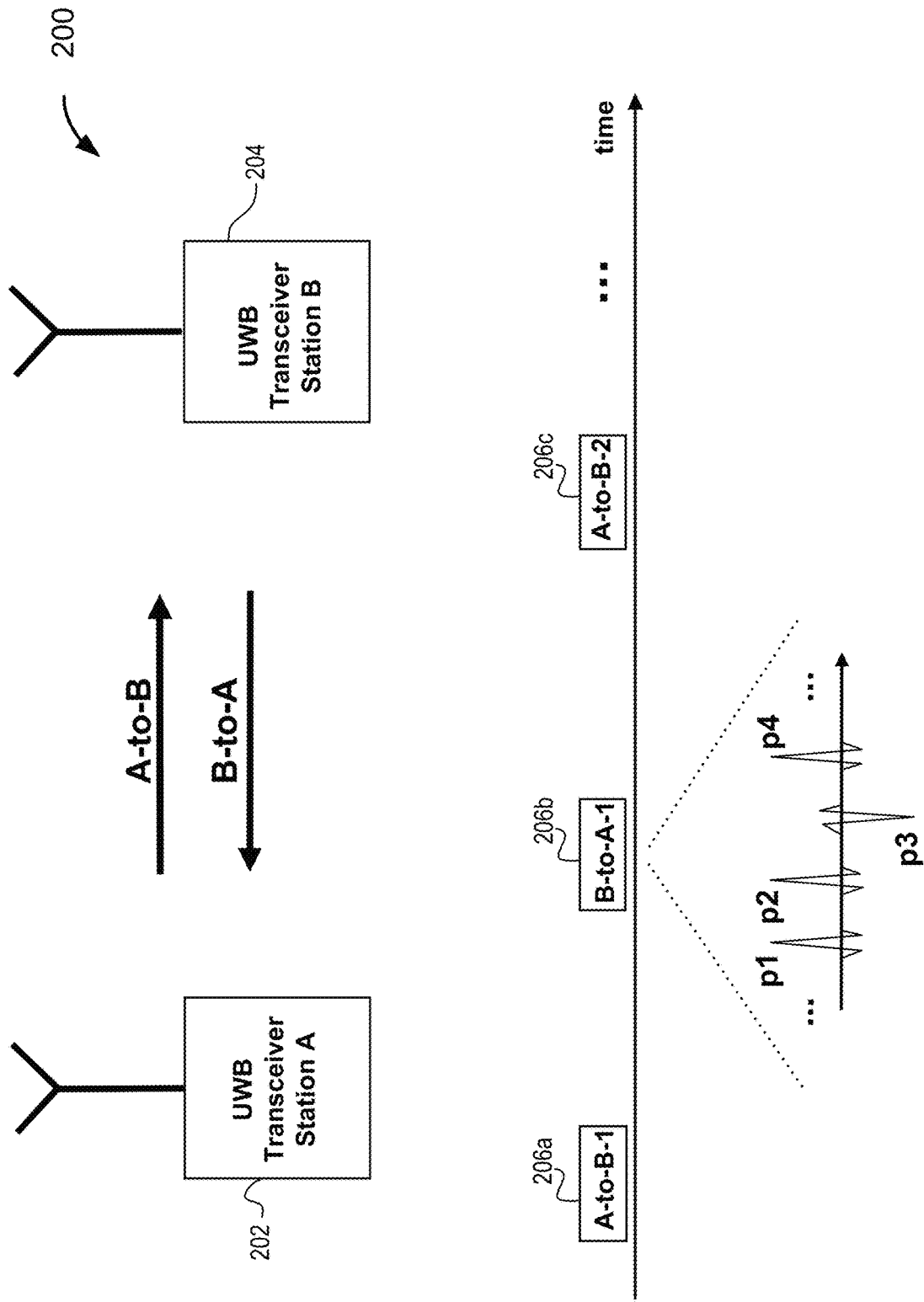
FIG. 2 is another simplified block diagram illustrating example techniques for exchanging wireless messages between UWB-equipped devices, according to some embodiments.

FIG. 1 and FIG. 2 (described further below) illustrate scenarios with UWB-equipped devices. In diagram 100 of FIG. 1, a handheld device 110 communicates with other handheld, stationary, or Internet-of-Things (IoT) devices to measure distances or other positioning metrics such as directions of appearance of devices with respect to each other. Devices involved in such communication include phones (e.g., mobile device 120), tags (e.g., pet tag 160), wireless speakers (e.g., wireless speakers 170a, 170b, and 170c), television sets, displays, doors (e.g., door locking device 140), cars, home appliances (e.g., smart speaker 130), thermostats (e.g., thermostat control device 150), desktop and laptop computers, tablet computers, etc.

FIG. 2 is another simplified block diagram 200 illustrating example techniques for exchanging wireless messages between UWB-equipped devices (or "stations"), according to some embodiments. Diagram 200 of FIG. 2 illustrates how UWB device A 202 and UWB device B 204 may exchange wireless messages between each other over time in the form of wireless packets 206a-c. In the case of Impulse Radio (IR) UWB, the waveform exchanged between devices contains UWB pulses, shown as p1, p2, p3, . . . in FIG. 2. This may represent, for example, a series of pulses transmitted from device B 204 to device A 202 in response to a first set of pulses transmitted from A to B. In some embodiments, IR-UWB may be used to perform techniques described in the present disclosure.

Figure 3:
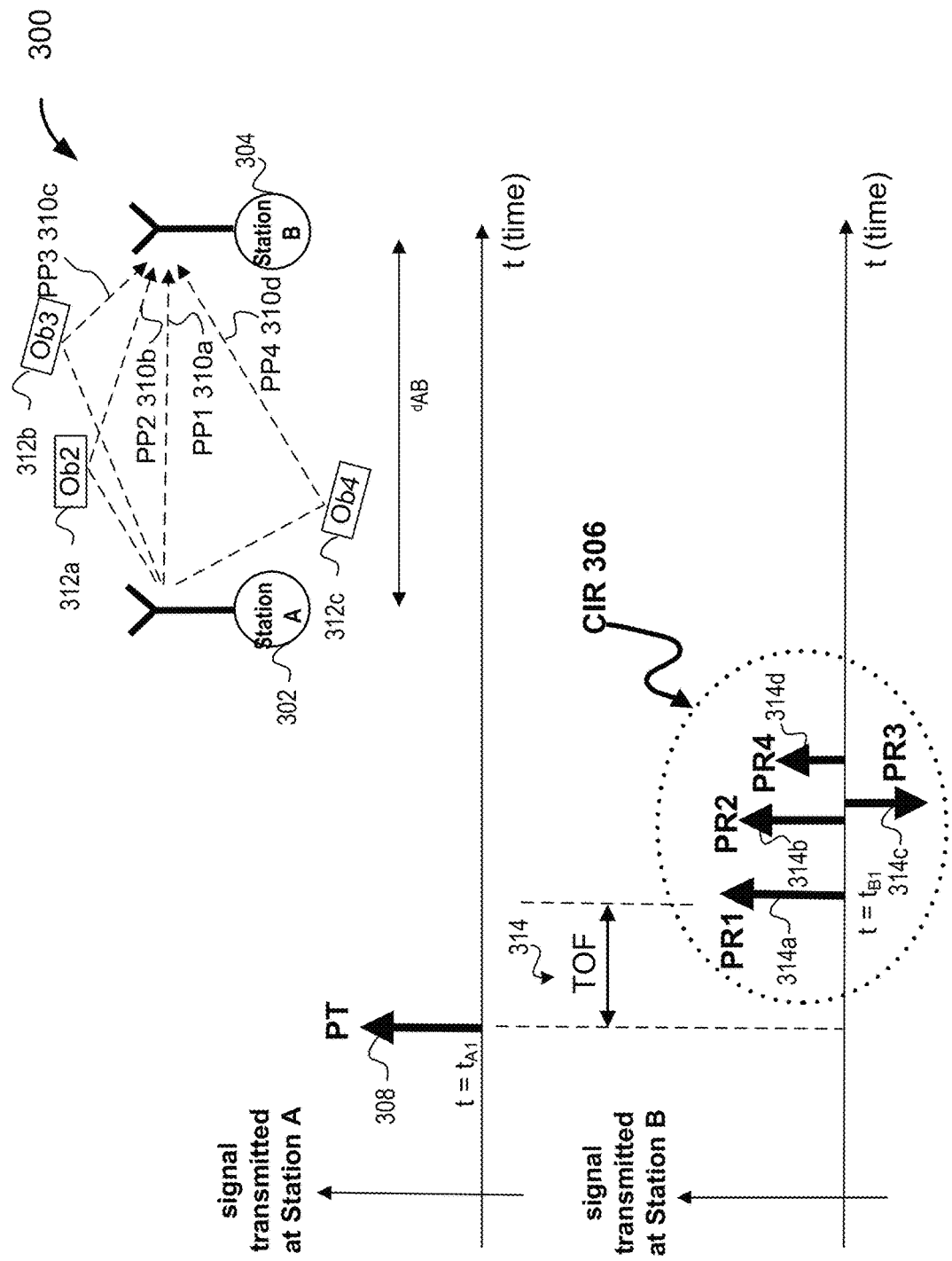
FIG. 3 is another simplified block diagram illustrating at least some example techniques for computing a Channel Impulse Response (CIR), according to some embodiments.

FIG. 3 is another simplified block diagram 300 illustrating at least some example techniques for computing a Channel Impulse Response (CIR), according to some embodiments. In some embodiments, to enable a determination of a mutual range or position of devices, a technique used by wireless systems such as UWB is to compute a Channel Impulse Response (CIR) 306. A CIR 306 may represent a profile of direct and indirect (reflected) wireless propagation paths between two devices such as station A 302 and station B 304, each path being characterized by its propagation delay, magnitude, and radio frequency (RF) phase. Due to the large BW of UWB, CIRs can be computed with a high level of resolution in UWB, which in turn enables a more precise extraction of the Line-of-Sight (LOS) path and hence TOF/range that corresponds to the first path in the CIR.

For example, as illustrated in diagram 300 of FIG. 3, a pulse PT 308 is transmitted from station A 302 at time t_A1. In some embodiments, with respect to IR-UWB, the pulse PT 308 may be viewed as being representative of a long series of pulses. In this example of diagram 300, pulse PT 308 propagates to station B 304 via a series of propagation paths, PP1 310a, PP2 310b, PP3 310c, and PP4 310d. PP1 310a is a direct Line-of-Sight path, while PP2 310b, PP3 310c and PP4 310d are reflections off of objects Ob2 312a, Ob3 312b, and Ob4 312c in the environment. After a bulk delay "TOF" (time-of-flight) 314, representing the distance divided by the speed of light, the signal going through the direct (LOS) path PP1 310a arrives at receive station B 304, as pulse PR1 314a, at time t_B1. The pulses corresponding to the reflection paths PP2 310b, PP3 310c, and PP4 310d arrive later than the direct paths, as PR2 314b, PR3 314c, and PR4 314d, and their arrival times will depend on the travel distance from station A 302 to station B 304 via one or multiple reflectors each path is subject to. Note that PR1 314a, PR2 314b, PR3 314c, and PR4 314d are an examples of a channel impulse response (CIR) 306. In some embodiments, the CIR 306 may enable devices to determine metrics such as the distance d_AB based on the TOF which itself is derived off the first arriving path PR1 314a.

While UWB can also be used for more traditional wireless transmission purposes such as Data Payload transfer, estimation of the CIR 306 for ToF/Ranging/Positioning is a particular strength of UWB. In some embodiments, this advantage of UWB may be due in part to UWB's large bandwidth of 500 MHz or more.

In some embodiments, to estimate the CIR 306 (e.g., sometimes referred to as "channel sounding"), wireless systems including UWB use what may be referred to as "Channel Impulse Response Training Sequences" (CIRTS). CIRTS may be waveforms known to both the transmitter (e.g., device A 202) and the receiver (e.g., device B 204) in a link between the two devices. If the transmitter sends out a waveform containing a specific Training Sequence 1 (CIRTS1_TX), the wireless propagation channel with its direct and reflected propagation paths may linearly distort the waveform so that a modified waveform CIRTS1_RX will arrive at the receiver. Since the receiver has advanced knowledge of CIRTS1_TX, it can compare the incoming signal CIRTS1_RX with the known sequence CIRTS1_TX. Then, using mathematical algorithms such as correlations and others generally referred to as "Channel Estimation" in the state of the art, the receiver can extract the CIR between the transmitter at device A 202 and the receiver at device B 204.

Figure 4:
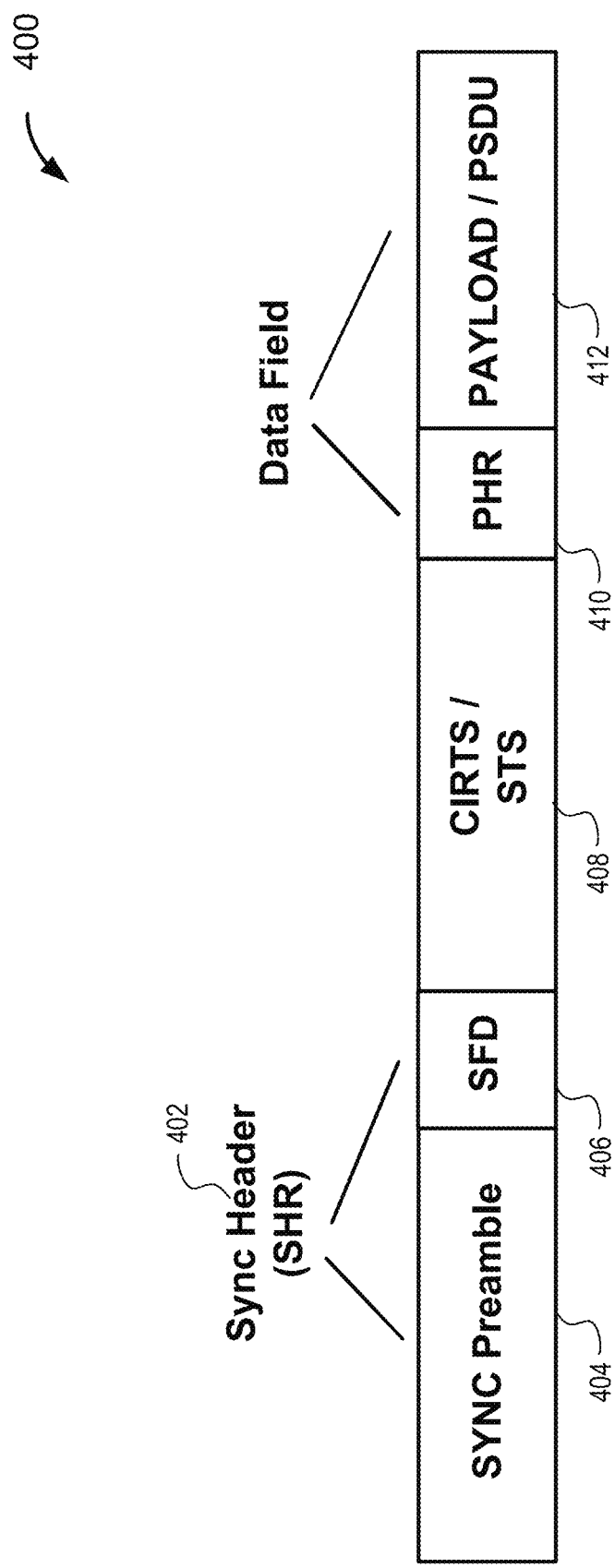
FIG. 4 is another simplified block diagram illustrating at least some example techniques for formatting a UWB packet, according to some embodiments.

FIG. 4 is another simplified block diagram 400 illustrating at least some example techniques for formatting a UWB packet (e.g., packet(s) 206 of FIG. 2), according to some embodiments. FIG. 4 shows an example of a type of UWB packet format with its constituent fields and their respective purposes, per the international standard defined for UWB in IEEE 802.15.4z. A Sync Header (SHR) 402 at the beginning of the packet consists of a Synchronization (SYNC) preamble 404 and a start of frame delimiter (SFD) 406. The SHR 402 has a multitude of purposes including Automatic Gain Control, Frequency Offset Estimation (Frequency Sync or F-Sync), Timing Estimation (T-Sync), Initial Channel Estimation, etc., generally referred to as "Acquisition" or "Synchronization" (Sync). The SFD 406 terminates the SHR 402 and is also involved in coordinating the packet timing (e.g., frame timing estimation). The subsequent field, shown as CIRTS/STS 408, refers to a Channel Impulse Response Training Sequence, or, in the case of 802.15.4z, a Scrambled Timestamp Sequence (STS). STS refers to a CIRTS that contains pseudo-random pulses known only to the transmitter and receiver of a given link to ensure secure channel estimation and secure distance measurements. In some embodiments, the CIRTS/STS 408 may be utilized for precise and/or secure channel estimation and/or time-stamp validation. FIG. 4 shows two additional packet fields, the PHY Header (PHR) 410 and the Payload data (e.g., PHY Service Data Unit (PSDU)) 412. The PHR 410 may contain parameters of the PHY header, and the payload may contain suitable data contents. Note that other packet types are defined for UWB that consist, for example, only of the SHR 402 and the CIRTS/STS 408 (e.g., "No-Data packets"), which can be utilized for channel sounding, but without any payload data transfer. There are also Payload-only packet formats that consist of the SHR 402 and the PHR 410/Payload 412 fields, in which case no precise and/or secure channel sounding is needed and the main purpose is data transfer.

Figure 5:
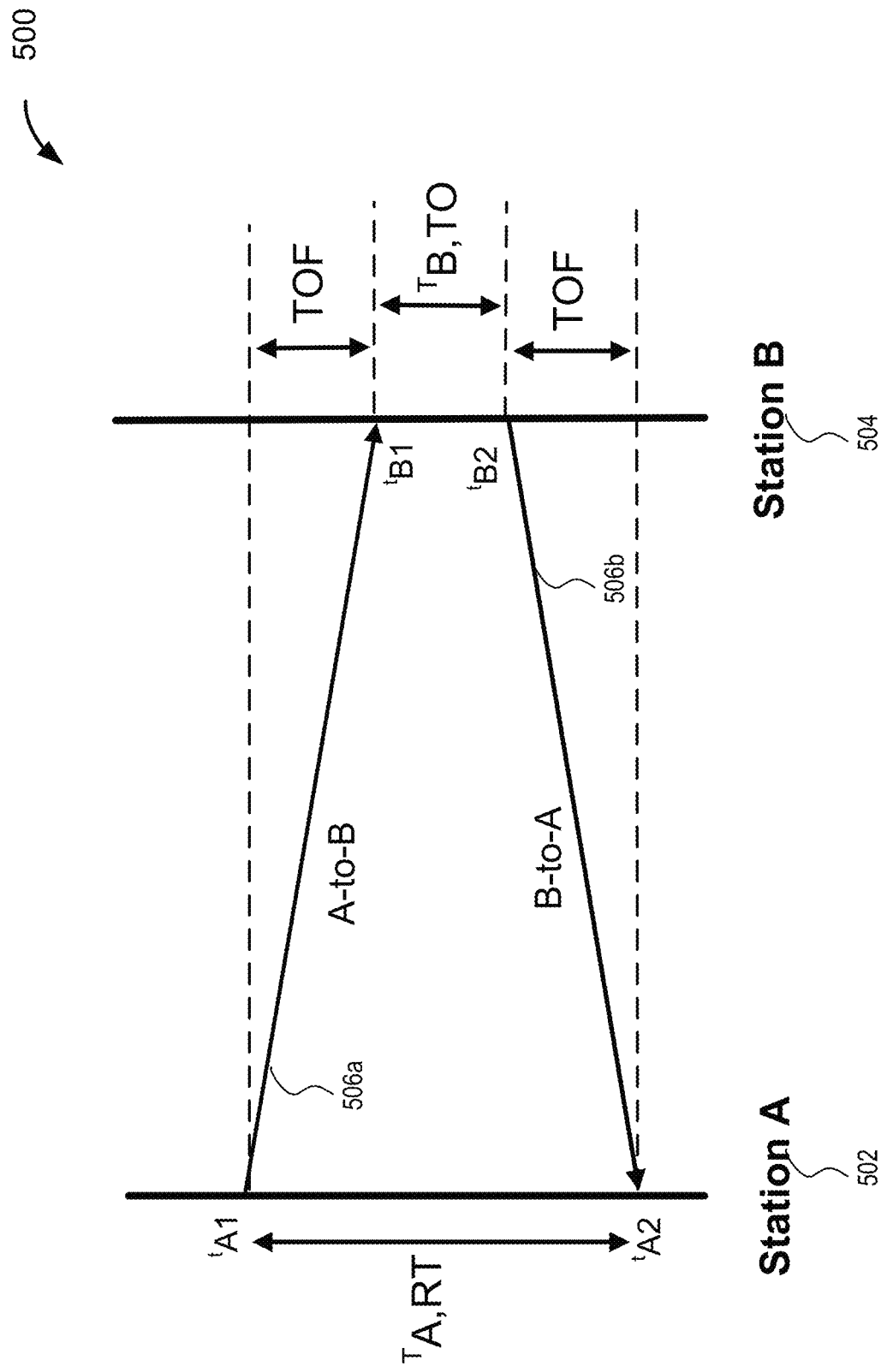
FIG. 5 is another simplified block diagram illustrating at least some example techniques for determining a time-of-flight (TOF), according to some embodiments.

FIG. 5 is another simplified block diagram 500 illustrating at least some example techniques for determining a time-of-flight (TOF), according to some embodiments. As depicted in diagram 500 of FIG. 5, based on the determination of the TOF, the distance between two stations, station A 502 and station B 504, may be determined. In some embodiments, station A 502 transmits a "poll" message (A-to-B) 506a at a time $t_{A1}$. The LOS path, as determined by station B based on the CIR, arrives at $t_{B1}$, where the time delta between $t_{A1}$ and $t_{B1}$ represents the TOF. After a turn-around time at station B, $T_{B,TO}$, the latter transmits a "response" message (B-to-A 506b) at time $t_{B2}$. The LOS path of the response message arrives a time $t_{A2}$, so that the TOF is again visible on the diagram 500 as the difference between $t_{A2}$ and $t_{B2}$. By measuring the "round-trip" time $T_{A,RT}$ and subtracting the turnaround time $T_{B,TO}$, station A 502 can calculate the TOF. In some embodiments, the technique illustrated by diagram 500 is a form of TOF measurement protocol (or "ranging protocol"). In some embodiments, there may be variants where three or more packets (e.g., packet(s) 206) are involved to improve the robustness against real-life radio impairments such as Crystal Oscillator (XO) offsets between station A 502 and station B 504. As described further herein, embodiments provide for ranging protocols utilizing a new hybrid wireless system context.

Figure 6:
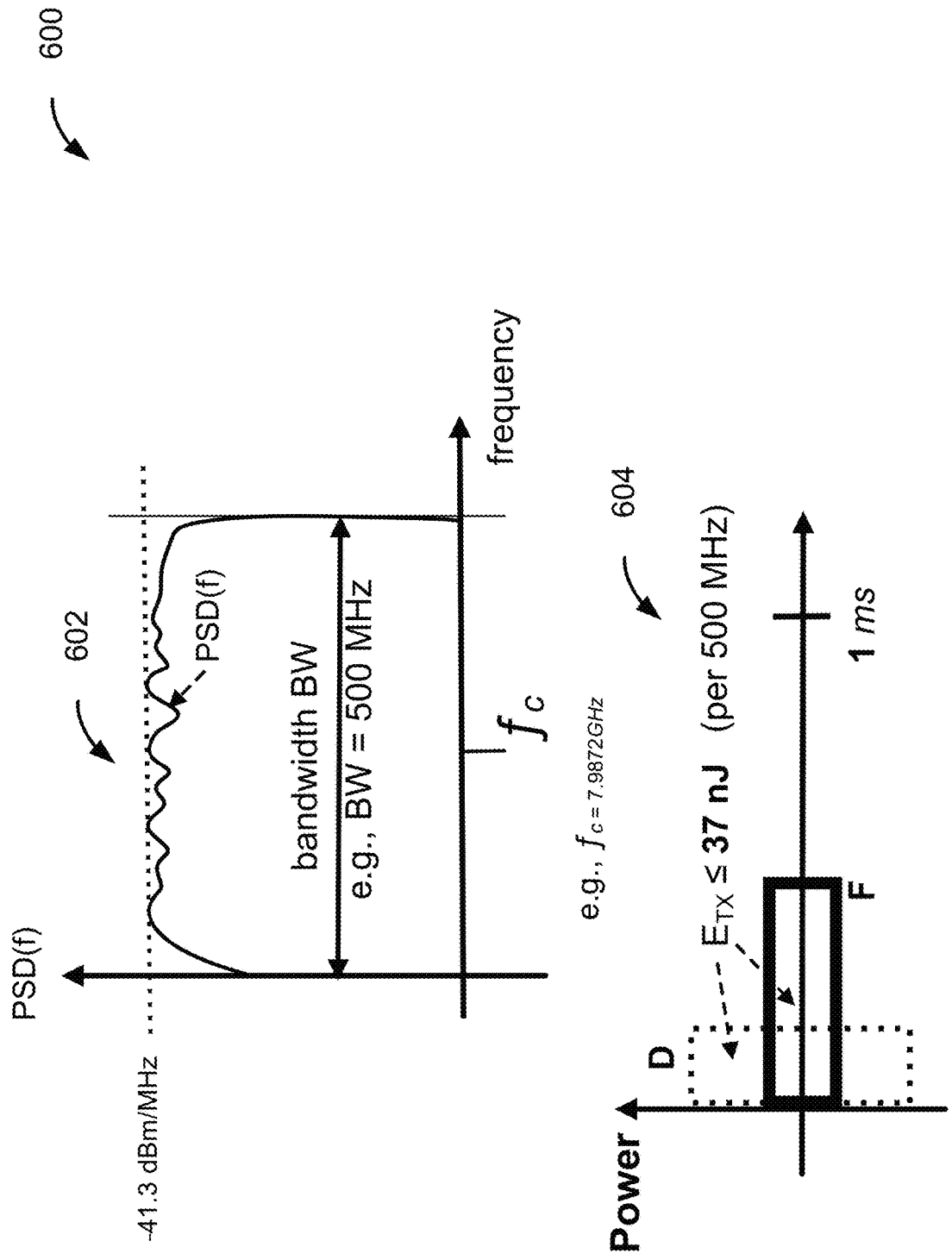
FIG. 6 is another simplified diagram illustrating an example a power spectral density associated with a measurement of a UWB signal, according to some embodiment.

FIG. 6 is another simplified diagram 600 illustrating an example a power spectral density associated with a measurement of a UWB signal, according to some embodiments. In some embodiments, techniques described herein enable improvements for a scenario in which a CIRTS and associated CIR estimation steps at a receiver device are distributed across multiple fragments, covering multiple regulatory/emissions test intervals, which may increase the radiated energy utilized for the transmission of the CIRTS. This distribution may also enable improvement of the operating range.

Using FIG. 6 to further illustrate this context, diagram 600 illustrates the power spectral density (PSD) 602 for a regulatory measurement of a UWB signal. While regulatory rules may differ between countries and regulatory regions, in some regions, an example UWB emissions limit may call for a maximum PSD of −41.3 dB/MHz across the UWB signal bandwidth (e.g., 500 MHz in this example). The PSD 602 shown in this example meets this requirement for all spectral components, with some of them hitting the limit of −41.3 dBm/MHz. In some embodiments, the measurement may be conducted with an averaging (spectrum analyzer sweep) time of 1 millisecond (1 ms). This implies that, for this scenario, the maximum amount of energy a UWB system can emit per ms corresponds to roughly 37e-9 Joule=37 nanoJoules (nJ) in each ms per 500 MHz of bandwidth. This is illustrated by the graph 604 near the bottom of diagram 600. The available energy (up to 37 nJ) is transmitted in a shorter ("dense", D) or longer ("flat", F) burst. The power (shown via the y-axis) is correspondingly higher or lower, as Energy is calculated as duration times power. In some embodiments, there may be peak power constraints governed by UWB regulatory rules in different regions. Accordingly, the compression to shorter durations may work within certain limits and depends on the density of IR pulses.

Figure 7:
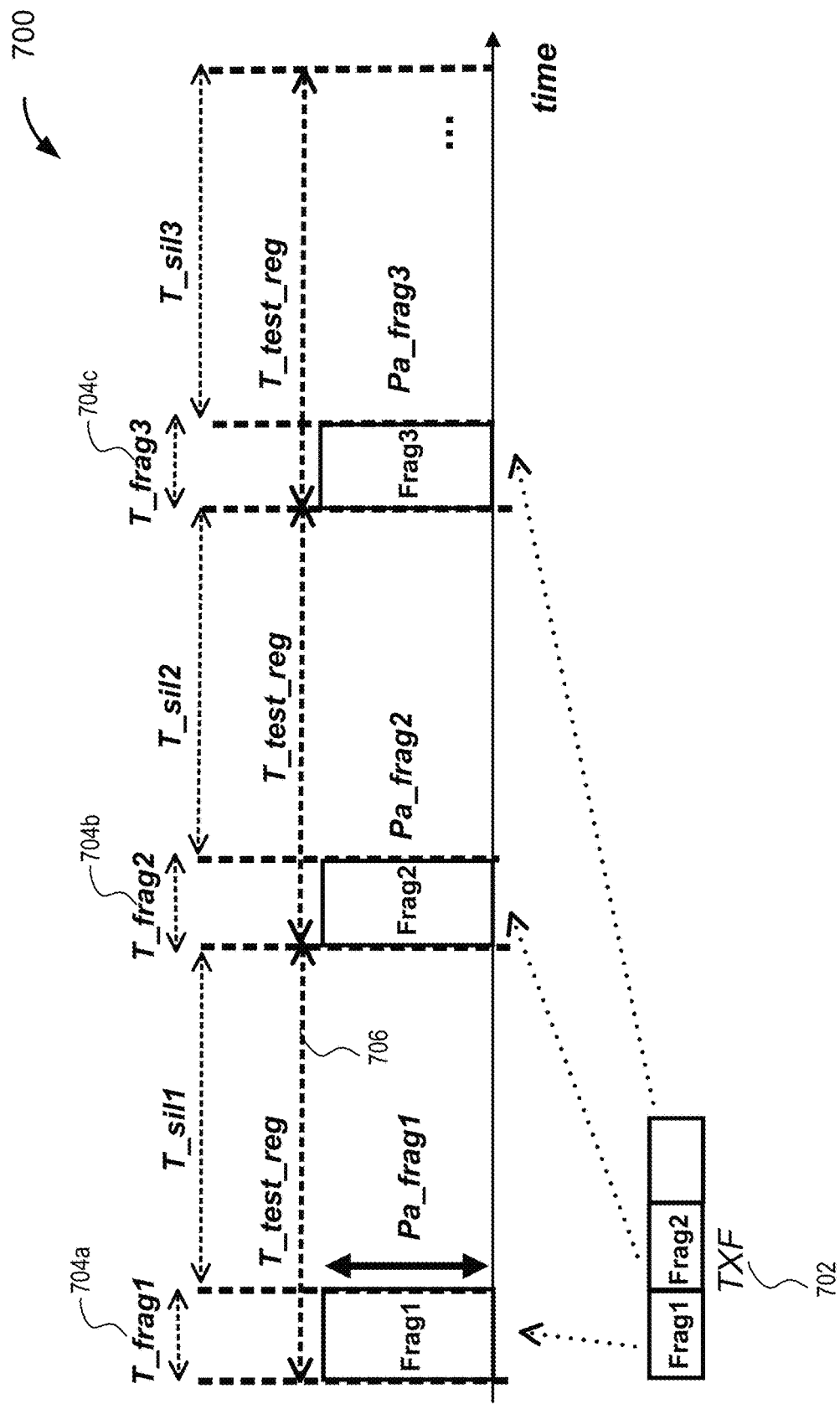
FIG. 7 is another simplified block diagram illustrating at least some example techniques for transmitting data fragments within a UWB framework, according to some embodiments.

FIG. 7 is another simplified block diagram 700 illustrating at least some example techniques for transmitting data fragments within a UWB framework, according to some embodiments. In some embodiments, regulatory constraints may be taken into account at least in part by defining a fragmented UWB framework, as illustrated by diagram 700 of FIG. 7.

In diagram 700, a Transmit Frame (TXF) 702 is depicted as being split up into a multitude of fragments 704a-c that are distributed over multiple regulatory test intervals of duration T_test_reg 706. For example, a first fragment ("Frag1") 704a may be transmitted during a time interval of T_test_reg 706. For the example illustrated in FIGS. 6 and 7, up to 37 nJ can be radiated over each fragment 704a-c. Thus, if N fragments 704 are utilized for a given UWB transmission, the overall transmission can radiate up to N*37 nJ. It should be understood that duration of a T_test_reg 706 may be a predefined time interval of any suitable duration (e.g., 1 millisecond, 1.5 ms, 2 ms, etc.).

Figure 8:
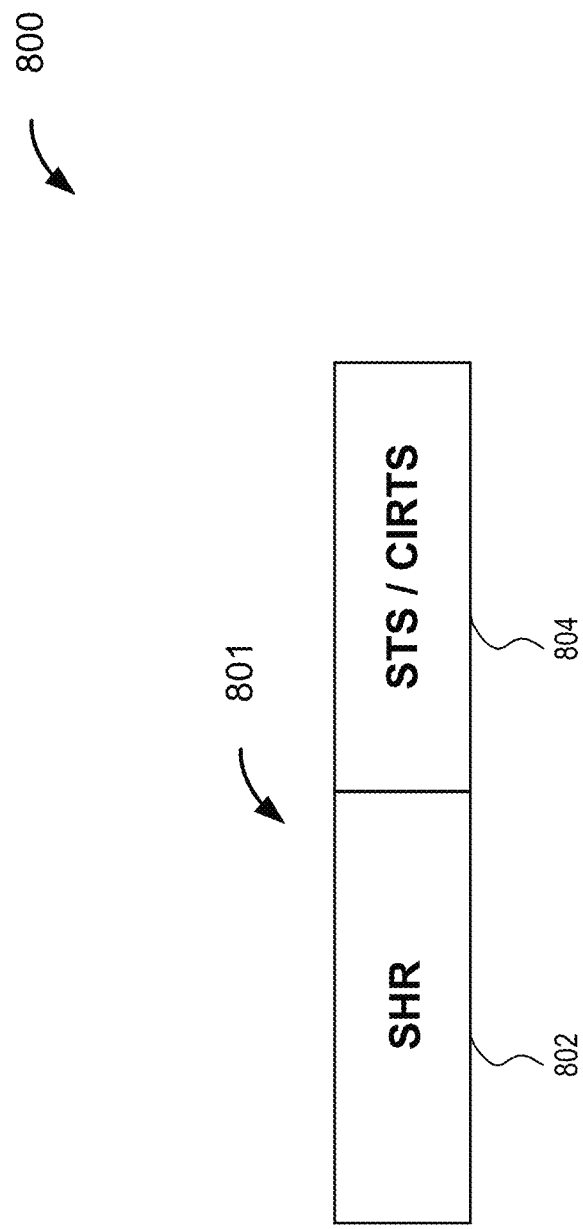
FIG. 8 is another simplified block diagram illustrating at least some example techniques for transmitting data fragments associated with a UWB packet type, according to some embodiments.

FIG. 8 is another simplified block diagram 800 illustrating at least some example techniques for transmitting data fragments associated with a UWB packet type, according to some embodiments. In some embodiments, one example UWB packet format for performing a UWB transmission is that of a No-Data packet 801, as shown in diagram 800. See also FIG. 4 above. In the example of diagram 800, the No-Data packet 801 includes a Sync header (SHR) 802 and an STS/CIRTS 804. Note that the Sync header 802 may include a SYNC preamble and an SFD.

Figure 9:
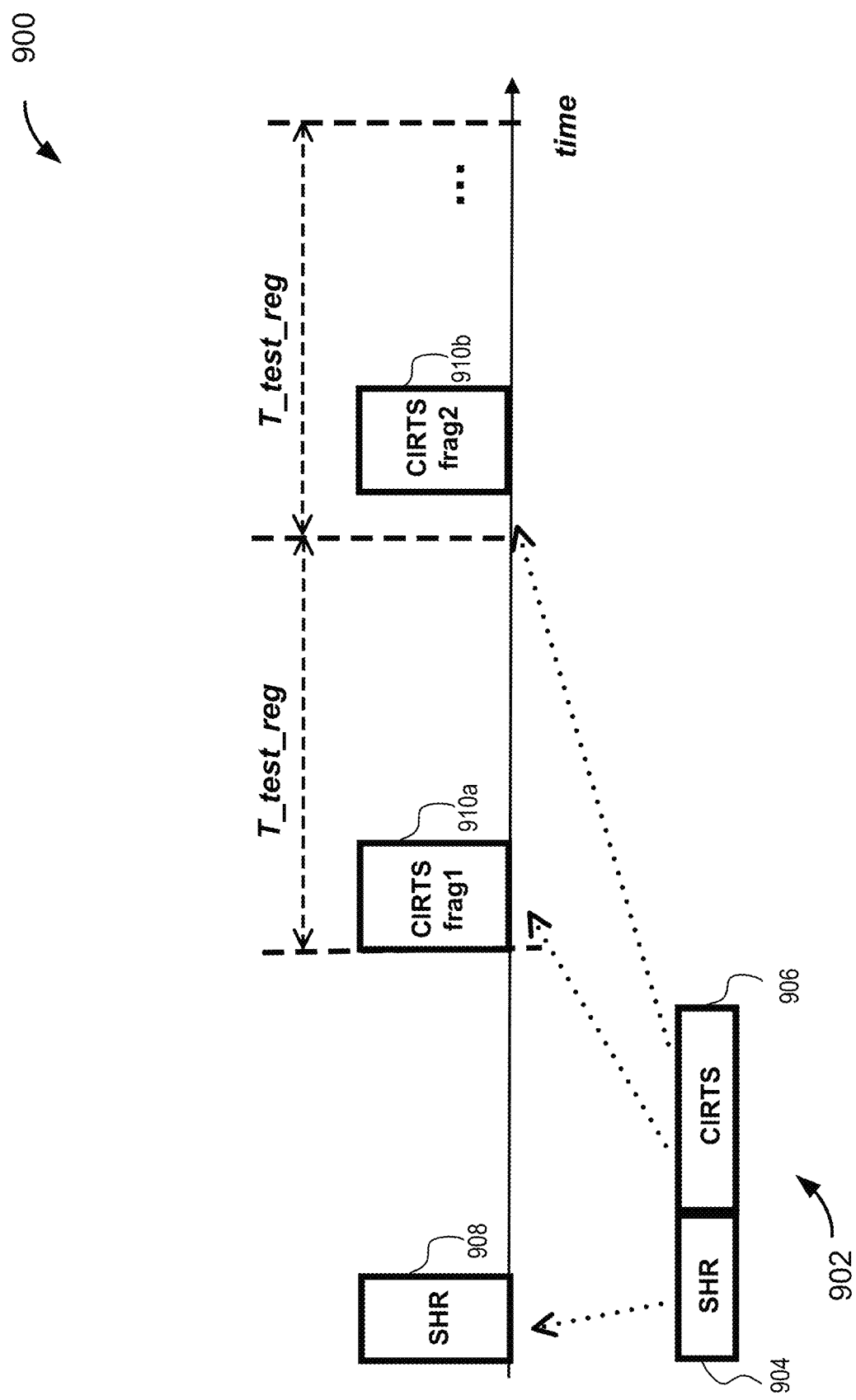
FIG. 9 is another simplified block diagram illustrating at least some example techniques for transmitting data fragments over multiple time intervals within a UWB framework, according to some embodiments.

FIG. 9 is another simplified block diagram 900 illustrating at least some example techniques for transmitting data fragments over multiple time intervals within a UWB framework, according to some embodiments. In diagram 900 of FIG. 9, a No-Data packet 902 (e.g., similar to the No-Data packet 801 depicted in FIG. 8) is illustrated, which may include an SHR field 904 and a CIRTS field 906. The No-Data packet is split into an SHR fragment 908 and several (e.g., two, in this example) CIRTS fragments 910a-b. Each CIRTS fragment 910 may be transmitted in a separate regulatory test interval, to benefit from the full energy budget for its emissions. In some embodiments, keeping the fragments short is beneficial at least because UWB signal processing can consume a significant amount of power due to the high bandwidth and sample rates in the radio and digital modem circuitry. Furthermore, using shorter fragment durations (e.g., and hence longer silence periods between fragments) can help minimize the chance of collisions between different links utilizing the same UWB spectrum.

If, as in FIG. 9, the CIRTS 906 is distributed over a multitude of intervals, the receiver side (station B) of a UWB link will be able to achieve a higher performance in estimating the CIR. This is at least because energy can be "raked in" from the various intervals, CIRTS frag1 910a, CIRTS frag2 910b, etc., this enabling a more accurate analysis of the fragments and/or over a longer distance. Meanwhile, to ensure that the CTR estimation works reliably, a high performance of the Sync/Acquisition step may desirable. This may be because a mis-synchronization during the SHR 904 may deteriorate the CIRTS 906 processing. Because, in FIG. 9, the SHR 904 only benefits from one interval's worth of energy, there is an inherent imbalance between the energy available to the SHR 904, versus the energy available to the CIRTS 906. One potential solution may be to distribute the SHR 904 over multiple intervals and therefore increase the operating performance. However, this may result in a less efficient solution. In some embodiments, the arrival time of the packet (e.g., the fragments of a packet) are not precisely known a priori. Accordingly, processing multiple SHR fragments 908 in the Sync/Acquisition step may require use of substantial memory for buffers and/or a large amount of processing power. This inefficiency may be undesirable in particular for handheld/portable or Internet of Things devices. Accordingly, embodiments of the present disclosure provide techniques for increasing the operating efficiency and/or operating range, for example, via a hybrid wireless system, as described further herein.

FIG. 10 is another simplified diagram 1000 illustrating potential advantages and disadvantages of at least some wireless systems that utilize UWB signaling 1002 and/or NB signaling 1004, according to some embodiments. In some embodiments described herein, a hybrid wireless system is utilized, in which Narrowband (NB) signaling 1004 and Ultra-Wideband (UWB) 1002 signaling are combined in a way that addresses potential challenges addressed herein and improves operating efficiency and/or operating range of UWB systems. In some embodiments, systems that performs narrowband signaling may include wireless systems that have a bandwidth significantly smaller than that of UWB. In some embodiments, UWB may have a minimum bandwidth of 500 MHz, so NB may refer to systems exhibiting a fraction of that bandwidth, such as several 100 kHz, 1 MHz, or 10-20 MHz. Some non-limiting examples of NB systems would be narrowband GFSK (Gaussian Frequency Shift Keying) or DPSK (Differential Phase Shift Keying) signaling as utilized in Bluetooth or IEEE 802.15.4 O-QPSK (Offset Quadrature Phase-Shift Keying format) as used in such industry standards as ZigBee or Thread. More narrowband modes in wireless local area networks (WLANs), such as IEEE 802.11 modes spanning 20 or 40 MHz of spectral bandwidth, may also be classified as NB signaling in the context of this disclosure as they have significantly lower bandwidth than UWB and tend to operate in different frequency spectra. In some embodiments, they are also regulated by a different set of regulatory constraints than UWB.

Before turning to FIG. 10 in further detail, and, to provide further context regarding regulatory constraints and bandwidth considerations, international regulatory rules governing UWB deployments and associated radiated emissions may define low emissions limits for UWB devices, as the latter tend to operate in spectral bands below 10 GHz primarily targeted for commercial or military operation of point-to-point or satellite links, radars, or other protected applications. Hence UWB emissions may be relegated to operate at the spurious emission levels allowed for other electronic devices (e.g., mobile devices, household devices, etc.) in order not to interfere with such licensed uses. Transmit powers for UWB may be limited to −14 dBm on the average in many regions.

By contrast, a variety of more narrowband systems and associated regulatory rules exist that have significantly looser emissions limits as they operate in bands targeted for such unlicensed uses. The 2.4-2.5 GHz so-called ISM (Industrial, Scientific, Medical) band is a prime example that accommodates NB applications such as 1 or 2 MHz wide Bluetooth (BT) or ZigBee/Thread transmissions, or Wireless Local Area Networks (WLANs) with bandwidths in the 20 MHz or 40 MHz regimes. The 2.4-2.5 GHz band is an example for a band available in most regulatory regions world-wide. There are other ISM-like spectra that, in many countries, include the 5.725-5.875 GHz band. Other spectra, including large parts of the 5-6 GHz bands, are also often open for various license-free, non-UWB uses, under certain conditions. Transmit powers (radiation levels) of these more NB systems are often in the 10 dBm, 20 dBm, or even 30 dBm region.

UWB, with its large bandwidth (500 MHz, 1 GHz or beyond), is particularly advantageous for advanced ranging & sensing applications where precise measurements of the propagation channel between associated devices allow extraction of such metrics as the Time-of-Flight (ToF) and corresponding distance between devices. However, the limited emissions pose a challenge to the operating range. By contrast, the higher transmit/transmission (Tx) powers of NB systems allow better operating range but fall short on the potential to do high-accuracy estimation due to their more limited bandwidth.

Turning to FIG. 10 now in further detail, diagram 1000 shows a comparison of the advantages and disadvantages of UWB and Narrowband (NB) wireless systems from the perspective of an implementer of a wireless system. UWB signaling 1002 benefits from the large bandwidth of at least 500 MHz, which is very advantageous for high resolution CIR measurements which in turn can be exploited for precise positioning and ranging, as outlined above. The wide bandwidth is also beneficial for high rate data transmissions. One of the challenges associated with the larger UWB bandwidth is that it requires higher complexity, such as higher Analog-to-Digital Converter (ADC) sample rates and associated signal processing effort, as well as increased analog and digital power consumption. As explained above, UWB regulatory rules also put significant constraints on the allowed emissions, which makes it harder to achieve a desired operating range. NB signaling 1004, by contrast, tends requires fairly low complexity and power consumption and may have high resilience against interference especially when operated in a frequency-hopping fashion. NB systems, when operated in spectra designated for NB/ISM uses, also benefit from significantly larger emission limits. NB systems are not, however, as well suited to high-resolution CIR estimation (ranging/sensing), due in part to the inherently limited bandwidth, and hence limited resolvability of multipath in the propagation channel.

Figure 11:
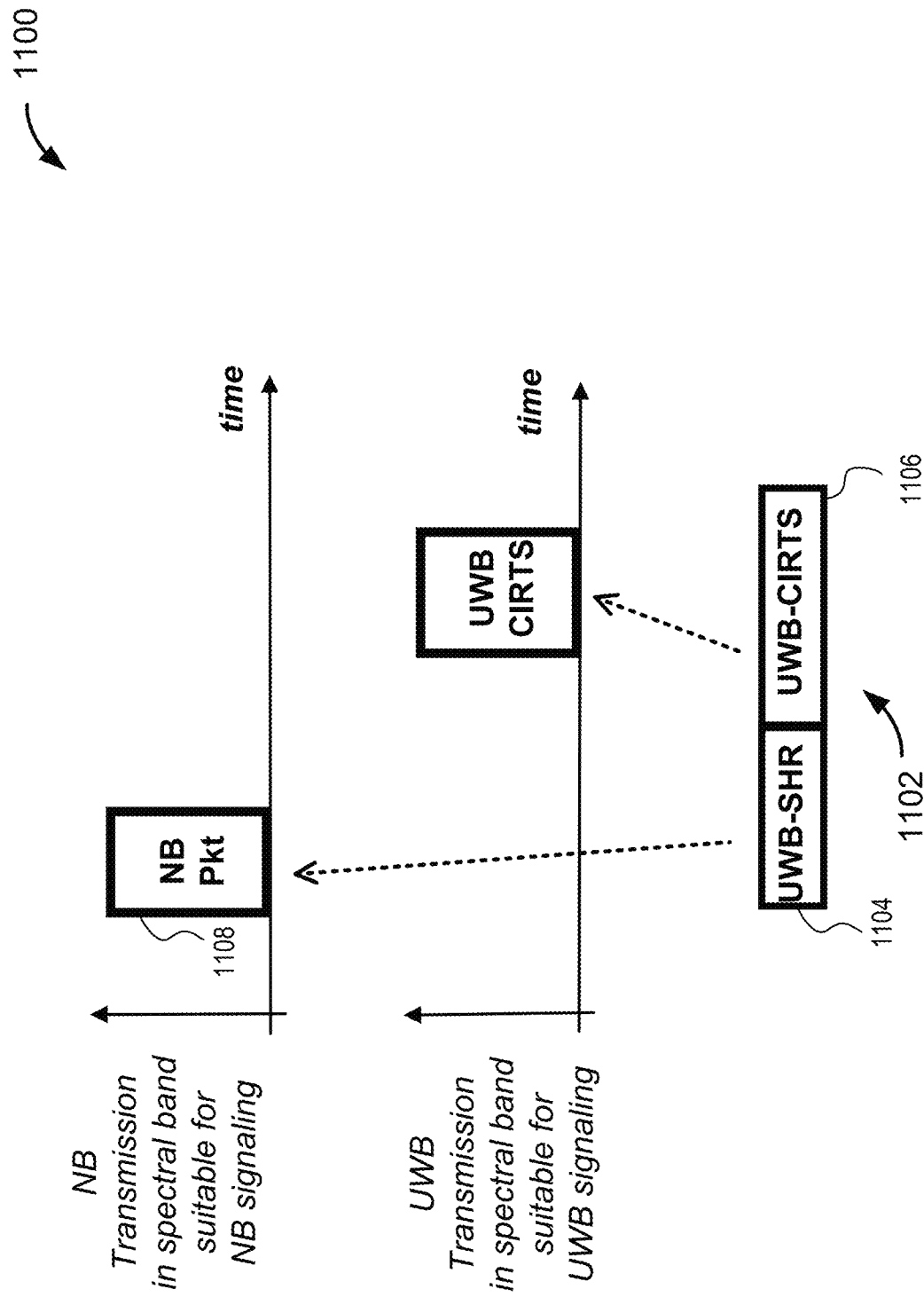
FIG. 11 is another simplified block diagram illustrating at least some example techniques for utilizing a hybrid of UWB signaling and NB signaling, according to some embodiments.

FIG. 11 is another simplified block diagram 1100 illustrating at least some example techniques for utilizing a hybrid of UWB signaling and NB signaling, according to some embodiments. In diagram 1100 of FIG. 11, a transmission of portions of a No-Data packet 1102 via hybrid signaling is illustrated. In this case, the Sync/Acquisition portion (SHR) 1104 of the UWB packet is replaced by an NB Packet 1108, while the CIRTS 1106 continues to use UWB signaling. The NB Packet 1108 is transmitted in a spectral band suitable for NB operation, and the UWB CIRTS 1106 is transmitted in a spectral band suitable for UWB operation. While in FIG. 1100, the NB Packet 1108 and the UWB CIRTS 1106 take place in temporal sequence (serially), they can also take place at the same time in a different embodiment. Note that each of these transmissions will be according to regulatory rules governing the NB and UWB transmission, respectively.

In some embodiments, this NB/UWB hybrid structure has certain benefits, which may be realized by utilizing devices operating according to the embodiments described herein. In some embodiments, the hybrid packet structure enables these devices to address challenges described above, for example, in the case of the packet format with a fragmented CIRTS (e.g., see FIG. 9). This is illustrated in FIG. 12.

Figure 12:
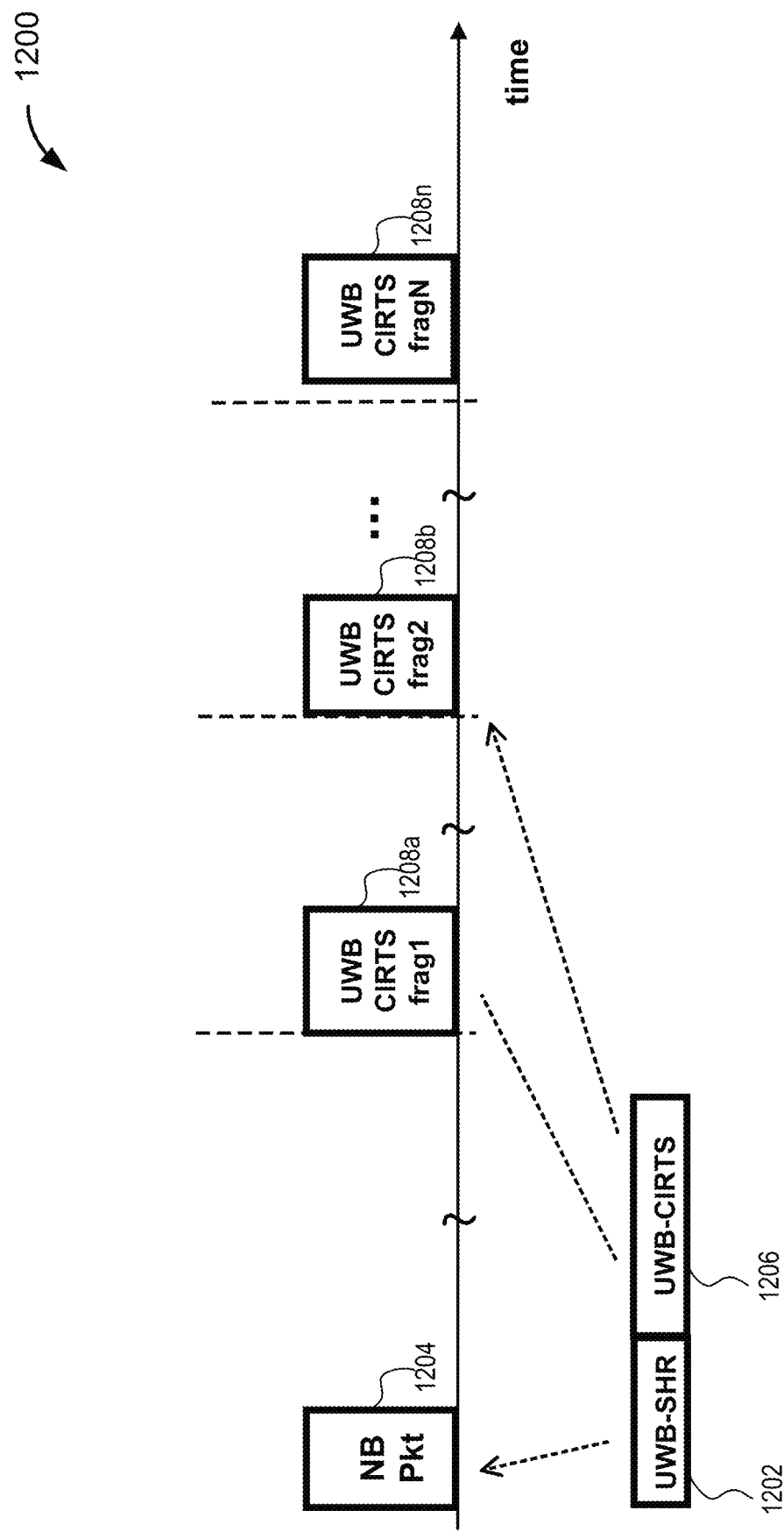
FIG. 12 is another simplified block diagram illustrating at least some example techniques for utilizing a hybrid of UWB signaling and NB signaling, according to some embodiments.

FIG. 12 is another simplified block diagram 1200 illustrating at least some example techniques for utilizing a hybrid of UWB signaling and NB signaling, according to some embodiments. In diagram 1200 of FIG. 12, the function of the SHR 1202 is taken over by the NB Packet 1204 (e.g., via an NB signal transmission) and where the CIRTS 1206 is split into multiple (here, N) fragments 1208a-n. Although a fragment 1208 may be transmitted at a start of a predefined time interval, embodiments should not be construed to be so limited. For example, in the illustration of FIG. 12, the transmission of fragment N 1208n is slightly offset from the start of a particular time interval (e.g., a T_test_reg interval, as described and illustrated with respect to FIG. 9). In some embodiments, an initiator and responder device may communicate configuration information so that a receiver device (e.g., the responder device) may know in advance parameters of when the fragment will be transmitted. This configuration information may be communicated via NB signals. Furthermore, while not illustrated in FIG. 12, note that a fragmented UWB transmission taking place in the context of the hybrid NB/UWB system may not only carry CIRTS data. Some of the CIRTS fragments 1208a-n may be replaced with Data Payload fragments based on distributing a packet containing Data Payload as per the "Data Field" (PHR and Payload/PSDU) in FIG. 4. Also note that the hybrid system concept is beneficial for UWB transmissions containing a single UWB fragment (N=1, see FIG. 11) and for UWB transmission containing multiple UWB fragments (N>1, see FIG. 12), and embodiments with N=1 and N>1 are possible.

Figure 13:
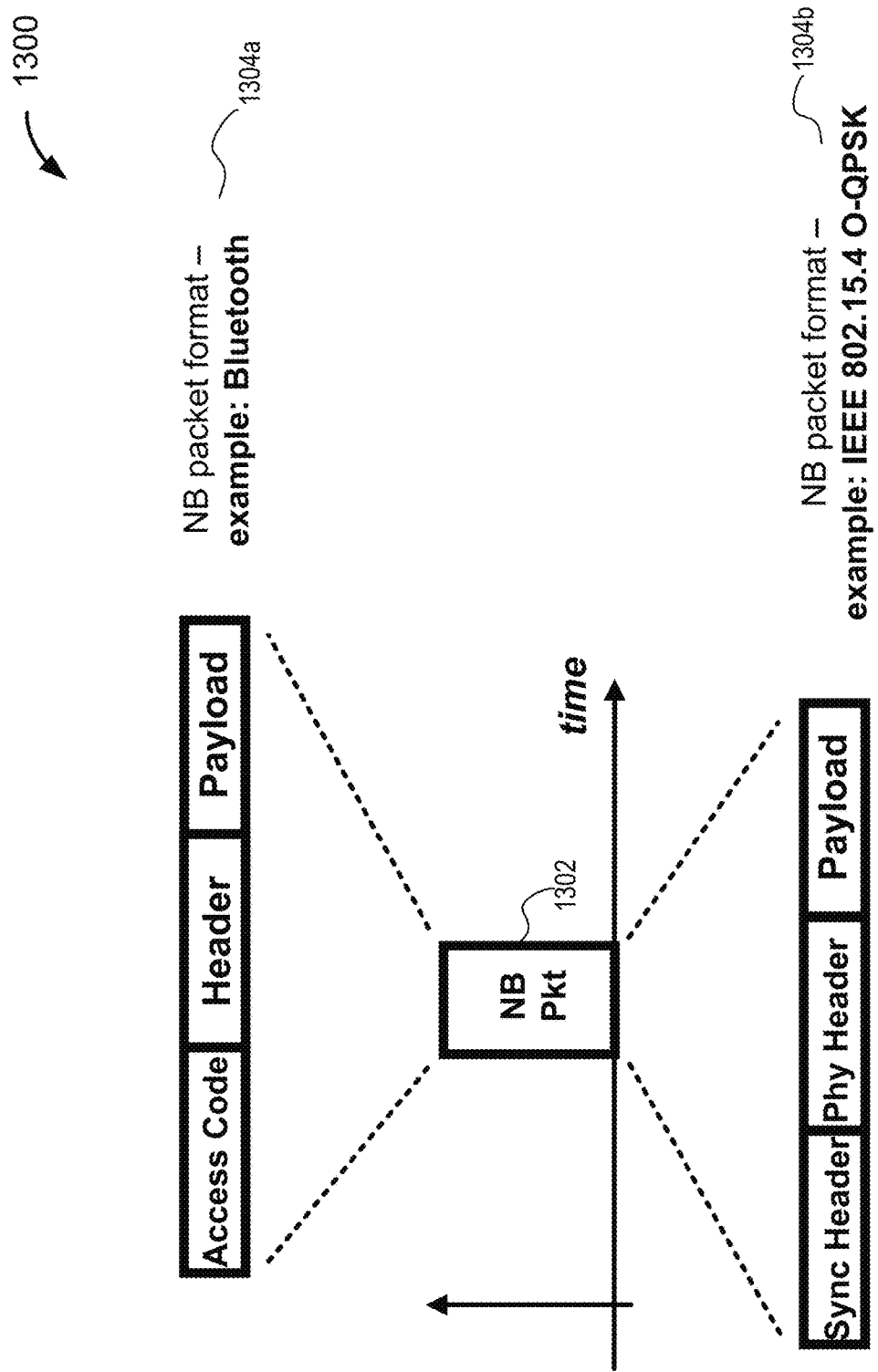
FIG. 13 is another simplified block diagram illustrating at least some example techniques for utilizing NB signaling via an NB packet format, according to some embodiments.

FIG. 13 is another simplified block diagram 1300 illustrating at least some example techniques for utilizing NB signaling via an NB packet format 1302, according to some embodiments. Diagram 1300 of FIG. 13 shows two NB packet formats 1304a-b known in the state of the art: The top NB packet format shows a Bluetooth format 1304a consisting of Access Code, Header, and Payload portions. The bottom NB packet format illustrates an O-QPSK packet format 1304b from IEEE 802.15.4, commonly used for ZigBee or Thread technologies. It should be understood that other suitable NB packet formats 1302 may be utilized to perform embodiments of the present disclosure.

It should be understood that the split of a packet field into fragments as illustrated in FIG. 12 or FIG. 9 is for functional purposes. For example, the fragments are not necessarily related to the original un-fragmented field. For example, it is not necessary that concatenating the CIRTS fragments in FIG. 12 and/or FIG. 9 yields the original non-fragmented CIRTS field. Thus, the fragmented fields are meant as a substitute for the original packet field in terms of the desired functionality, such as Channel (CIR) estimation in the case of a CIRTS field fragmented CIRTS packet structure, respectively. As described herein, in some embodiments, an NB packet may include a synchronization (sync) field (e.g., within a packet header) and/or a data payload field. In some embodiments, the sync field may be used to convey synchronization data. For example, a receiver device that receives the NB packet (e.g., during a scheduled window) may detect a signal pattern that is known between both the sender device and the receiver device. In some embodiments, this signal pattern may be associated with the sync field (e.g., sync header) of the NB packet. Upon detecting this pattern, the receiver device may be able to extract synchronization data in the form of time and frequency information, as described herein. In some embodiments, the receiver device may also extract synchronization data from the data payload field of the NB packet, for example, in the form of scheduling information that may be used to schedule subsequent reception of one or more UWB fragments.

Figure 14:
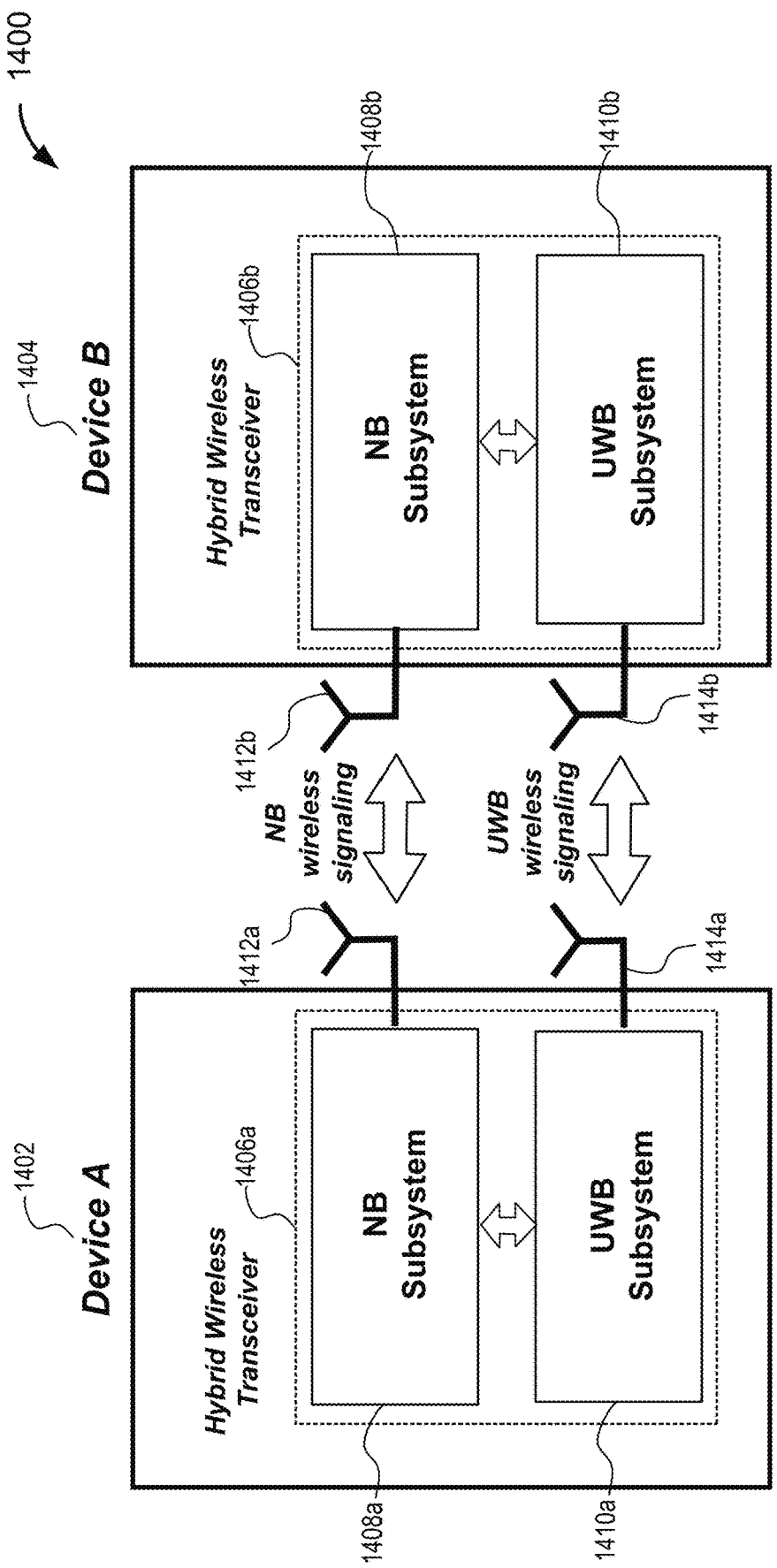
FIG. 14 is another simplified block diagram illustrating two devices that are respectively configured to communicate with each other utilizing a hybrid of UWB signaling and NB signaling, according to some embodiments.

FIG. 14 is another simplified block diagram 1400 illustrating two devices that are respectively configured to communicate with each other utilizing a hybrid of UWB signaling and NB signaling, according to some embodiments. Diagram 1400 of FIG. 14 shows a view of two devices, device A 1402 and device B 1404, communicating with each other according to a hybrid wireless system approach, according to some embodiments. Specifically, each device (1402 and 1404) has a Hybrid Wireless Transceiver (HWT) 1406a or 1406b comprising an NB Subsystem 1408a or 1408b and a UWB Subsystem 1410a or 1410b that are tightly coupled with each other in each respective device, as described further herein. As part of the communication between devices A and B, specifically using the "division of labor" between NB and UWB signaling as previously illustrated by FIGS. 11 and 12, the NB Subsystem 1408a of device A 1402 may communicate directly with the NB Subsystem 1408b of device B 1404, and the UWB Subsystem 1410a of device A 1402 may communicate directly with the UWB Subsystem 1410b of device B 1404. In FIG. 14, the NB Subsystems 1408a-b and UWB Subsystems 1410a-b in each device are shown to have their own physical antennas 1412a-b and 1414a-b (e.g., including, for example, a first antenna 1412a of the narrowband system 1408a and a second antenna 1414a of the UWB sub-system 1410a), but it should be understood that a single shared antenna covering both NB and UWB operations may be a suitable implementation, and that a multi-antenna solution may be utilized for such advanced signal processing schemes as antenna diversity, spatial multiplexing, or transmit or receive beamforming.

Figure 15:
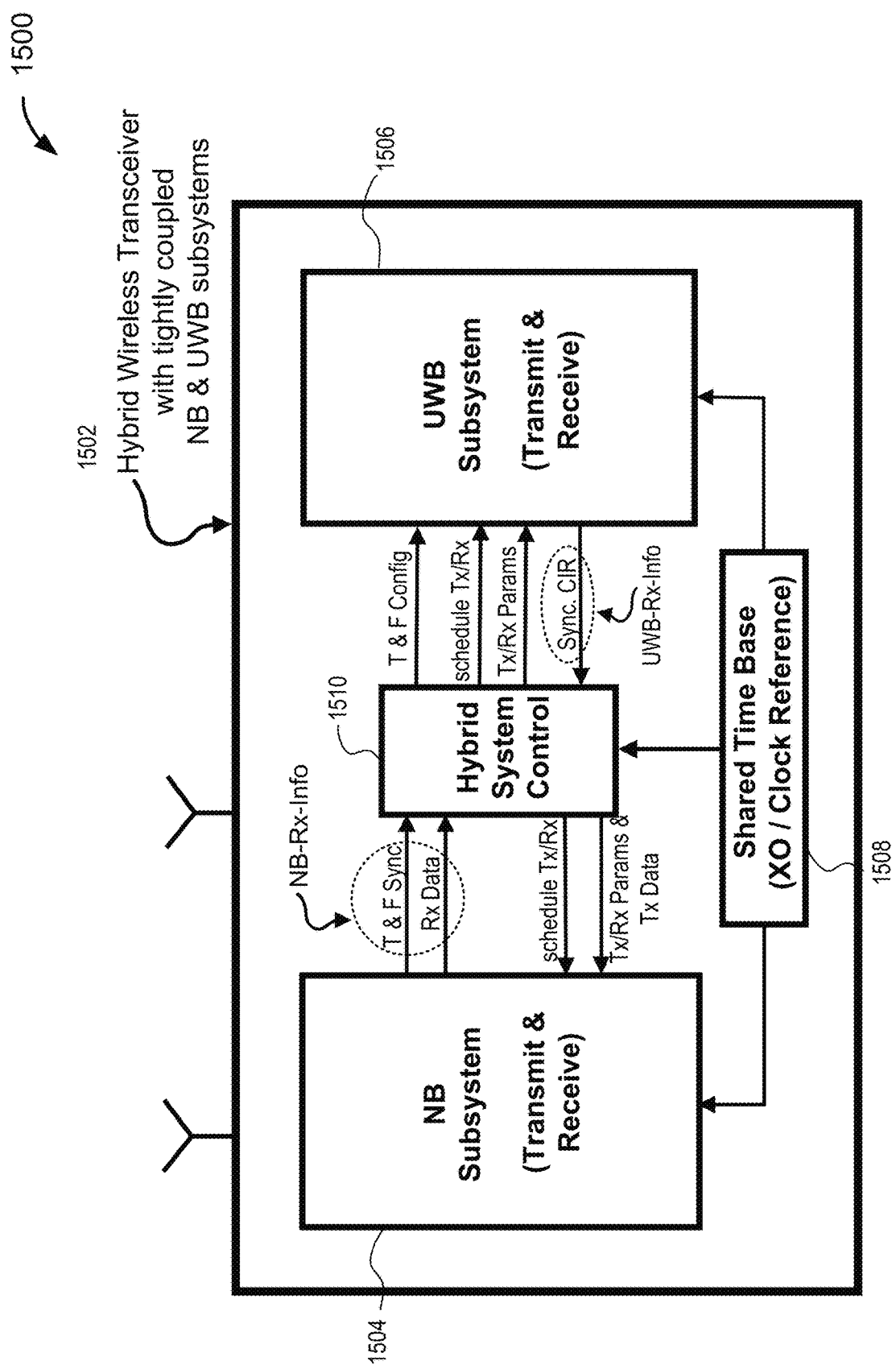
FIG. 15 is another simplified block diagram illustrating a hybrid wireless transceiver of a device that is configured to communicate with another device utilizing a hybrid of UWB signaling and NB signaling, according to some embodiments.

FIG. 15 is another simplified block diagram 1500 illustrating a hybrid wireless transceiver 1502 of a device that is configured to communicate with another device utilizing a hybrid of UWB signaling and NB signaling, according to some embodiments. Diagram 1500 of FIG. 15 provides more detail of the HWT 1502 in each device and illustrates details and functional components of the above mentioned tight coupling between the NB Subsystem 1504 and UWB Subsystem 1506 in the HWT 1502. Each such transceiver includes the NB Subsystem 1504 and the UWB Subsystem 1506, each of which contains wireless transmit and receive circuitry and functionality for the NB and UWB signaling, respectively. The HWT 1502 also has provisions for a Shared Time Base 1508 (e.g., module or unit), which consists of a Crystal Oscillator (XO) and any related clocking and timekeeping apparatus. The Shared Time Base 1508 may enable the NB Subsystem 1504 and the UWB Subsystem 1506 to create signals that are tightly synchronized in time and frequency. That is, if an NB signal operates off the Shared Time Base and has a certain clock frequency and/or carrier frequency imperfection, measured in parts-per-million [ppm] offset, the UWB signal in the same HWT 1502 may exhibit the same reference imperfection in ppm. As the transmit and receive elements of the NB Subsystem 1504 and the UWB Subsystem 1506 of a device may operate off the same Shared Time Base 1508, the clock/carrier offset (in [ppm]) of NB Tx (NB signal transmission), NB Rx (NB signal reception), UWB Tx (UWB signal transmission), and UWB Rx (UWB reception) circuitries may be substantially similar (e.g., identical).

Furthermore, as depicted in FIG. 15, there is a joint controller (Hybrid System Controller (or Control)) 1510 governing the transmit and receive activities of both the NB Subsystem 1504 and the UWB Subsystem 1506 and the information exchange between the NB and UWB systems. In some embodiments, the hybrid system controller 1510 may be used to coordinate transmission or reception activities between a sub-system of a first device and another sub-system of a second device that is a same type as the sub-system of the first device. In some embodiments, the hybrid system controller 1510 may coordinate information exchange between a narrowband sub-system of a first device and an ultra-wideband sub-system of the same (first) device. In some examples, the Control block (e.g., the Hybrid System Controller 1510) may receive Time and Frequency Synchronization ("T & F Sync," or "synchronization data") information from the NB Subsystem. F Sync includes information about the ppm offset the NB estimates, relative to an associated device. T Sync includes information associated with the packet timing on the air, as measured by the NB Subsystem 1504. The Control block may also receive Payload Data information (Rx Data) from the NB Subsystem 1504. The T & F Sync and Rx Data together may be referred to herein as "NB-Rx-Info." The Control block also schedules transmissions and receptions conducted by the NB Subsystem 1504, which may include certain Tx (transmission)/Rx (reception) Parameters utilized by the NB Subsystem 1504, and possibly Payload Tx Data.

The Control block also provides Time & Frequency (T & F) configuration information to the UWB Subsystem 1506. This helps to more precisely set up the UWB receiver based on the T & F information extracted from the NB signaling. Since the Time Base 1508 is shared between the NB Subsystem 1504 and the UWB Subsystem 1506, including any frequency offsets relative to an associated device, this configuration helps tailor the UWB reception for the incoming UWB signals and maximize the performance for the CIR estimation based on the CIRTS fragments. The Control block also uses the NB Rx-Info to schedule the UWB Tx and Rx activities based on certain Tx/Rx Params (such as carrier frequency or UWB bandwidth). In turn, the Control block also receives UWB-Rx-Info comprising Synchronization (Time/Frequency Sync) and CIR information.

Figure 16:
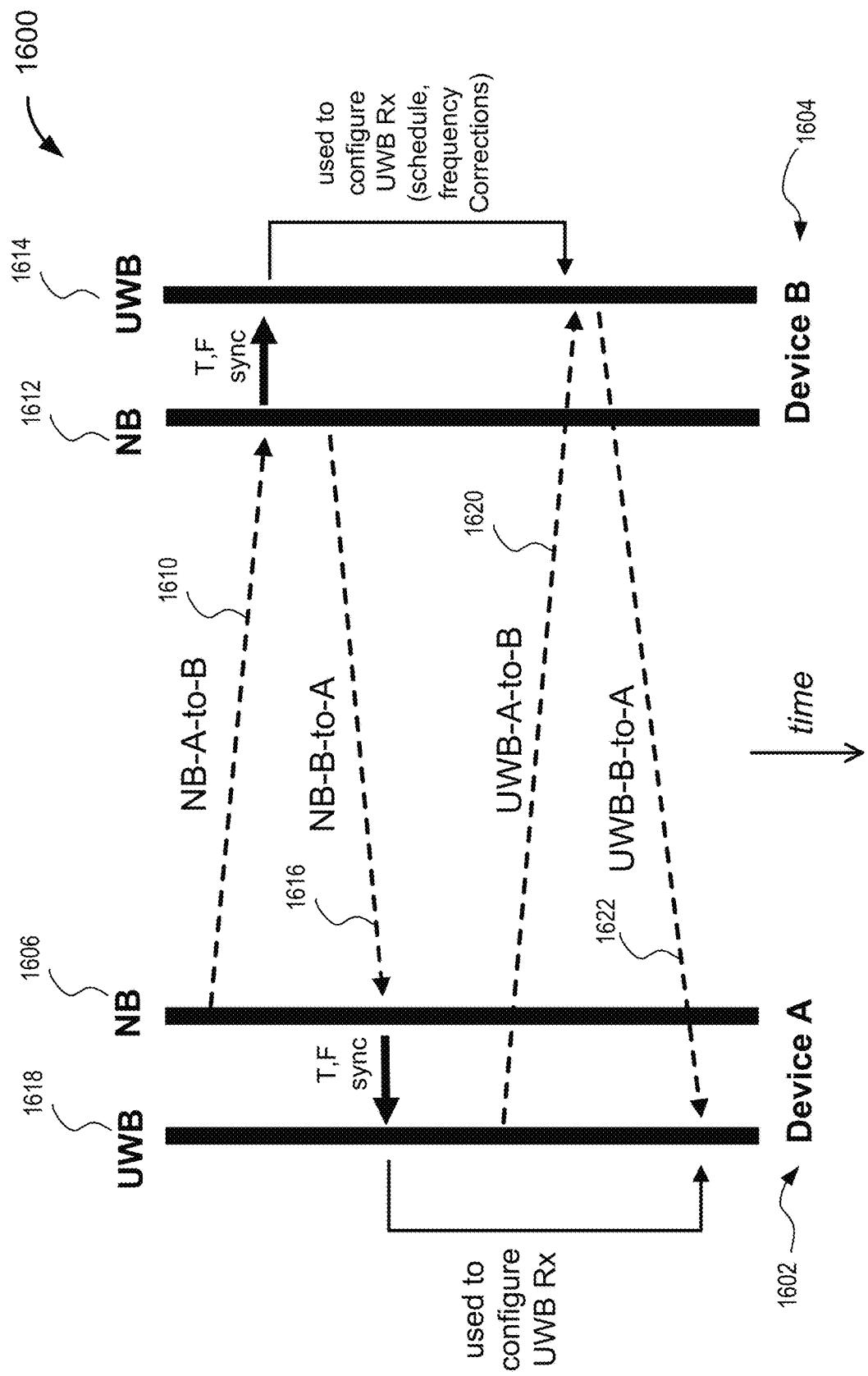
FIG. 16 is a simplified flow diagram illustrating an exchange of signals between two devices, according to some embodiments.

FIG. 16 is a simplified flow diagram 1600 illustrating an exchange of signals between two devices, according to some embodiments. Diagram 1600 of FIG. 16 shows a signal and control flow diagram of an exchange between two associated HWT's that respectively use the HWT structure outlined herein (e.g., in reference to FIGS. 14 and 15, described above). The dashed arrows represent wireless exchanges between device A 1602 and device B 1604, while the solid arrows represent signals being exchanged inside each HWT (in device A 1602 or device B 1604). Note that for clarity of illustration, the Control block is not explicitly illustrated in diagram 1600. The NB sub-system 1606 in device A 1602 transmits an NB packet "NB-A-to-B" 1610 to the NB Subsystem 1612 in device B 1604. The latter extracts T & F Sync information (e.g., which may be otherwise referred to as "synchronization data") and provides this information to the UWB Subsystem 1614 for later use. For example, the synchronization data may be used to schedule, configure, and/or receive subsequent UWB fragments from device A 1602, as described further below. The NB Subsystem 1612 of Device B 1604 responds with its own NB packet "NB-B-to-A" 1616 back to device A, 1602 which in turn extracts the T & F Sync information from that and provides it to its local UWB Subsystem 1618 for later use. Subsequently, the UWB Subsystem 1618 in device A 1602 sends a UWB transmission "UWB-A-to-B" 1620 (notably, a CIRTS or series of CIRTS fragments) to the UWB Subsystem 1614 in device B 1604. As described above, device B 1604 may be able to efficiently determine when to expect the UWB transmission(s) from device A 1602 based in part on the previously stored T & F sync extracted from the NB packet reception. That is, the UWB Subsystem 1614 in Device B 1604 has a more accurate understanding of when to expect the UWB signal from Device A 1602 and what ppm offset it will have, which it can use to minimize signaling processing effort and maximize performance of receive algorithms and associated receive circuitry. Device B 1604 then transmits a UWB response "UWB-B-to-A" 1622, which Device A 1602 may receive in a targeted fashion with higher efficiency and precision, based on the T & F sync information obtained during the reception of the "NB-B-to-A" 1616 packet. In some embodiments, the exchange "UWB-A-to-B" 1620 and "UWB-B-to-A" 1622 may be a TOF measurement, as per FIG. 5.

In some embodiments, the T & F synchronization information extracted from the respective NB signals may be of high quality, as the NB signaling may be subject to less stringent transmit emission rules. Accordingly, the Signal-to-Noise ratio (SNR) at the receiver side of an NB transmission may be higher and allow more efficient and accurate acquisition. The T & F processing in the NB subsystems is also low-complexity and low power as compared to UWB sub-systems, at least because the sample rates are generally lower than in the UWB sub-systems. Meanwhile, the "NB-assisted" reception of the UWB CIRTS fragments will be high quality (and high SNR) due to the aggregation of energy from multiple fragments, so that a high accuracy CIR extraction and corresponding positioning/ranging functionality is made possible. This "division of labor" between the NB and UWB sub-systems enable an improved operating range and operating efficiency when compared to other UWB systems.

It should be understood that, although various modules (e.g., components, and/or associated functionality) are described as being separate from other modules, embodiments should not be construed to be so limited. For example, FIG. 15 depicts the Hybrid System Controller as being a separate module from the Shared Time Base unit, each of which are both separate from the NB sub-system and the UWB sub-system. However, in some embodiments, the Shared Time Base module and/or the Hybrid System Control module may reside within one of the sub-systems (NB or UWB). In this case, the respective other subsystem could benefit from the control and time base functionality as a secondary or agent system (e.g., a delegate and/or subservient system). In any case, different distributions and/or aggregations of features between different modules may enable hybrid signaling to be performed, as described in embodiments herein. It should also be understood that the signal exchanges illustrated in FIGS. 16 and 17 (described further below) illustrated a particular type of signal exchange for a Hybrid Wireless System consisting of NB and UWB subsystems. Other types of signal exchanges via other hybrid protocols are described further herein. These protocols correspond to different arrangements of NB and UWB transmissions, while still employing a hybridized signaling approach, utilizing devices (e.g., initiator and responder devices) that respectively include a HWT.

Figure 17:
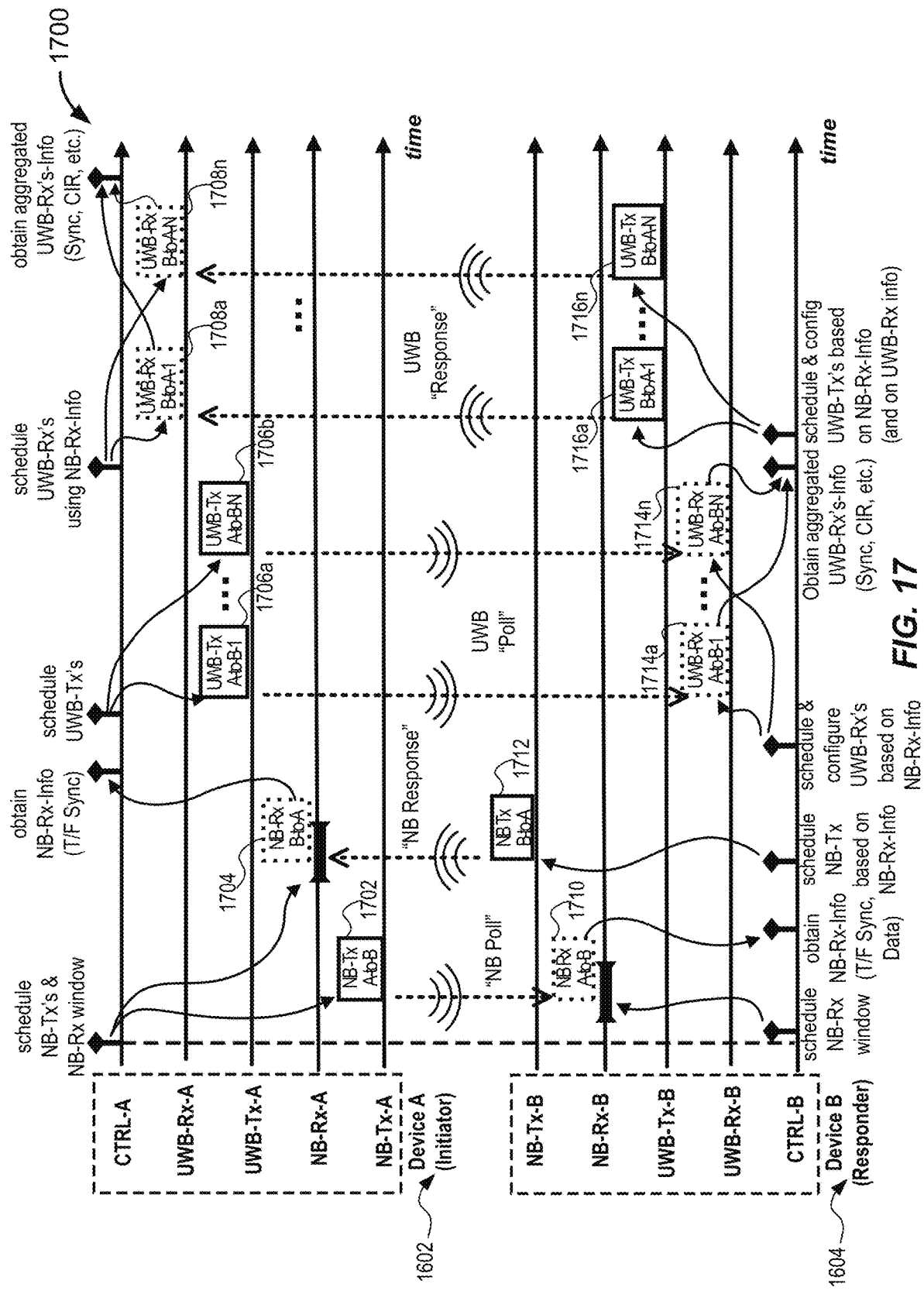
FIG. 17 is another simplified flow diagram illustrating an exchange of signals between two devices, according to some embodiments.
Figure 18:
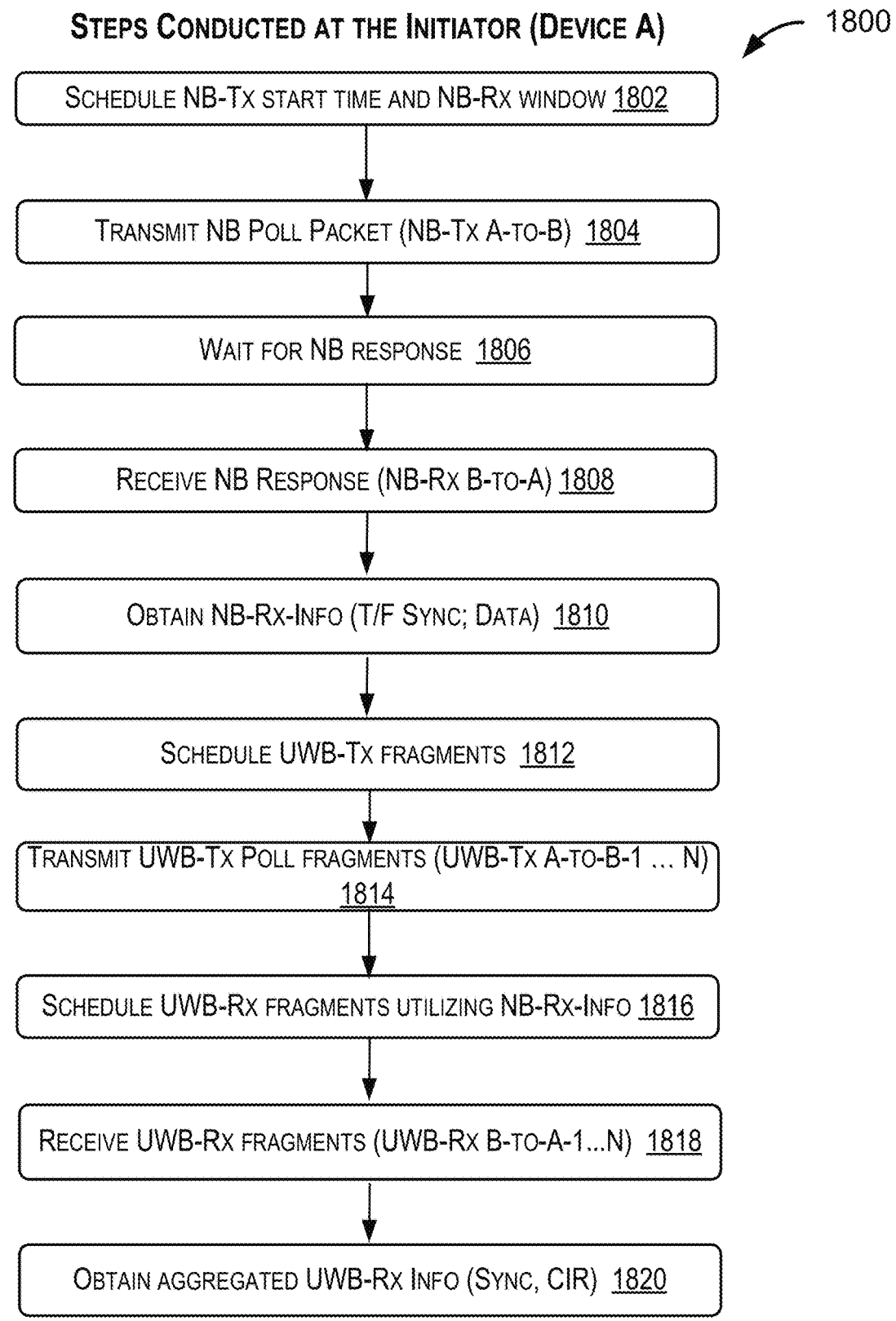
FIG. 18 is another simplified flow diagram illustrating an example process conducted by an initiator device, according to some embodiments.
Figure 19:
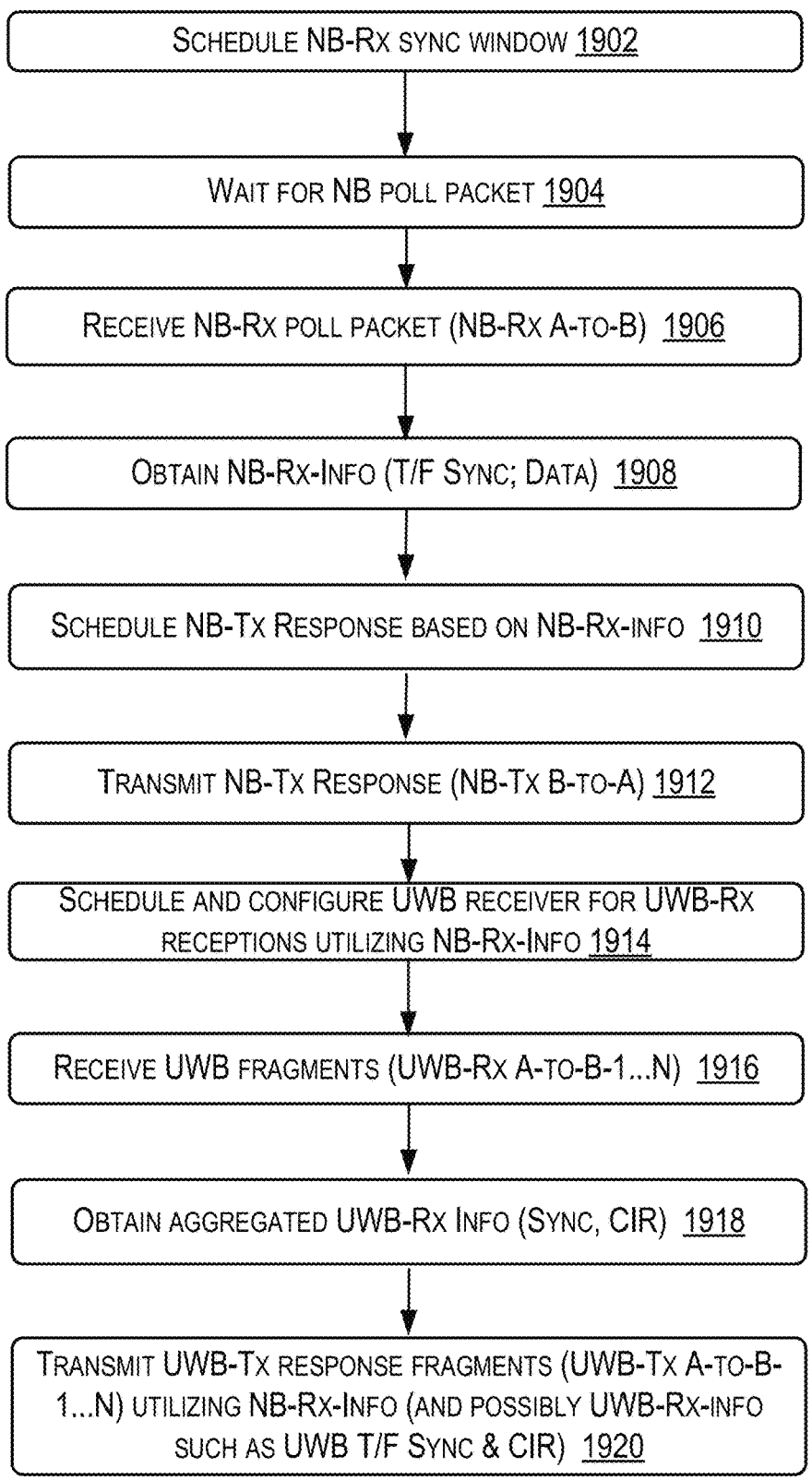
FIG. 19 is another simplified flow diagram illustrating an example process conducted by a responder device, according to some embodiments.

FIG. 17 is another simplified flow diagram 1700 illustrating an exchange of signals between two devices, according to some embodiments. Diagram 1700 of FIG. 17 is a more detailed diagram of an example signal flow between and within the HWT's in devices A and B (e.g., device A 1602 and device B 1604 of FIG. 16). Additionally, FIGS. 18 and 19 illustrate flow diagrams of the processing steps conducted by respective devices, where device A 1602 is referred to as the "Initiator" device (or "first device") and device B 1604 is referred to as the "Responder" device (or "second device"). Accordingly, descriptions of the processing steps conducted by each device may refer to FIG. 17 for further illustration of the signal exchange process. It should be understood that, in some embodiments, an initiator device may alternatively operate as a responder device, and similarly, a responder device may alternatively operate as an initiator device, depending on the context.

Turning to the processing steps of device A (e.g., device A 1602) in further detail as depicted by process 1800 of FIG. 18, at block 1802, the first device may schedule an NB-Tx start time and an NB-Rx window. In some embodiments, operations of this block may be conducted by a wireless system of the first device that is separate from the HWT. For example, the wireless system may utilize a Bluetooth/BLE protocol. In some embodiments, operations of this block may be performed within an initial phase of the process 1800. The wireless system may be responsible for one or more operations of the initial phase that includes handling advertising and/or scanning (e.g., device discovery), performing a "coarse synchronization" with the responder device B (e.g., device B 1604), and/or performing other connection setup steps with device B 1604 (e.g., the second device). As described further herein, in some embodiments, the separate wireless system may be responsible for communicating NB control information, including, for example, what channels and/or how many hopping channels to use for NB signaling. In some embodiments, a start time (e.g., a discrete time instant) may be scheduled for transmitting an NB poll packet to the second device, and a time window may be scheduled for receiving an NB response packet from the second device. In some embodiments, the coarse synchronization may enable the respective timekeeping apparatuses of the devices to be synchronized to be within approximately 1 ms delta of each other. This initial coarse synchronization may enable a subsequent "fine" synchronization via exchange of NB signals, described further below.

At block 1804, the first device may transmit an NB poll packet (depicted in FIG. 17 as NB-Tx A-to-B 1702) to device B 1604 via a narrowband signal at the scheduled start time. The poll packet may convey synchronization data (e.g., time and frequency synchronization data) that may be subsequently used by the second device to schedule reception of a plurality of fragments, respectively, via an ultra-wideband signal.

At block 1806, the first device may wait for an NB response packet, for example, which may be expected to be received by the first device from the second device at the during the scheduled window (e.g., a time interval).

At block 1808, the first device may receive the NB response packet (depicted in FIG. 17 as NB-Rx B-to-A 1704). For example, the first device may initiate reception of the NB response packet via the narrowband signal during the scheduled window.

At block 1810, the first device may obtain NB-Rx-Info from the NB response packet. As described herein, this may include second synchronization data (e.g., time and frequency synchronization data), which may be used by the first device to schedule reception of a second plurality of fragments that is subsequently received by the first device from the second device.

At block 1812, the first device may schedule a transmission of the plurality of fragments (UWB-Tx fragments 1706a-n). In some embodiments, this scheduling may be in accordance with the synchronization data that was conveyed to and obtained by the second device from the NB transmission from the first device to the second device (e.g., at block 1804), which, in turn, may be used by the second device to schedule and assist in the reception of the plurality of fragments 1706a-n.

At block 1814, the first device may transmit a UWB poll packet to the second device in the form of the plurality of fragments (depicted in FIG. 17 as UWB-Tx A-to-B-1 . . . UWB-Tx A-to-B-N 1706a-n). As described herein, each fragment of the plurality of fragments 1706a-n may be time-spaced from other fragments of the plurality of fragments 1706a-n by at least a predefined time interval. In some embodiments, this time interval may be determined in part based on regional regulatory rules that govern signal emissions.

At block 1816, the first device may schedule reception of the second plurality of fragments based on the second synchronization data (e.g., from the NB-Rx-Info) that was obtained at block 1810.

At block 1818, the first device may receive the second plurality of fragments from the second device (depicted in FIG. 17 as UWB-Rx B-to-A-1 . . . UWB-Rx B-to-A-N 1708a-n).

At block 1820, the first device may obtain aggregated UWB-Rx-Info from the second plurality of fragments. In some embodiments, this may include synchronization data and/or other data which may be used to determine a CIR (e.g., a CIR estimate). As described herein (e.g., with respect to FIG. 3), the CIR estimate may be associated with a LOS path between the first device and the second device. As described herein, the CIR may be used to determine a TOF interval, which in turn may enable ranging and/or positioning may be determined by the first device (e.g., relative to the second device). For example, the first device may determine a turnaround time interval that represents a time interval between the time the plurality of fragments was received by the second device and the time the second plurality of fragments was transmitted by the second device to the first device (see. FIG. 5). In some embodiments, the first device may know this turnaround time interval in advance (e.g., a fixed time interval). In some embodiments, the first device may not know this turnaround time interval in advance, and may subsequently receive an NB signal from the second device that communicates this information. See, for example, FIG. 30, described further herein. In any case, the first device may the compute the TOF by accounting for (e.g., subtracting) the turnaround time from the TOF flight, as described with respect to FIG. 5.

As introduced above, FIG. 19 is another simplified flow diagram illustrating an example process conducted by a responder device, according to some embodiments. Similar to the description of the initiator device of FIG. 18, descriptions of the processing steps conducted by the responder device in FIG. 19 may refer to FIG. 17 (e.g., with device B 1604 operating as the responder device) for further illustration of the signal exchange process. Note that the processing steps of FIG. 19 may correspond to a counterpart of the processing steps of FIG. 18 (e.g., from the responder device point of view).

Turning to the processing steps of device B 1604 (which may be referred to as the "second device") in further detail as depicted by process 1900 of FIG. 19, at block 1902, the second device may schedule an NB-Rx time. In some embodiments, operations of block 1902 may be similar to those of block 1802. For example, a wireless system of the second device may perform a coarse synchronization with a first device (e.g., the initiator device A 1602 of FIGS. 17 and 18).

At block 1904, the second device may wait for an NB poll packet from the first device. For example, the NB poll packet may have been transmitted at block 1804 of process 1800.

At block 1906, the second device may receive the NB poll packet from the first device (depicted in FIG. 17 as NB-Rx A-to-B 1710).

At block 1908, the second device may obtain NB-Rx-Info from the NB poll packet. As described herein, this may include extracting synchronization data (e.g., time and frequency synchronization data and/or scheduling information), which may be used by the second device to schedule and/or assist in reception of a plurality of fragments via UWB signals that is subsequently received by the second device from the first device. In some embodiments, the NB-Rx-Info may also contain data that is used to schedule transmission of an NB response packet (e.g., at a second start time). In some embodiments, data from the NB-Rx-Info may be used for other purposes (e.g., status reporting, etc.).

At block 1910, the second device may schedule transmission of the NB response packet (e.g., at the second start time). As described above, in some embodiments, the scheduling may be based on the NB-Rx-Info obtained at block 1908. In some embodiments, the scheduling may be performed independent of data in the NB-Rx-Info.

At block 1912, the second device may transmit the NB response packet to the first device (depicted in FIG. 17 as NB-Tx B-to-A 1712), for example, at the second start time previously scheduled.

At block 1914, the second device may schedule and configure the UWB receiver (e.g., UWB sub-system) for UWB-Rx receptions of the plurality of fragments based on the synchronization data received at block 1908. Here, the NB-Rx-Info may also be used to configure the UWB receiver before and for the reception of the UWB signals, in particular one or more of correction for Carrier Frequency Offset, Sampling Frequency Offset, Carrier Phase, and Sample Phase.

At block 1916, the second device may receive UWB fragments (depicted in FIG. 17 as UWB-Rx A-to-B-1 . . . UWB-Rx A-to-B-N 1714a-n). These UWB fragments may be the UWB poll packets being transmitted at block 1814 of FIG. 18.

At block 1918, the second device may obtain aggregated UWB-Rx-Info. In some embodiments, operations of this block may be similar to those of block 1820. In this case, the second device may obtain synchronization data and/or other data which may be used to determine a CIR.

At block 1920, the second device may schedule, configure, and transmit UWB-Tx response fragments (depicted in FIG. 17 as UWB-Tx B-to-A-1 . . . UWB-Tx B-to-A-N 1716a-n). In some embodiments, the response fragments may correspond to a plurality of fragments (e.g., the second plurality of fragments of process 1800 that are received by the first device from the second device at block 1818). In some embodiments, scheduling transmission of the plurality of fragments may be based in part on the NB-Rx-Info (e.g., obtained at block 1908) and/or UWB-Rx-Info (e.g., obtained at block 1918, including UWB time/frequency synchronization data, CIR, etc.). In some embodiments, the second device may further be able to perform ranging and/or positioning, similar to as described with respect to the first device. For example, the second device may determine a turnaround time and/or timestamp information that enables it to determine a TOF/range information (see Option-2 of FIG. 28, described further herein).

In some embodiments, with respect to embodiments of FIGS. 17, 18, and 19, the number of UWB fragments in the forward (A-to-B "Poll") direction may be identical to the number of UWB fragments in the reverse (B-to-A "Response") direction, namely N. In some embodiments, the number of fragments utilized for the forward and reverse directions may differ, and can be given as Nf and Nr for the forward and reverse directions, respectively.

Figure 20:
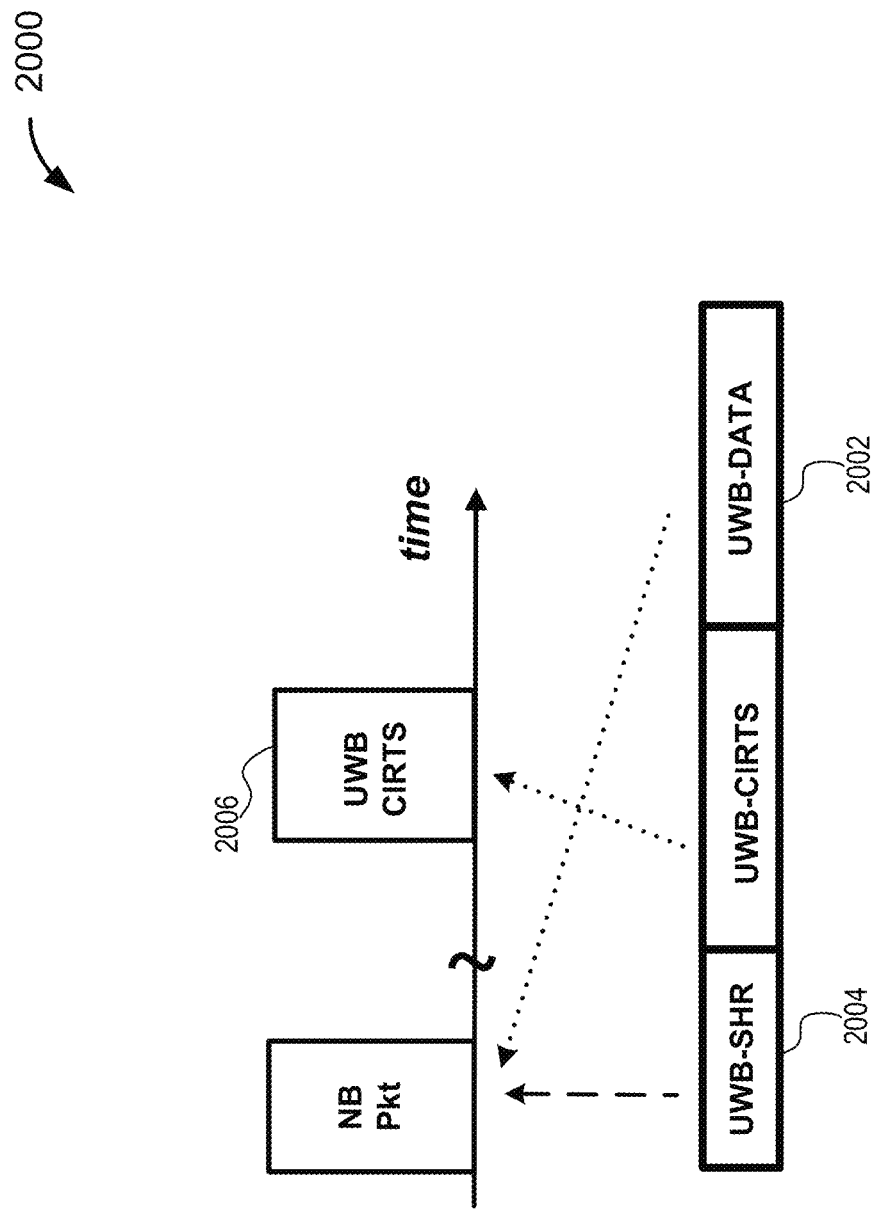
FIG. 20 is another simplified block diagram illustrating utilizing NB signaling to transmit UWB payload data, according to some embodiments.

FIG. 20 is another simplified block diagram 2000 illustrating utilizing NB signaling to transmit UWB payload data, according to some embodiments. Diagram 2000 depicts an embodiment where UWB payload data 2002, as applicable and beneficial in some standard based UWB packet formats (e.g., see FIG. 4), joins the SHR 2004 in being handled by the NB signaling layer. In some embodiments, the NB subsystem with its associated signaling can help coordinate devices A and B in terms of various management and maintenance purposes such as mutual transmission of status information, as described further herein. In some embodiments, payload data of a UWB packet 2006 may also be transmitted via a plurality of fragments, similar to as described in reference to transmission of the CIRTS via UWB fragments.

Figure 21:
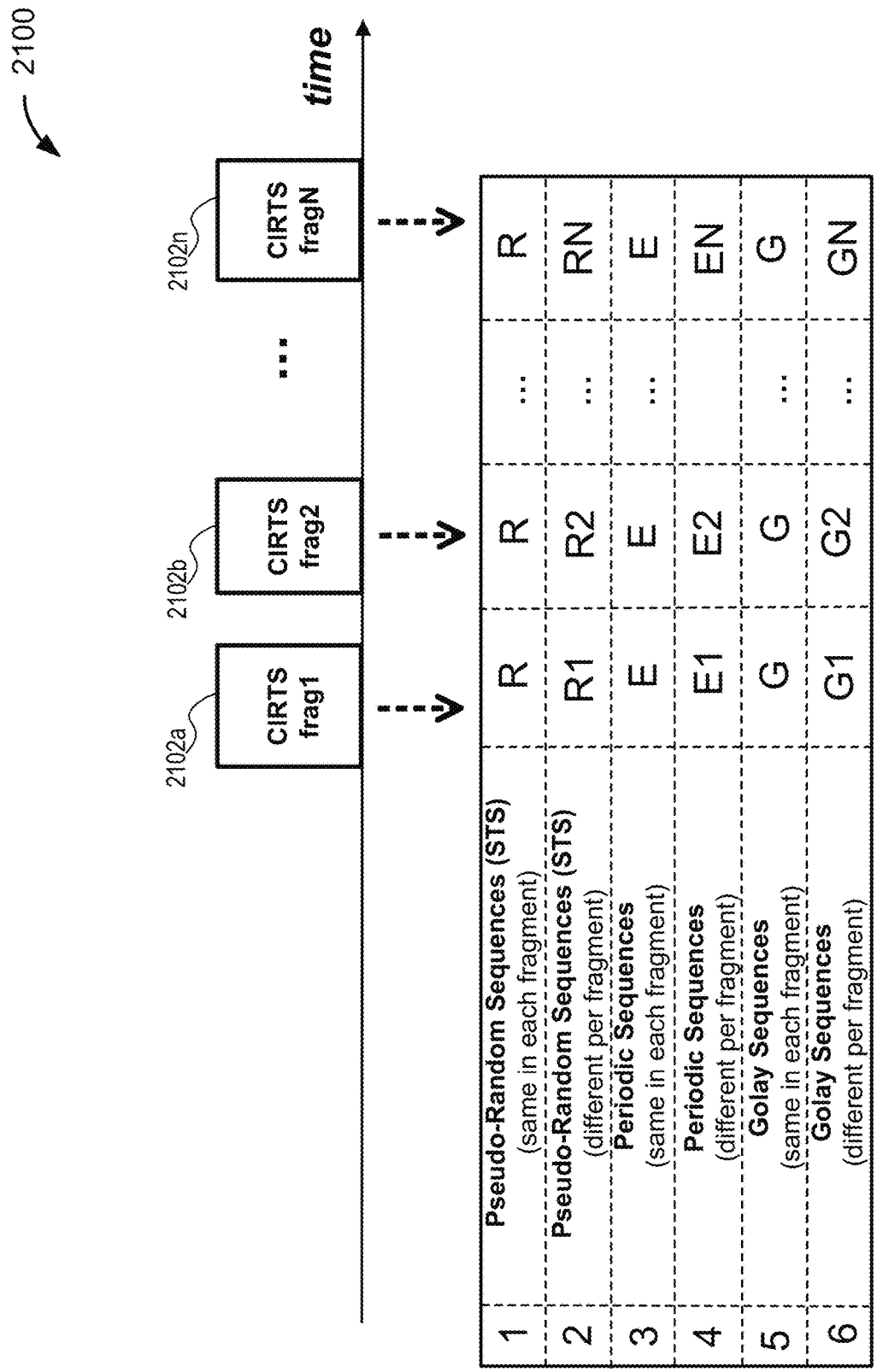
FIG. 21 is another simplified block diagram illustrating example waveforms that may be contained in one or more fragments transmitted by a UWB signaling layer of a device, according to some embodiments.

FIG. 21 is another simplified block diagram 2100 illustrating example waveforms that may be contained in one or more fragments transmitted by a UWB signaling layer of a device, according to some embodiments. Diagram 2100 of FIG. 21 illustrates details of the IR waveform contained in each CIRTS fragment 2102a-n utilized in the UWB signaling layer. Specifically, it lists various types of sequences that can be used to determine the polarities of UWB IR pulses in each CIRTS fragment 2102. In 802.15.4z compliant packet formats (see FIG. 4), pulse polarity sequences to represent the CIRTS are based on Cryptographically Secure Pseudo-Random Generator (CSPRNG) based sequences utilized for the STS portion of the packet. The case where the same CSPRNG type sequence "R" is used for each segment (e.g., fragment 2102) is illustrated as row 1 in the Table in FIG. 21. Row 2 shows an embodiment where a different CSPRNG polarity sequence ("R1", "R2" . . . ) determines the IR pulse polarities per segment. Row 3 represents an embodiment where a given CIRTS fragment 2102 is composed of a periodically repeating short sequence, a concept used for traditional ternary Ipatov preamble sequences in IEEE 802.15.4 UWB. Note that such a periodic sequence "E" may use Ipatov sequences or other periodic sequences where each CIRTS fragment 2102 consists of a series (periodic repetition) of a given base sequence. In Row 3 of the Table, the same periodic sequence "E" is used for each CIRTS fragment 2102, while in Row 4, a different periodic sequence ("E1", "E2", . . . ) may be used per CIRTS fragment 2102. In Row 5 and 6, Golay waveforms are used in each of the fragments. A Golay waveform consists of a pair of sequences transmitted in succession which, together, have highly accurate autocorrelation properties. One or more Golay pairs, with guard (silence) intervals between them long enough to cover the length of the expected CIR, can be used to represent "G" in each fragment 2102. A different choice of Golay pairs (one or more pairs per fragment 2102) can be used across the N fragments 2102, such as "G1", "G2", . . . "GN." One specific embodiment using Golay sequences uses multiple Golay pairs per each fragment 2102, where all of the pairs in a given fragment are based on the same pair, so that the fragment 2102 contains a periodic sequence each period of which is given by one and the same Golay pair. In this latter embodiment, again, the fragments 2102a-n can utilize the same period sequence or Golay based periodic sequences that differ from fragment to fragment.

As described herein, embodiments describe a tight coupling of NB and UWB sub-systems to improve effective operating range. As described further herein, there may be several protocol variants that utilize hybrid signaling via a tight coupling of NB and UWB sub-systems to achieve improved operating range and/or efficiency.

Figure 22:
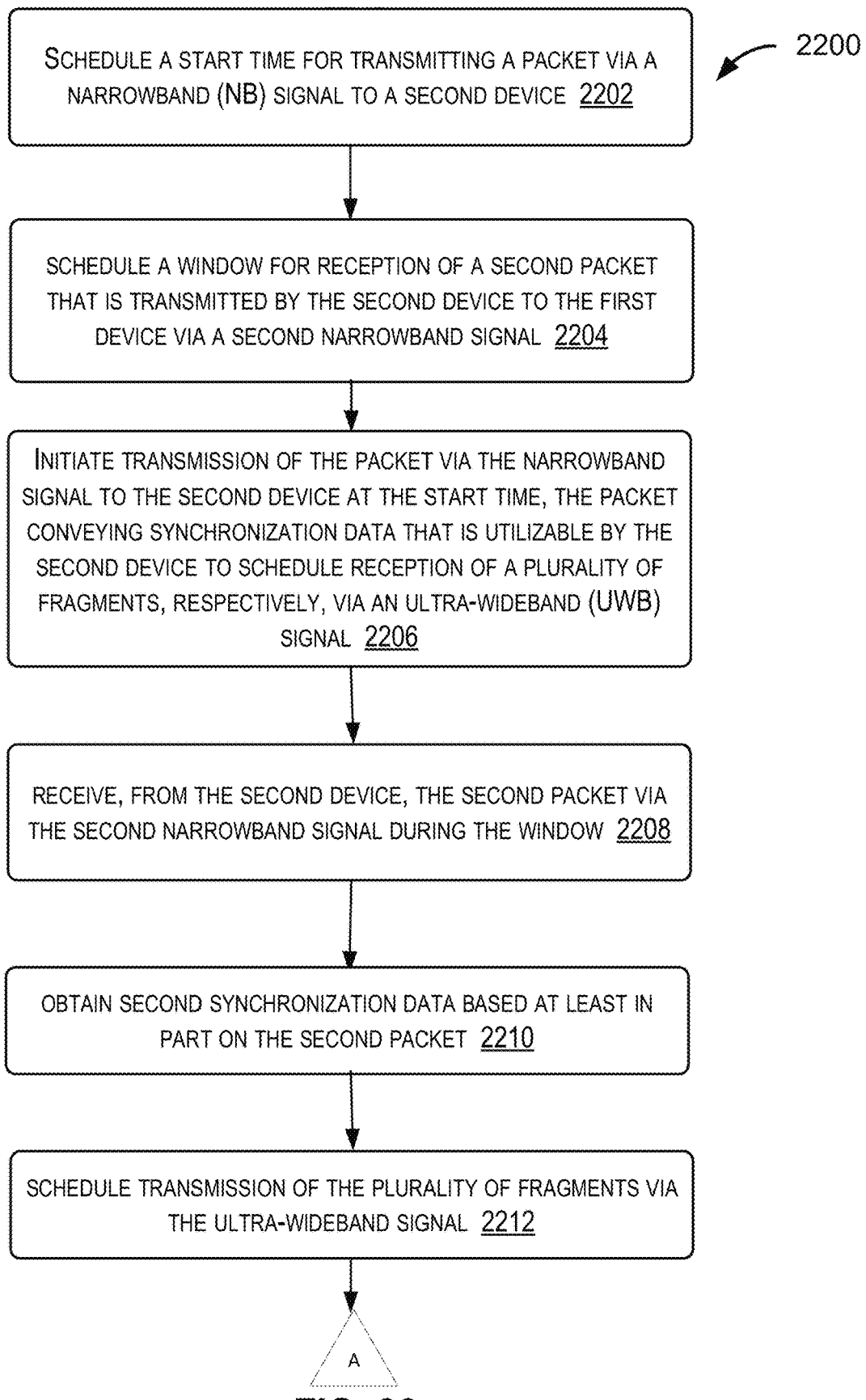
FIG. 22 is another simplified block diagram illustrating a first portion of an example process conducted by a device for hybrid signaling, according to some embodiments.
Figure 23:
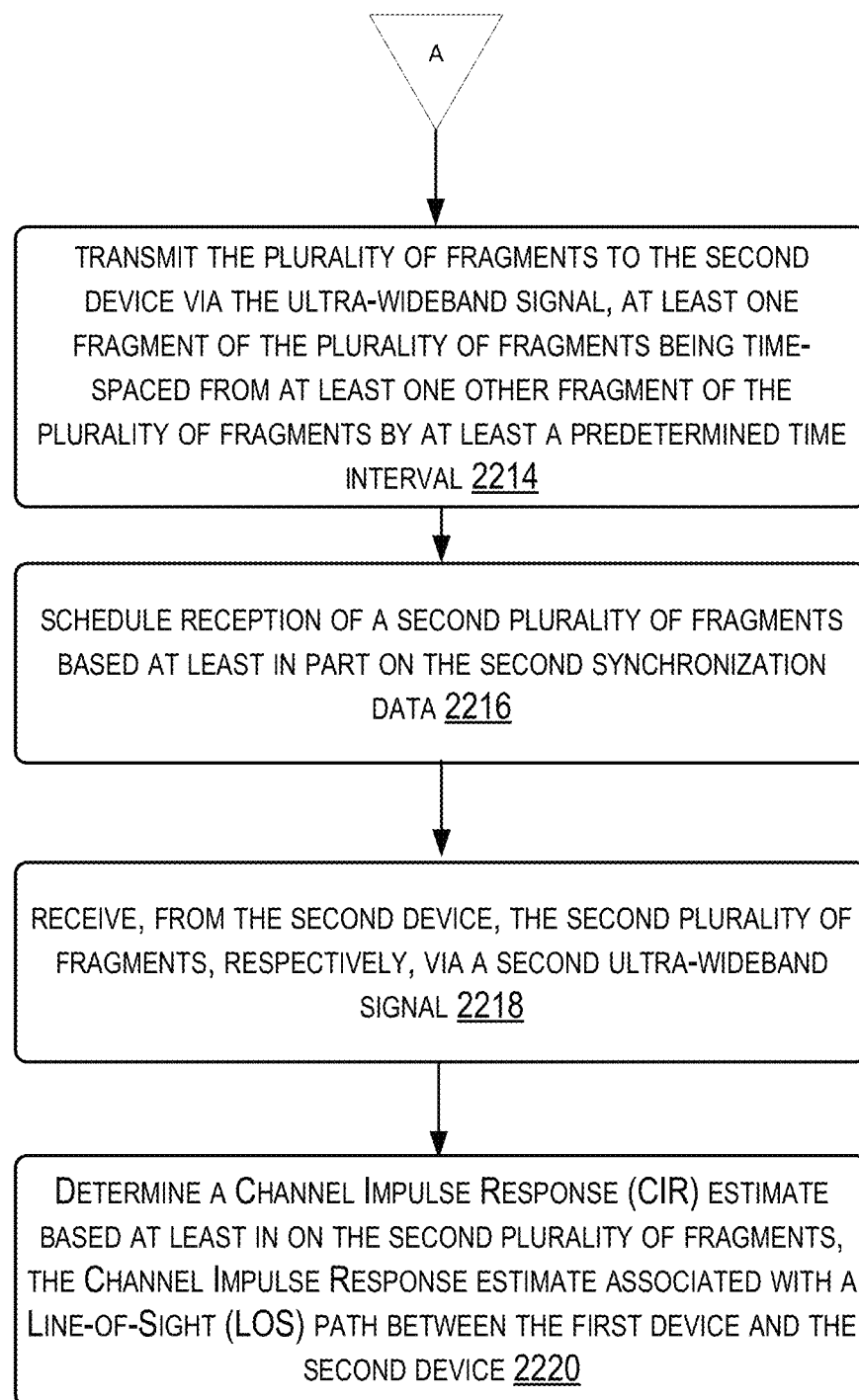
FIG. 23 is another simplified block diagram that illustrates a remainder portion of the example process of FIG. 22, according to some embodiments.

FIG. 22 is another simplified flow diagram illustrating a first portion of an example process conducted by a device for hybrid signaling, according to some embodiments. In some embodiments, the process 2200 of FIG. 22 and FIG. 23 corresponds to a process for determining a CIR estimate by an initiator device. (Note that blocks of FIG. 23 are a continuation of the process 2200 of FIG. 22.). In some embodiments, this process may be similar to the process 1800 of FIG. 18, performed by an initiator. Process 2200 (and other process flows described herein) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. In some embodiments, any one or more of the flows described herein may be implemented by a hybrid wireless system, for example, comprising the hybrid wireless transceiver described in reference to FIG. 14 and/or FIG. 15.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some embodiments, process 2200 may be performed by an initiator device (e.g., a "first device") that exchanges one or more signals with a responder device (e.g., a "second device") counterpart. As described herein, it should be understood that a device may operate as an initiator (device) and/or a responder (device), depending on the context. Accordingly, for example, one or more operations of the process 2200 may also be applicable (e.g., similar) to the first device that is operating as a responder device.

Turning to process 2200 in further detail, at block 2202, a first device (initiator) may schedule a start time (e.g., a discrete time) for transmitting a packet via a narrowband (NB) signal to a second device (responder). In some embodiments, one or more operations of block 2202 may be similar to operations of block 1802 of FIG. 18.

At block 2204, the first device may schedule a window for reception of a second packet that is transmitted by the second device to the first device via a second narrowband signal. In some embodiments, one or more operations of block 2204 may be similar to operations of block 1802 of FIG. 18.

At block 2206, the first device may transmit the packet via the narrowband signal to the second device at the start time.

In some embodiments, the packet may comprise data indicating to the second device, for example, a time period for reception of a plurality of fragments. For example, the packet may convey synchronization data that is utilizable by the second device to schedule and/or assist reception of a plurality of fragments, respectively, via an ultra-wideband (UWB) signal. In some embodiments, one or more operations of block 2206 may be similar to operations of block 1804 of FIG. 18.

At block 2208, the first device may receive, from the second device, the second packet via the second narrowband signal during the window. In some embodiments, one or more operations of block 2208 may be similar to operations of block 1808 of FIG. 18.

At block 2210, the first device may obtain (e.g., extract) second synchronization data based at least in part on the second packet (e.g., a sync header and/or data payload of the second packet). In some embodiments, one or more operations of block 2210 may be similar to operations of block 1810 of FIG. 18.

At block 2212, the first device may schedule transmission of the plurality of fragments via the ultra-wideband signal. In some embodiments, this scheduling may be performed in accordance with the synchronization data previously conveyed to the second device (e.g., at block 2206, including scheduling information). In some embodiments, one or more operations of block 2212 may be similar to operations of block 1812 of FIG. 18.

Continuing with block 2214 in FIG. 23, the first device may transmit the plurality of fragments to the second device via the ultra-wideband signal. In some embodiments, at least one fragment of the plurality of fragments may be time-spaced from at least one other fragment of the plurality of fragments by at least a predetermined time interval. In some embodiments, one or more operations of block 2214 may be similar to operations of block 1814 of FIG. 18.

At block 2216, the first device may schedule reception of a second plurality of fragments based at least in part on the second synchronization data. In some embodiments, one or more operations of block 2216 may be similar to operations of block 1816 of FIG. 18.

At block 2218, the first device may receive, from the second device, the second plurality of fragments, respectively, via a second ultra-wideband signal. In some embodiments, one or more operations of block 2218 may be similar to operations of block 1818 of FIG. 18.

At block 2220, the first device may determine a Channel Impulse Response (CIR) estimate based at least in on the second plurality of fragments. In some embodiments, the Channel Impulse Response estimate may be associated with a Line-of-Sight (LOS) path between the first device and the second device. In some embodiments, one or more operations of block 2220 may be similar to operations of block 1820 of FIG. 18.

Figure 24:
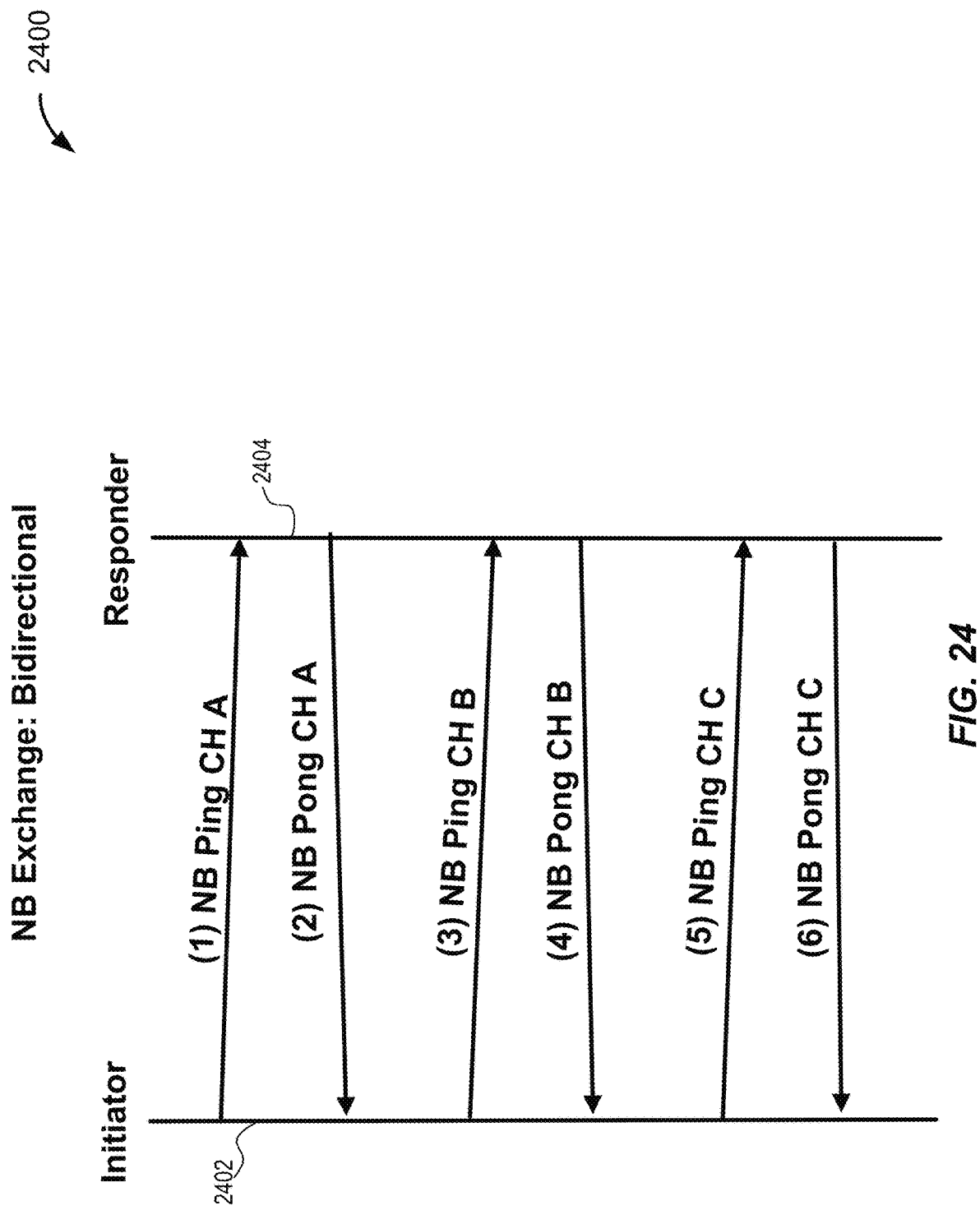
FIG. 24 is another simplified flow diagram illustrating signal transmissions according to a bi-directional redundant packet exchange protocol utilizing one or more NB channels, according to some embodiments.

FIG. 24 is another simplified flow diagram 2400 illustrating signal transmissions according to a bi-directional redundant packet exchange protocol utilizing one or more NB channels, according to some embodiments. Using a redundant/duplicate NB packet exchange (e.g., in reference, for example to block 1804 of FIG. 18 and/or block 1912 of FIG. 19) with a pseudo-random channel hopping sequence may improve reliability against interference and/or multi-path fading phenomena. Diagram 2400 of FIG. 24 depicts an instance of this scheme with three redundant transmissions using pseudo-random channels. The term "channel" here refers to a specific wireless spectral location at which the NB is transmitted, such as a carrier frequency in units GHz (such as e.g. 2.450 or 5.806 GHz or 5.912 GHz) around which the NB signal centered with its specific spectral bandwidth (such as 1 MHz or 2 MHz or several hundred kHz). Certain channels can be congested by other wireless users or suffer from signal fading as is common on wireless communication in multipath environments, and "hopping" over channels can help reduce packet losses due to these phenomena. The initiator 2402 (e.g., one of the initiator devices described herein) initiates the first message within an initiation packet and the responder 2404 attempts to receive the same. In some embodiments, this scheme can further be optimized to save power by using the following rules: (a) The initiator 2402 can skip rest of the NB exchange if it receives ANY of (2), (4) and (6); (b) The responder 2404 shall always listen for (1), (3) and (5), but transmit (2), (4) and/or (6) only if its immediately preceding reception was successful. This scheme may be called Bidirectional NB exchange since both sides exchange the NB packets. This protocol may be useful if a following tightly coupled UWB exchange also involves bidirectional messages/fragments (e.g., as depicted by FIG. 17). As described herein, the NB redundancy and channel hopping configuration can be exchanged out-of-band (OOB) using a device radio frequency (RF) protocol. In some embodiments, a separate (e.g., OOB) wireless system from the HWT on the device may be used to coordinate NB control information (e.g., utilizing Bluetooth/BLE during connection setup).

Figure 25:
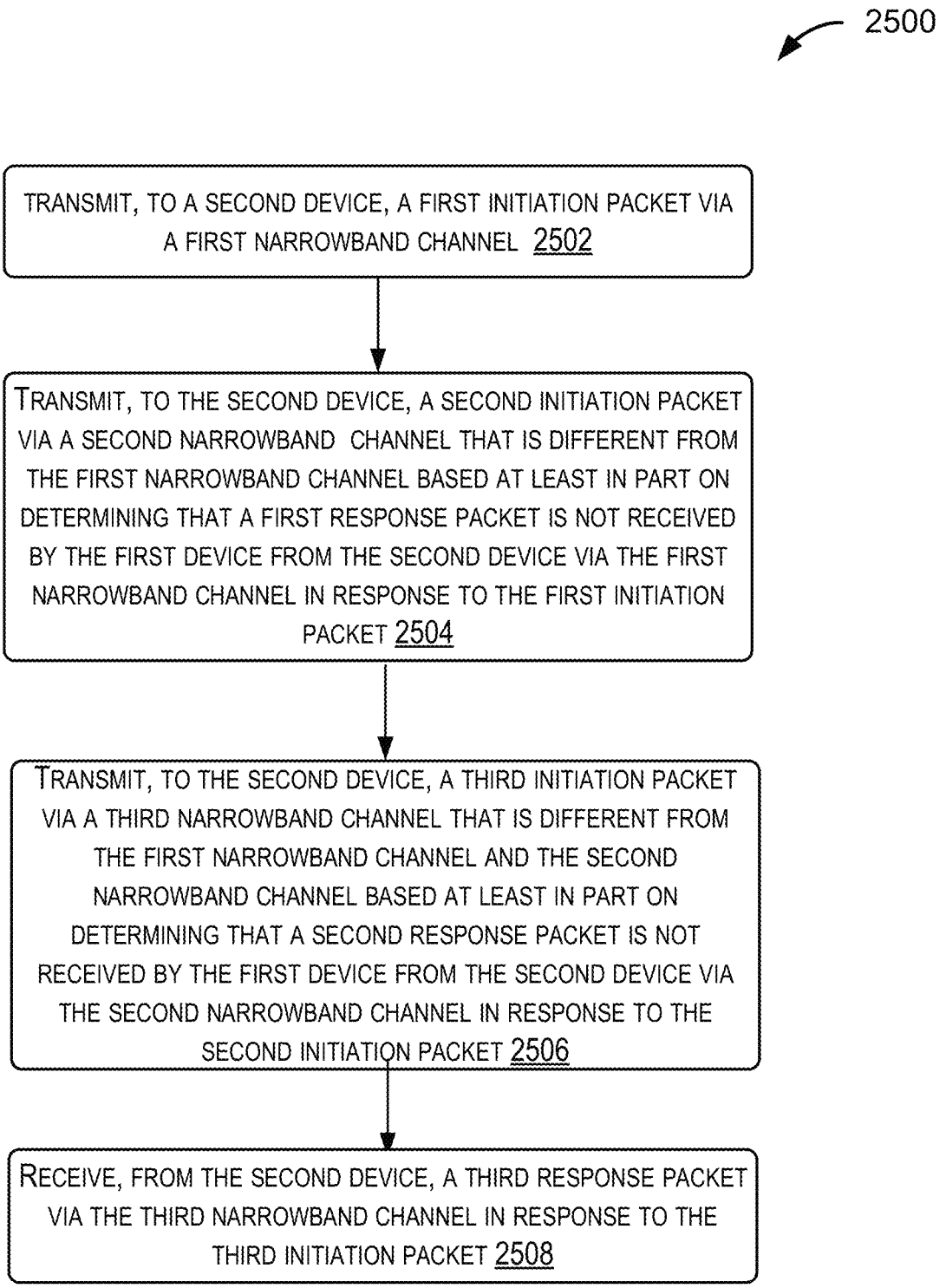
FIG. 25 is another simplified flow diagram illustrating a message exchange between two devices according to a bi-directional redundant packet exchange protocol utilizing one or more NB channels, according to some embodiments.

FIG. 25 is another simplified flow diagram illustrating a message exchange between two devices according to a bi-directional redundant packet exchange protocol utilizing one or more NB channels, according to some embodiments. In some embodiments, the message exchange of process 2500 of FIG. 25 may correspond to the protocol depicted in reference to FIG. 24. It should be understood that some operations (e.g., scheduling NB signals, transmission of UWB fragments, etc.) associated with process 2500 (and/or other processes described further herein) may be additionally be performed prior to, during, or after operations of the blocks depicted by the process 2500. Accordingly, it should be understood that the simplified protocol illustrated by process 2500 (and/or other processes described herein) may further include (and/or be included within) other operations and/or protocol variants of the present disclosure (e.g., a full-ranging protocol, a beaconing protocol, etc.).

Turning to process 2500, at block 2502, a first device (e.g., initiator 2402) may transmit to a second device (e.g., responder 2404) a first initiation packet via a first narrowband channel. As described above, and, for example, it should be understood that, prior to the operations of block 2502, one or more operations may be performed to schedule a start time for transmission of the first initiation packet (e.g., similar to one or more operations of block 1802 of FIG. 18).

At block 2504, the first device may transmit to the second device a second initiation packet via a second narrowband channel that is different from the first narrowband channel. The second initiation packet may be transmitted based at least in part on determining that a first response packet is not received by the first device from the second device via the first narrowband channel in response to the first initiation packet. Note that, if the second device had transmitted a first response packet, then the second initiation packet may not have been transmitted by the first device to the second device. In some embodiments, the second initiation packet may still be transmitted, even if a first response packet is received by the first device from the second device.

At block 2506, the first device may transmit to the second device a third initiation packet via a third narrowband channel that is different from the first narrowband channel and/or the second narrowband channel. The third initiation packet may be transmitted based at least in part on determining that a second response packet is not received by the first device from the second device via the second narrowband channel in response to the second initiation packet.

At block 2508, the first device may receive, from the second device, a third response packet via the third narrowband channel in response to the third initiation packet. At this block, according to the protocol described in reference to FIG. 24, the first device may then terminate exchanging NB packets.

Figure 26:
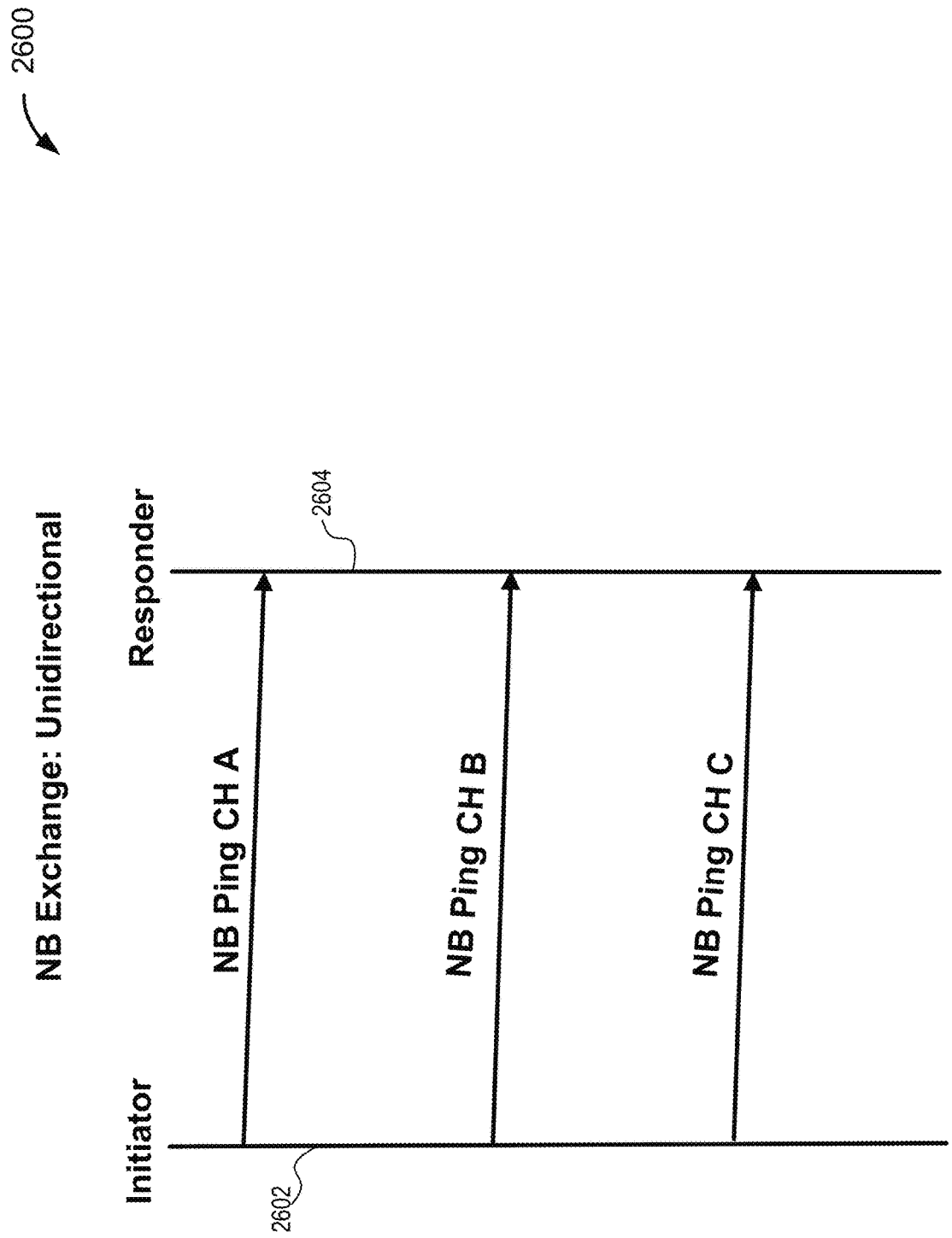
FIG. 26 is another simplified flow diagram illustrating signal transmissions according to a uni-directional redundant packet transmission protocol utilizing one or more NB channels, according to some embodiments.

FIG. 26 is another simplified flow diagram 2600 illustrating signal transmissions according to a uni-directional redundant packet transmission protocol utilizing one or more NB channels, according to some embodiments. FIG. 26 is similar to FIG. 24, but, in this case, only one side transmits the NB packets (e.g., an initiator 2602 to a responder 2604). Embodiments that employ a beaconing protocol (e.g., described further herein with respect to FIG. 34) may benefit from this approach. As described in reference to FIG. 24, in some embodiments, an OOB system may be used to coordinate transmission of NB control information (e.g., via Bluetooth/BLE).

Figure 27:
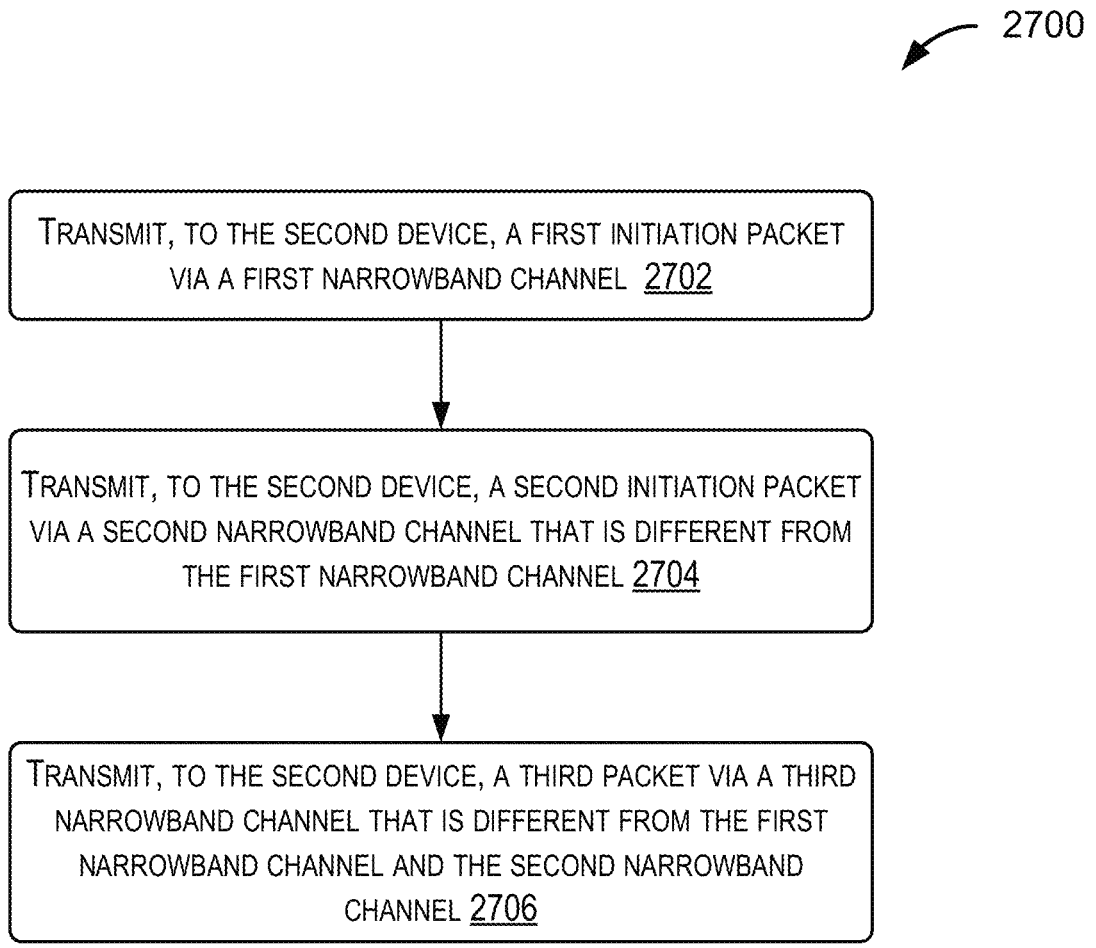
FIG. 27 is another simplified flow diagram illustrating a message exchange between two devices according to a uni-directional redundant packet transmission protocol utilizing one or more NB channels, according to some embodiments.

FIG. 27 is another simplified flow diagram illustrating a message exchange between two devices according to a uni-directional redundant packet transmission protocol utilizing one or more NB channels, according to some embodiments. In some embodiments, the message exchange of FIG. 27 may correspond to the protocol depicted in reference to FIG. 26.

At block 2702, a first device (e.g., initiator 2602) may transmit to the second device (e.g., responder 2604) a first initiation packet via a first narrowband channel.

At block 2704, the first device may transmit to the second device a second initiation packet via a second narrowband channel that may be different from the first narrowband channel.

At block 2706, the first device may transmit to the second device a third packet via a third narrowband channel that may be different from the first narrowband channel and the second narrowband channel.

Figure 28:
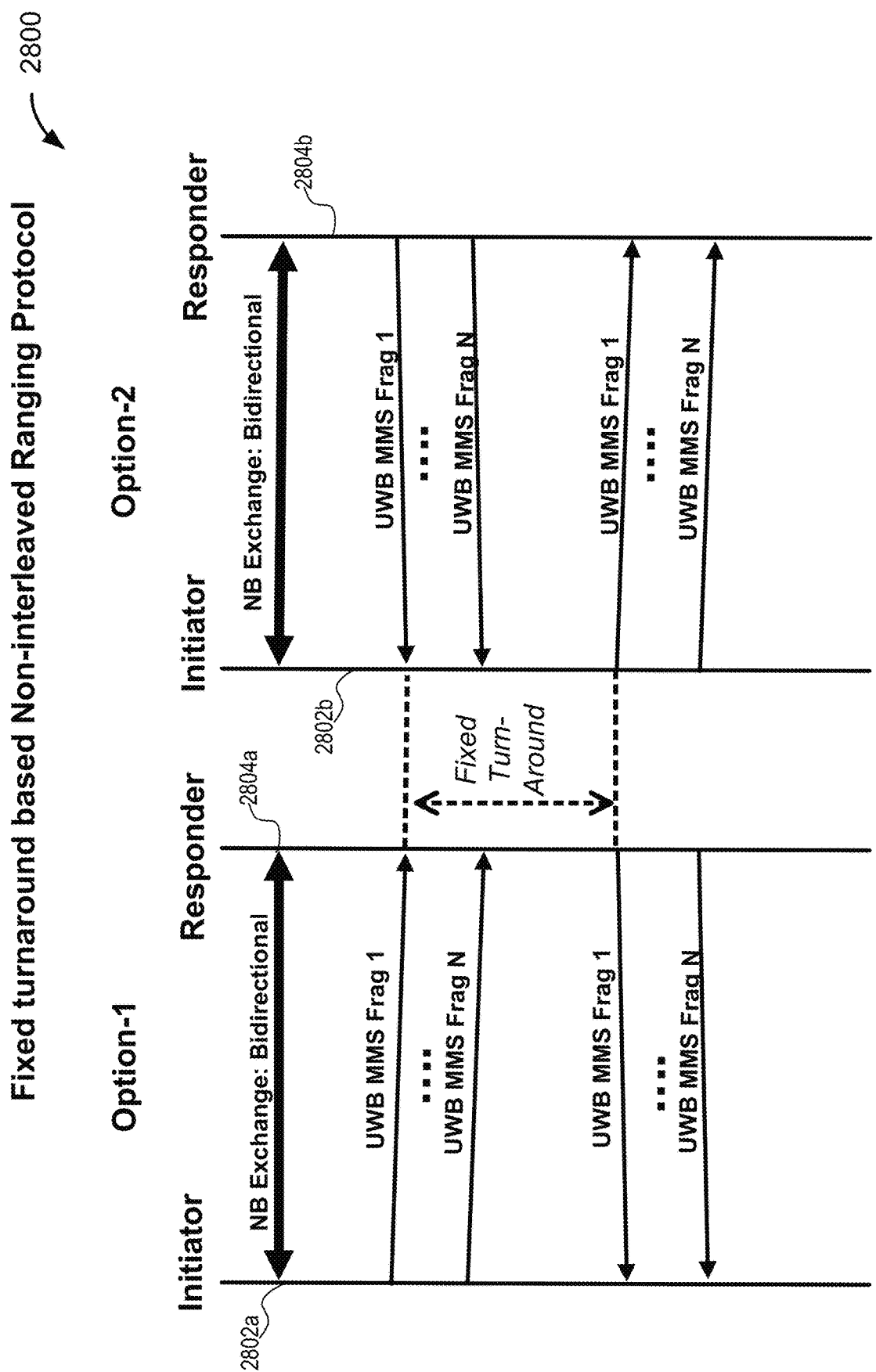
FIG. 28 is another simplified flow diagram illustrating signal transmissions of a non-interleaved ranging protocol utilizing a known fixed turnaround time, according to some embodiments.

FIG. 28 is another simplified flow diagram 2800 illustrating signal transmissions of a non-interleaved ranging protocol utilizing a known fixed turnaround time, according to some embodiments. Diagram 2800 of FIG. 28 depicts a full ranging protocol utilizing hybrid signaling, as described herein. The bi-directional NB exchange is same as shown in FIG. 24. The initiator 2802a then sends the UWB fragments as per the information exchanged over NB/OOB protocol. The responder 2804a, after receiving all the UWB fragments, performs ToA (time of arrival) extraction and sends its response UWB fragments starting at a fixed precise time. This may be called a fixed turnaround time interval (e.g., a fixed time interval) and the granularity of such time may be in tens of picoseconds. Since this fixed turnaround time itself implicitly communicates a precise time delta between responder UWB RX and TX, it eliminates the need for communicating this over a data packet/payload. The initiator 2802a can compute the TOF after receiving the UWB fragments from the responder 2804a. Correspondingly, if the responder 2804a determines to compute the range, Option-2 of FIG. 2800 may be utilized. For example, the exchange order of UWB fragments may be swapped, so that the responder 2804b first sends a plurality of fragments, and then subsequently receives a response plurality of fragments from the initiator 2802b. In this Option-2, a fixed turnaround time is still employed.

Figure 29:
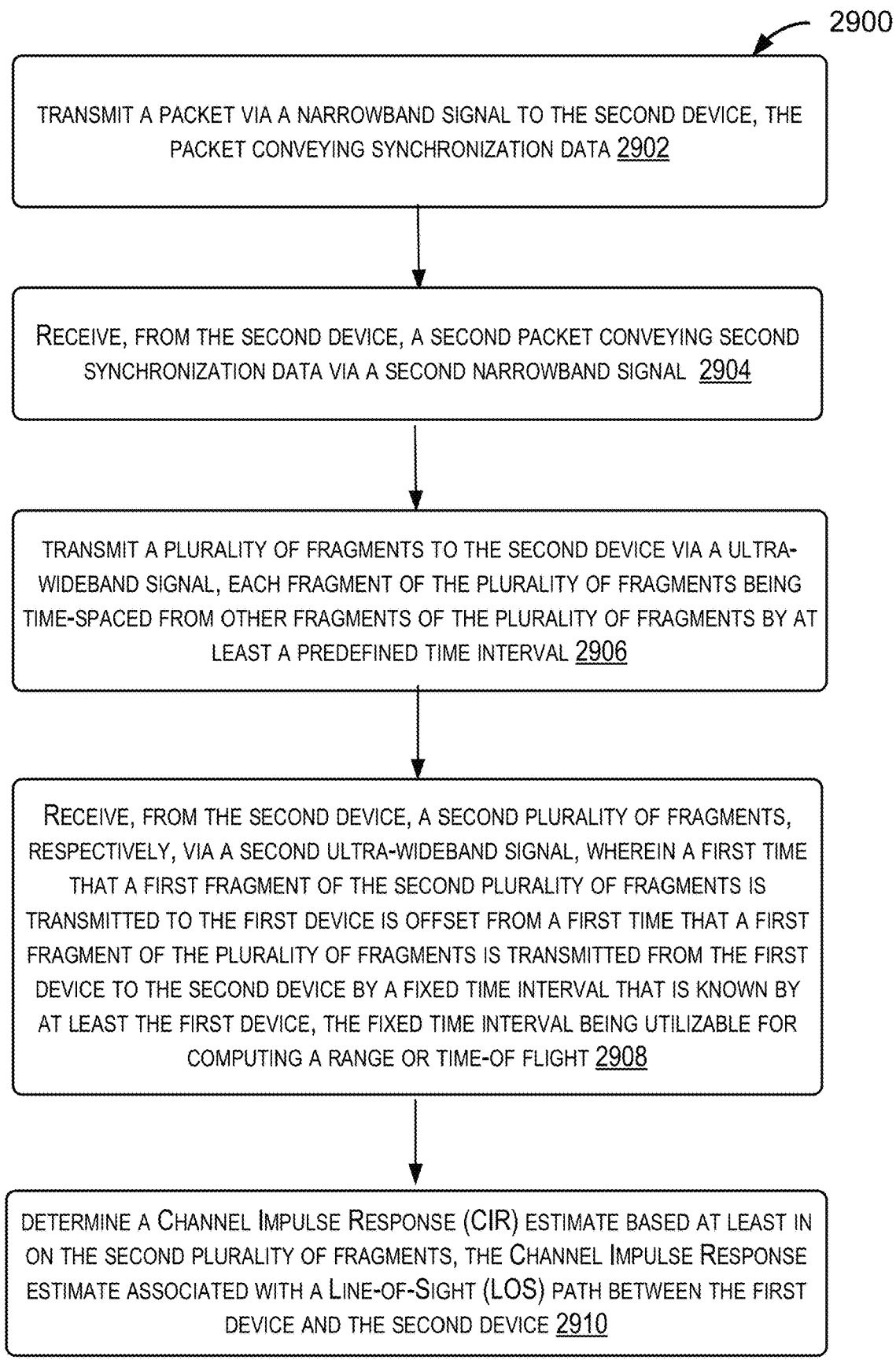
FIG. 29 is another simplified flow diagram illustrating a message exchange based on a known fixed turnaround time, according to some embodiments.

FIG. 29 is another simplified flow diagram illustrating a message exchange based on a known fixed turnaround time, according to some embodiments. In some embodiments, the message exchange of process 2900 of FIG. 29 may correspond to the protocol depicted in reference to FIG. 28.

At block 2902 of process 2900, a first device (e.g., the initiator 2802) may transmit a packet via a narrowband signal to the second device (e.g., the responder 2804). In some embodiments, the packet may convey synchronization data (e.g., time and frequency synchronization data, and/or scheduling information). In some embodiments, one or more of the operations of block 2902 may be similar to operations of block 1804 of FIG. 18. As described herein, the second device may obtain (e.g., extract from a sync header and/or payload data of the packet) and utilize this synchronization data to schedule reception of a plurality of UWB fragments from the first device. The first device may also schedule transmission of the plurality of UWB fragments in accordance with this synchronization data.

At block 2904, the first device may receive, from the second device, the second packet that conveys to the first device second synchronization data via a second narrowband signal. In some embodiments, one or more of the operations of block 2904 may be similar to operations of block 1808 of FIG. 19. As described herein, the first device may obtain and utilize this second synchronization data to schedule reception of a plurality of UWB fragments from the second device. The second device may also schedule transmission of the second plurality of fragments in accordance with this second synchronization data.

In some embodiments, the blocks 2902 and 2904 may be repeated as per the scheme described in reference to FIG. 24 and FIG. 25.

At block 2906, the first device may transmit the plurality of fragments to the second device via the ultra-wideband signal. In some embodiments, each fragment of the plurality of fragments may be time-spaced from other fragments of the plurality of fragments by at least a predefined time interval (e.g., according to relevant regulatory rules for emission standards).

At block 2908, the first device may receive, from the second device, the second plurality of fragments, respectively, via a second ultra-wideband signal. In some embodiments, a first time that a first fragment of the second plurality of fragments is transmitted to the first device is offset from a first time that a first fragment of the plurality of fragments is transmitted from the first device to the second device by a fixed time interval that is known by at least the first device. In some embodiments, the fixed time interval may be utilizable for computing a range or time-of flight. For example, the first device may determine a turnaround time, which may then be used to determine a TOF.

At block 2910, the first device may determine a Channel Impulse Response (CIR) estimate based at least in on the second plurality of fragments. In some embodiments, the Channel Impulse Response estimate may be associated with a Line-of-Sight (LOS) path between the first device and the second device.

Figure 30:
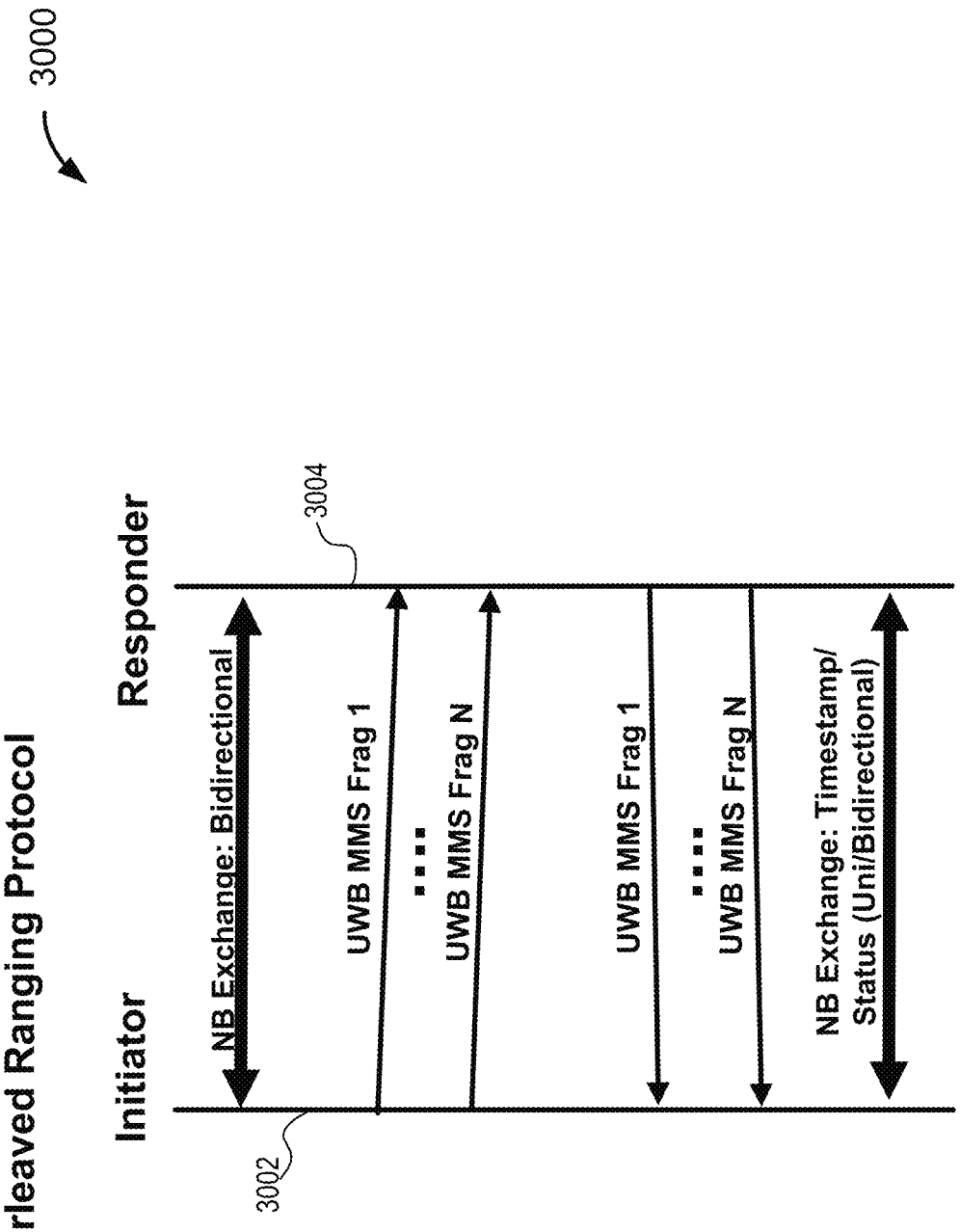
FIG. 30 is another simplified flow diagram illustrating a non-interleaved ranging protocol including an exchange of NB signals to communicate round-trip time and/or turnaround time following a bi-directional exchange of UWB fragments, according to some embodiments.

FIG. 30 is another simplified flow diagram 3000 illustrating a non-interleaved ranging protocol including an exchange of NB signals to communicate round-trip time and/or turnaround time following a bi-directional exchange of UWB fragments, according to some embodiments. The diagram 3000 of FIG. 30 is similar to FIG. 28, but uses Unidirectional/Bidirectional NB packets after the exchange of UWB fragments between the initiator 3002 and the responder 3004 to communicate the roundtrip time and/or turnaround time along with optional status reporting. This may be useful if the devices don't have fixed turnaround time capability or both sides need to know the range/TOF. Note that the unidirectional NB exchange may be used when only one side need to know the range, and the bidirectional NB exchange may enable both sides to compute the range.

Figure 31:
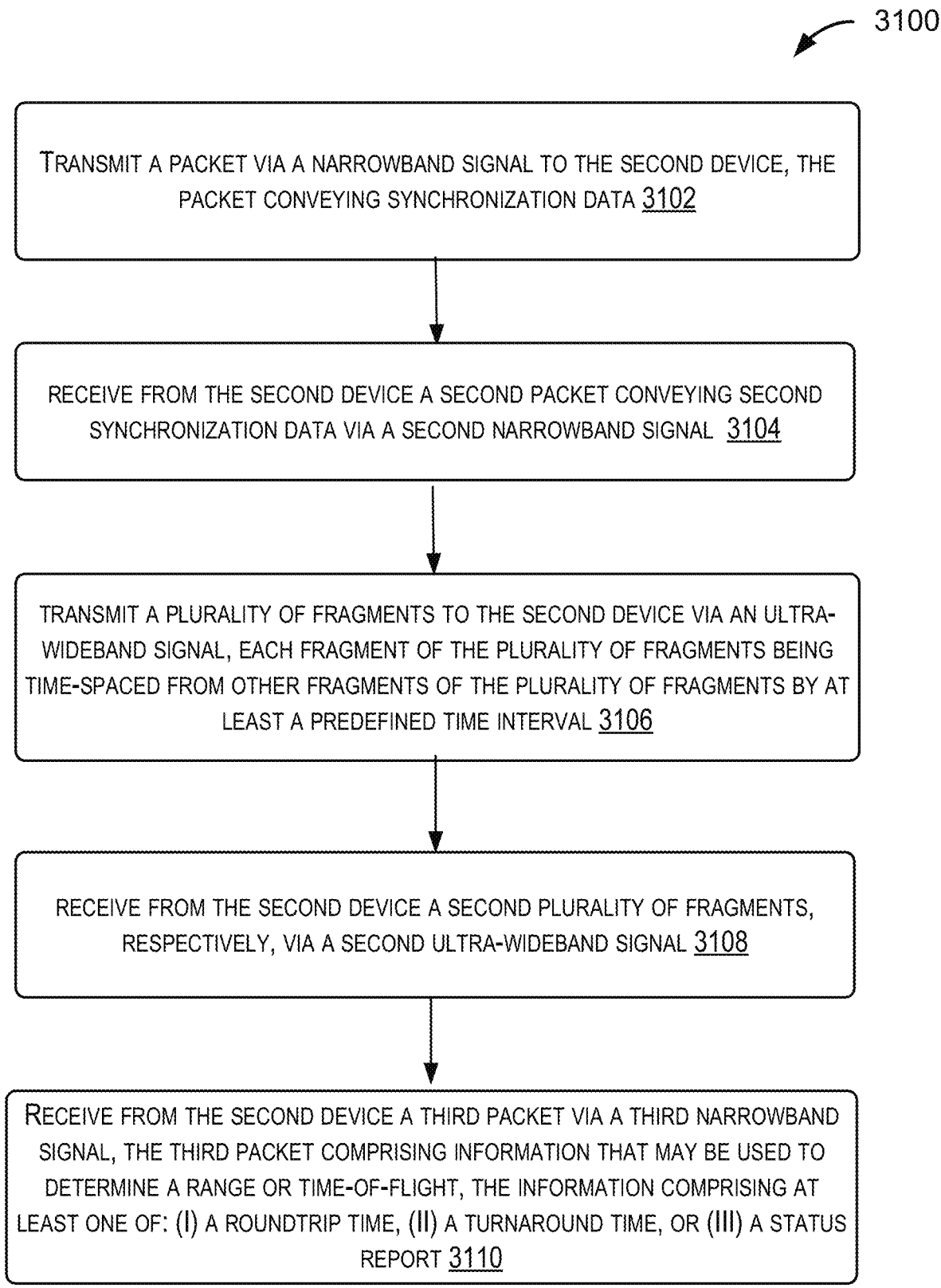
FIG. 31 is another simplified flow diagram illustrating a message exchange that utilizes an exchange of NB signals following a bi-directional exchange of UWB fragments, according to some embodiments.

FIG. 31 is another simplified flow diagram illustrating a message exchange that utilizes an exchange of NB signals following a bi-directional exchange of UWB fragments, according to some embodiments. In some embodiments, the message exchange of process 3100 of FIG. 31 may correspond to the protocol depicted in reference to FIG. 30.

At block 3102 of process 3100, a first device (e.g., the initiator 3002) may transmit a packet via a narrowband signal to the second device (e.g., the responder 3004), the packet conveying synchronization data. In some embodiments, one or more of the operations of block 3102 may be similar to operations of block 2902 of FIG. 29.

At block 3104, the first device may receive from the second device a second packet conveying second synchronization data via a second narrowband signal. In some embodiments, one or more of the operations of block 3104 may be similar to operations of block 2904 of FIG. 29.

In some embodiments, the blocks 3102 and 3104 may be repeated as per the scheme described in reference to FIG. 24 and FIG. 25.

At block 3106, the first device may transmit a plurality of fragments to the second device via an ultra-wideband signal, each fragment of the plurality of fragments being time-spaced from other fragments of the plurality of fragments by at least a predefined time interval. In some embodiments, one or more of the operations of block 3106 may be similar to operations of block 1814 of FIG. 18.

At block 3108, the first device may receive from the second device a second plurality of fragments, respectively, via a second ultra-wideband signal. In some embodiments, one or more of the operations of block 3108 may be similar to operations of block 1818 of FIG. 18.

At block 3110, the first device may receive from the second device a third packet via a third narrowband signal. In some embodiments, the third packet may include information that may be used to determine a range or time-of-flight. In some embodiments, the information may include at least one of: (I) a roundtrip time, (II) a turnaround time, or (III) a status report. In some embodiments, as described herein, the first device may also transmit to the second device a fourth packet via a fourth narrowband signal. This fourth packet may communicate similar types of information as included with the third narrowband signal. This data may allow the second device to also compute the range. As described above, this technique may be useful if the devices don't have fixed turnaround time capability or both sides need to know the range/TOF.

In some embodiments, the block 3110 may be repeated as per the scheme described in reference to FIG. 24 and FIG. 25, and/or FIG. 26 and FIG. 27.

Figure 32:
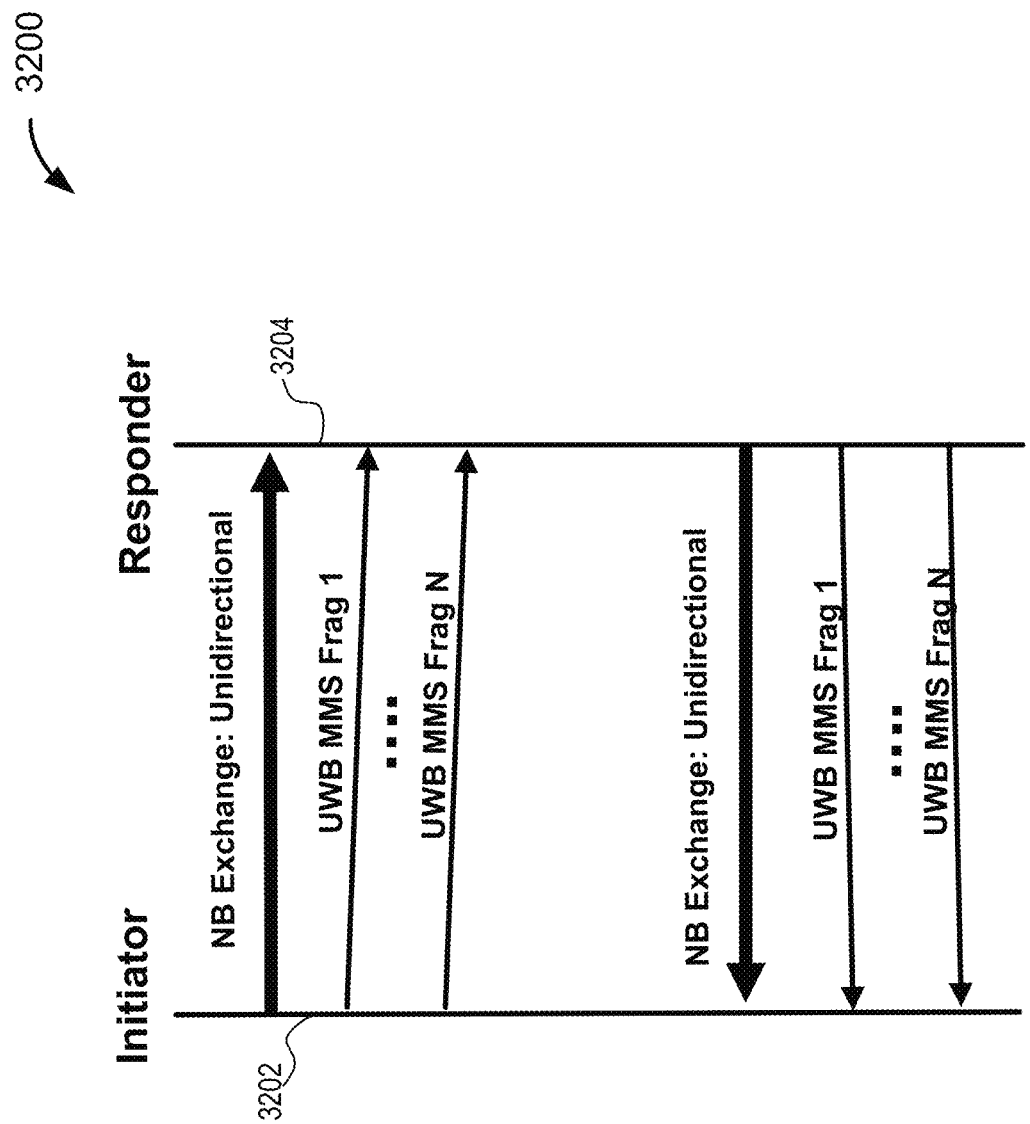
FIG. 32 is another simplified flow diagram illustrating an exchange of signals according to a uni-directional NB and non-interleaved UWB ranging protocol, according to some embodiments.

FIG. 32 is another simplified flow diagram 3200 illustrating an exchange of signals according to a uni-directional NB and non-interleaved UWB ranging protocol, according to some embodiments. Diagram 3200 of FIG. 32 depicts another variation whereby a unidirectional NB exchange between an initiator 3202 and a responder 3204 is immediately followed by UWB fragments in the same direction. This scheme may allow multiple responders 3204 to be involved in a ranging exercise, by letting them respond in a known sequence or a random order. In some embodiments, the response can either include the timestamp in the response NB packets or use fixed turnaround time scheme to respond (as described herein). The initiator 3202 can thereby compute the respective range(s), as described herein.

Figure 33:
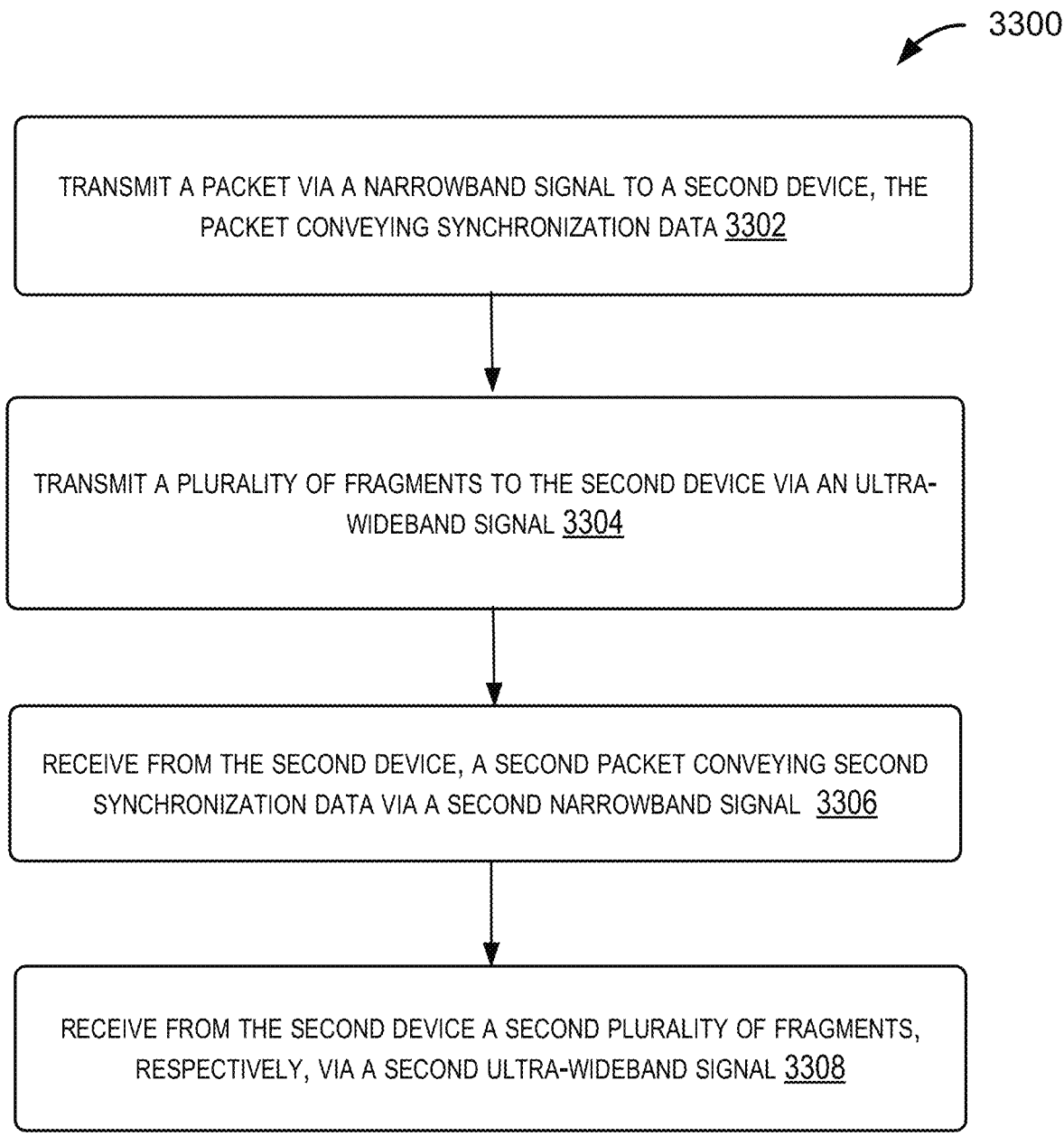
FIG. 33 is another simplified flow diagram illustrating a message exchange according to a uni-directional NB and non-interleaved UWB ranging protocol, according to some embodiments.

FIG. 33 is another simplified flow diagram illustrating a message exchange according to a uni-directional NB and non-interleaved UWB ranging protocol, according to some embodiments. In some embodiments, the message exchange of process 3300 of FIG. 33 may correspond to the protocol depicted in reference to FIG. 32.

At block 3302, a first device (e.g., the initiator 3202) may transmit a packet via a narrowband signal to a second device (e.g., the responder 3204), the packet conveying synchronization data. In some embodiments, one or more of the operations of block 3302 may be similar to operations of block 1804 of FIG. 18. In some embodiments, the block 3302 may be repeated as per the scheme described in reference to FIG. 26 and FIG. 27.

At block 3304, the first device may transmit a plurality of fragments to the second device via an ultra-wideband signal. In some embodiments, one or more of the operations of block 3304 may be similar to operations of block 1814 of FIG. 18.

At block 3306, the first device may receive from the second device, a second packet conveying second synchronization data via a second narrowband signal. In some embodiments, one or more of the operations of block 3306 may be similar to operations of block 1808 of FIG. 18. Note that, in this case, the first device may receive the second packet following transmission of the plurality of fragments at block 3304. In some embodiments, the block 3306 may be repeated as per the scheme described in reference to FIG. 26 and FIG. 27.

At block 3308, the first device may receive from the second device a second plurality of fragments, respectively, via a second ultra-wideband signal. In some embodiments, one or more of the operations of block 3308 may be similar to operations of block 1818 of FIG. 18. In some embodiments, the first device may then use the information to compute ToF and/or AoA.

Figure 34:
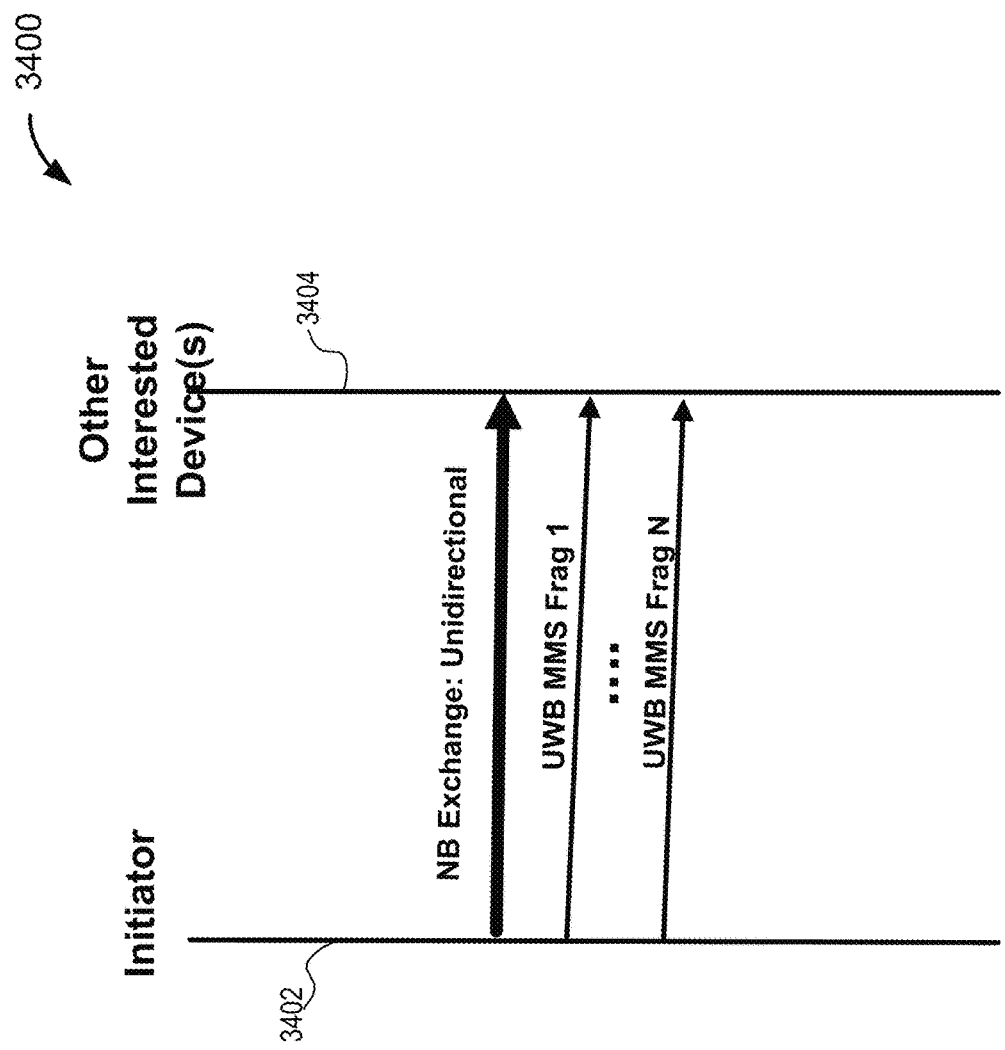
FIG. 34 is another simplified flow diagram illustrating an exchange of signals according to a beaconing protocol, according to some embodiments.

FIG. 34 is another simplified flow diagram 3400 illustrating an exchange of signals according to a beaconing protocol, according to some embodiments. As described above, in some embodiments, the beaconing protocol may be employed when only one side, such as the initiator 3402, transmits NB signals (e.g., NB packets) and UWB signals (e.g., a plurality of fragments). This may be useful for example, if a second (receiver) device is one of several interested devices 3404 that interact with the first device according to the beaconing protocol. In one example, the receiver device may subsequently perform ranging and/or positioning based on triangulation with one or more of the other devices, based in part on the estimated CIR. In some embodiments, an initiator 3402 may send periodic beacon messages. Note that the beaconing protocol still utilizes a hybrid signaling approach, as described herein.

Figure 35:
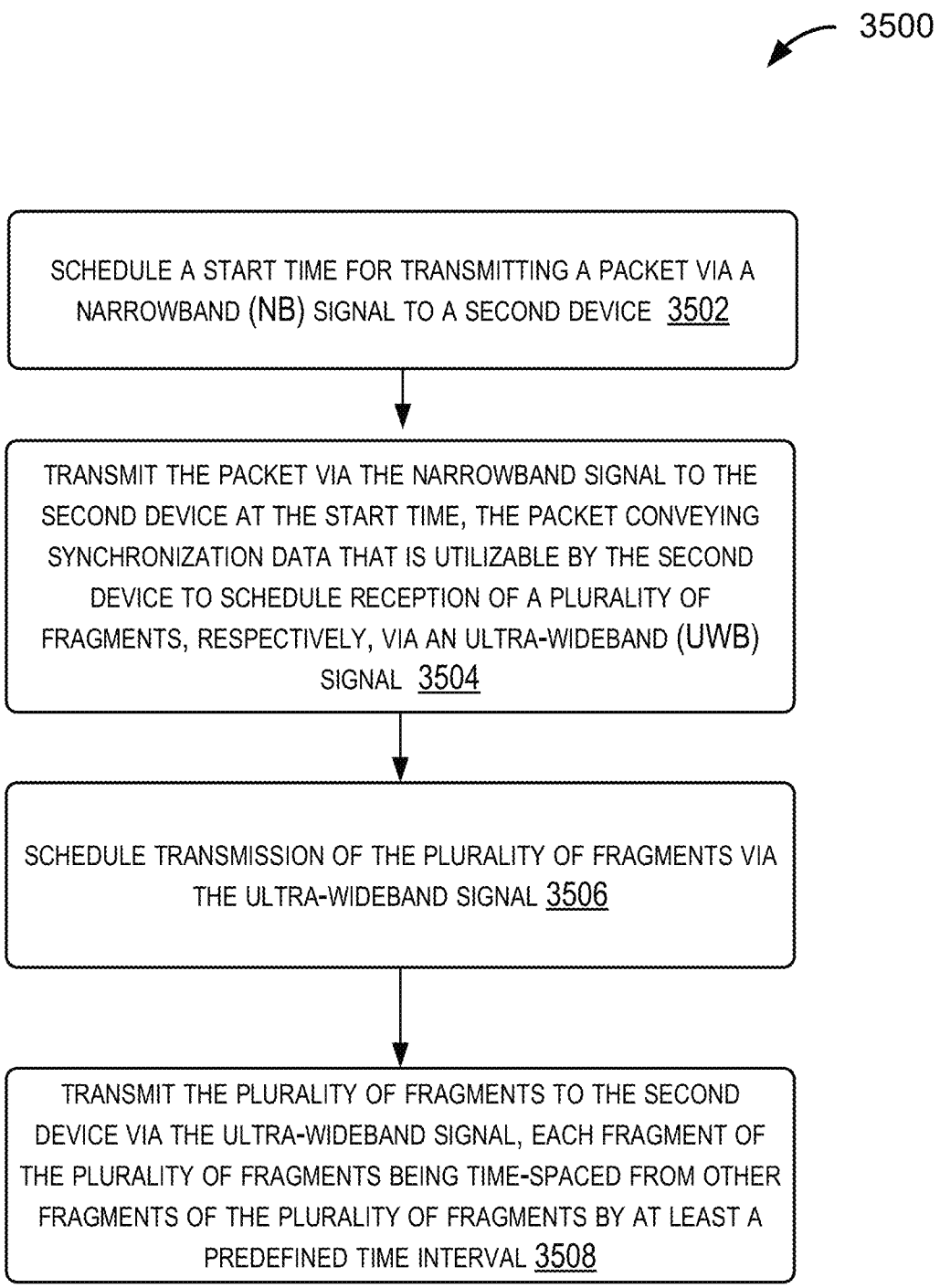
FIG. 35 is another simplified flow diagram illustrating a message exchange according to a beaconing protocol, according to some embodiments.

FIG. 35 is another simplified flow diagram illustrating a message exchange according to a beaconing protocol, according to some embodiments. In some embodiments, the message exchange of process 3500 of FIG. 35 may correspond to the protocol depicted in reference to FIG. 34.

At block 3502, a first device (e.g., initiator 3402) may schedule a start time for transmitting a packet via a narrowband (NB) signal to one or more interested devices 3404. In some embodiments, one or more of the operations of block 3502 may be similar to operations of block 1802 of FIG. 18.

At block 3504, the first device may transmit the packet via the narrowband signal to the one or more interested devices 3404 at the scheduled start time. In some embodiments, the packet may convey synchronization data that is used by the second device to schedule reception of a plurality of fragments, respectively, via an ultra-wideband (UWB) signal. In some embodiments, one or more of the operations of block 3504 may be similar to operations of block 1804 of FIG. 18.

In some embodiments, the blocks 3502 and 3504 may be repeated as per the scheme described in reference to FIG. 26 and FIG. 27.

At block 3506, the first device may schedule transmission of the plurality of fragments via the ultra-wideband signal in accordance with the synchronization data. In some embodiments, one or more of the operations of block 3306 may be similar to operations of block 1812 of FIG. 18.

At block 3508, the first device may transmit the plurality of fragments to the second device via the ultra-wideband signal. In some embodiments, each fragment of the plurality of fragments may be time-spaced from other fragments of the plurality of fragments by at least a predefined time interval. In some embodiments, one or more of the operations of block 3308 may be similar to operations of block 1814 of FIG. 18.

Figure 36:
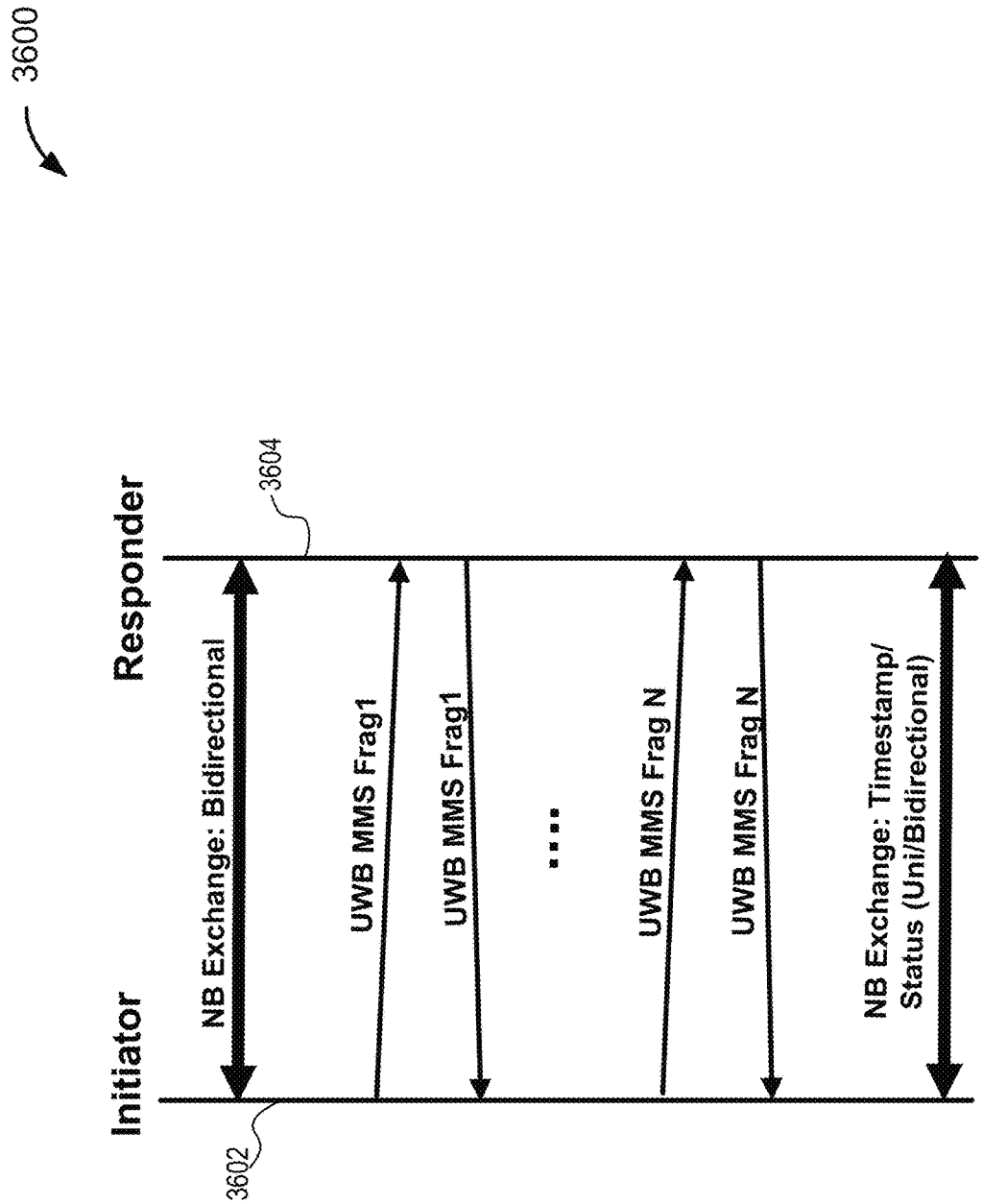
FIG. 36 is another simplified flow diagram illustrating an exchange of signals according to an interleaved ranging protocol, according to some embodiments.

FIG. 36 is another simplified flow diagram illustrating an exchange of signals according to an interleaved ranging protocol, according to some embodiments. In the interleaved ranging protocol as shown in process 3600 of FIG. 36, the protocol halves the UWB fragments exchange time by letting initiator 3602 and responder 3604 use the same T_test_reg (see FIG. 7). The TX and RX UWB fragments are interleaved in this case. This interleaved UWB exchange is preceded by a bi-directional NB exchange and followed by a unidirectional or bidirectional timestamp/status NB exchange (see FIG. 30). In some embodiments, by enabling both the initiator 3602 and the responder 3604 use the same time interval for transmitting respective UWB fragments, this protocol may enable the overall ranging exchange time to be significantly reduced. It should be understood that the transmission and/or reception attempts of UWB fragments itself can be conditional on successful reception of NB packets. In some embodiments, this may help in optimizing power.

Figure 37:
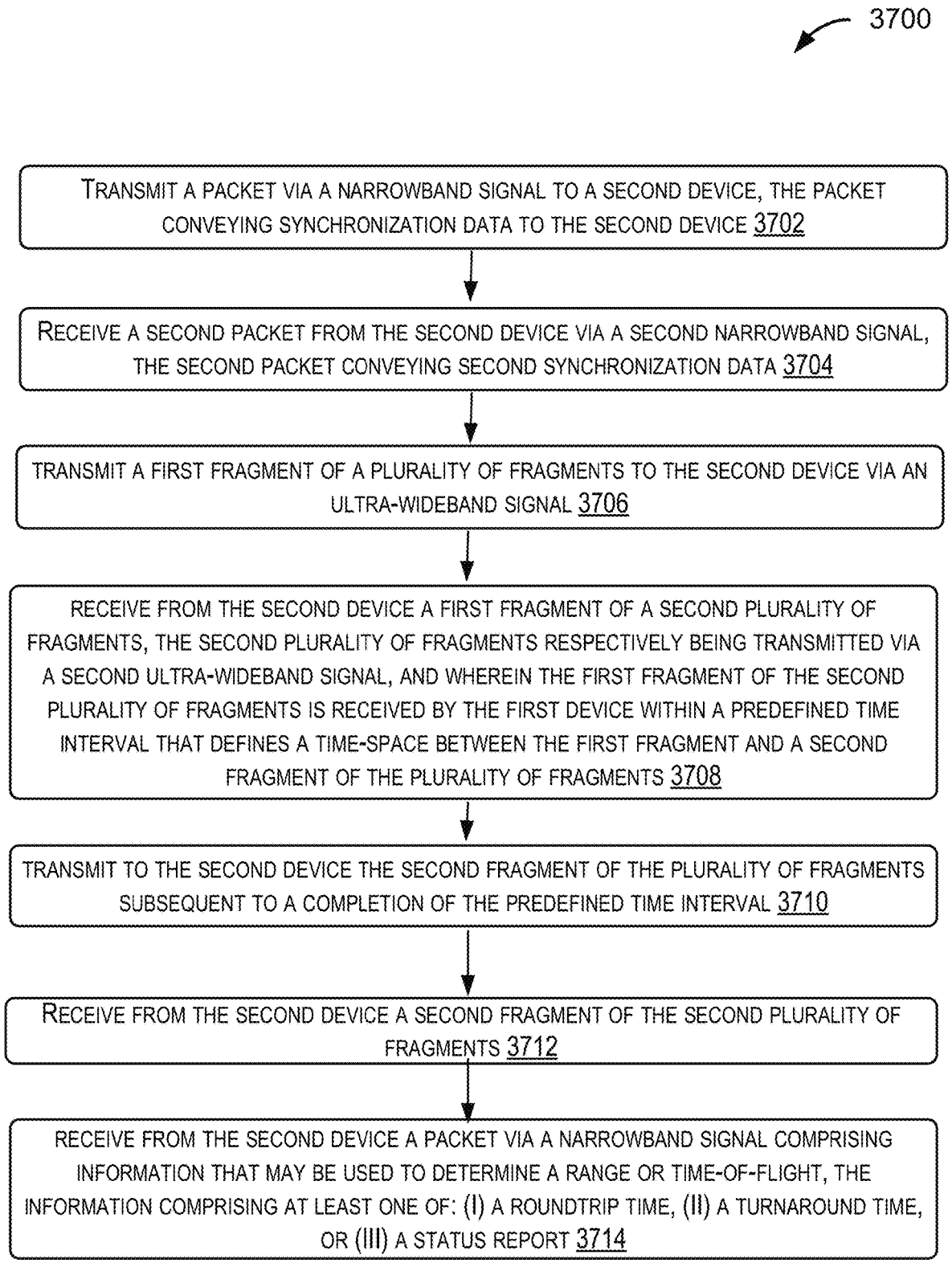
FIG. 37 is another simplified flow diagram illustrating a message exchange according to an interleaved ranging protocol, according to some embodiments.

FIG. 37 is another simplified flow diagram illustrating a message exchange according to an interleaved ranging protocol, according to some embodiments. In some embodiments, the message exchange of process 3700 of FIG. 37 may correspond to the protocol depicted in reference to FIG. 36.

At block 3702 of process 3700, a first device (e.g., the initiator 3602) may transmit a packet via a narrowband signal to the second device (e.g., the responder 3604), the packet conveying synchronization data. In some embodiments, one or more of the operations of block 3702 may be similar to operations of block 2902 of FIG. 29.

At block 3704, the first device may receive from the second device a second packet conveying second synchronization data via a second narrowband signal. In some embodiments, one or more of the operations of block 3704 may be similar to operations of block 2904 of FIG. 29.

In some embodiments, the blocks 3702 and 3704 may be repeated as per the scheme described in reference to FIG. 24 and FIG. 25.

At block 3706, a first device may transmit a first fragment of a plurality of fragments to a second device via an ultra-wideband signal. In some embodiments, one or more of the operations of block 3706 may be similar to operations of block 1814 of FIG. 18.

At block 3708, the first device may receive from the second device a first fragment of a second plurality of fragments. In some embodiments, the first fragment of the second plurality of fragments may be transmitted via a second ultra-wideband signal. In some embodiments, the first fragment of the second plurality of fragments is received by the first device within a predefined time interval that defines a time-space between the first fragment and a second fragment of the plurality of fragments. In some embodiments, one or more of the operations of block 3708 may be similar to operations of block 1818 of FIG. 18. Note that, in this case individual respective fragments from each plurality of fragments are interleaved together when being transmitted/received by respective devices.

At block 3710, the first device may transmit to the second device the second fragment of the plurality of fragments subsequent to a completion of the predefined time interval.

At block 3712, the first device may receive from the second device a second fragment of the second plurality of fragments. It should be understood that multiple rounds of interleaved fragments may be exchanged between the two devices (e.g., including multiple rounds of the operations of block 3710 and 3712), until the complete respective pluralities of fragments are exchanged between the devices.

At block 3714, the first device may receive from the second device a packet via a narrowband signal comprising information that may be used to determine a range or time-of-flight, the information comprising at least one of: (I) a roundtrip time, (II) a turnaround time, or (III) a status report. In some embodiments, one or more of the operations of block 3710 may be similar to operations of block 3110 of FIG. 31. Note that, in some cases, the first device may also (and/or alternatively) transmit a packet via a narrowband signal that enables the second device to also determine ranging information, depending on the context. In some embodiments, the operations of block 3714 may be repeated as per the scheme described in reference to FIG. 24 and FIG. 25 and/or FIG. 26 and FIG. 27.

Figure 38:
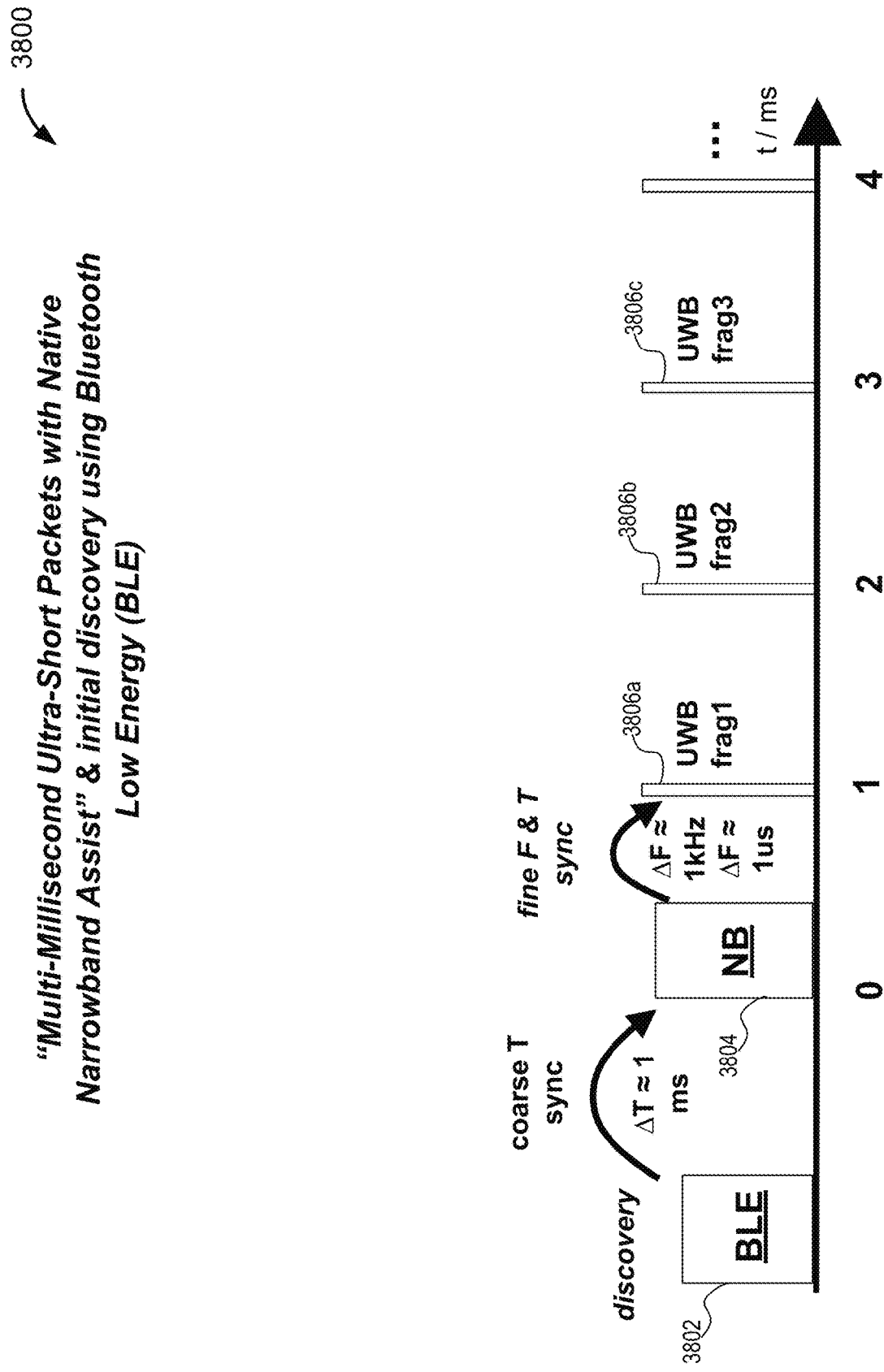
FIG. 38 is another simplified block diagram illustrating use of a separate wireless system for initial device discovery and connection setup, according to some embodiments.

FIG. 38 is another simplified block diagram 3800 illustrating use of a separate wireless system for initial device discovery and connection setup, according to some embodiments. Diagram 3800 depicts the NB-assist concept being extended to include another wireless system that may assist with initial device discovery and connection setup, as described herein. In this example, the wireless system (e.g., BLE 3802) may be used for initial coarse alignment of devices, before control is handed over to the Hybrid NB+UWB transceiver 3804. In some embodiments, the BLE 3802 may handle advertising/scanning, coarse synchronization, and/or connection setup. Meanwhile, the NB sub-system may handle fine synchronization to assist ("anchor") the MMS-UWB (Multi-Millisecond) transmission. Also, the UWB sub-system may more efficiently "harvest" multiple milliseconds worth of UWB energy from specialized fragments 3806a-c for TOF/AOA estimation.

Figure 39:
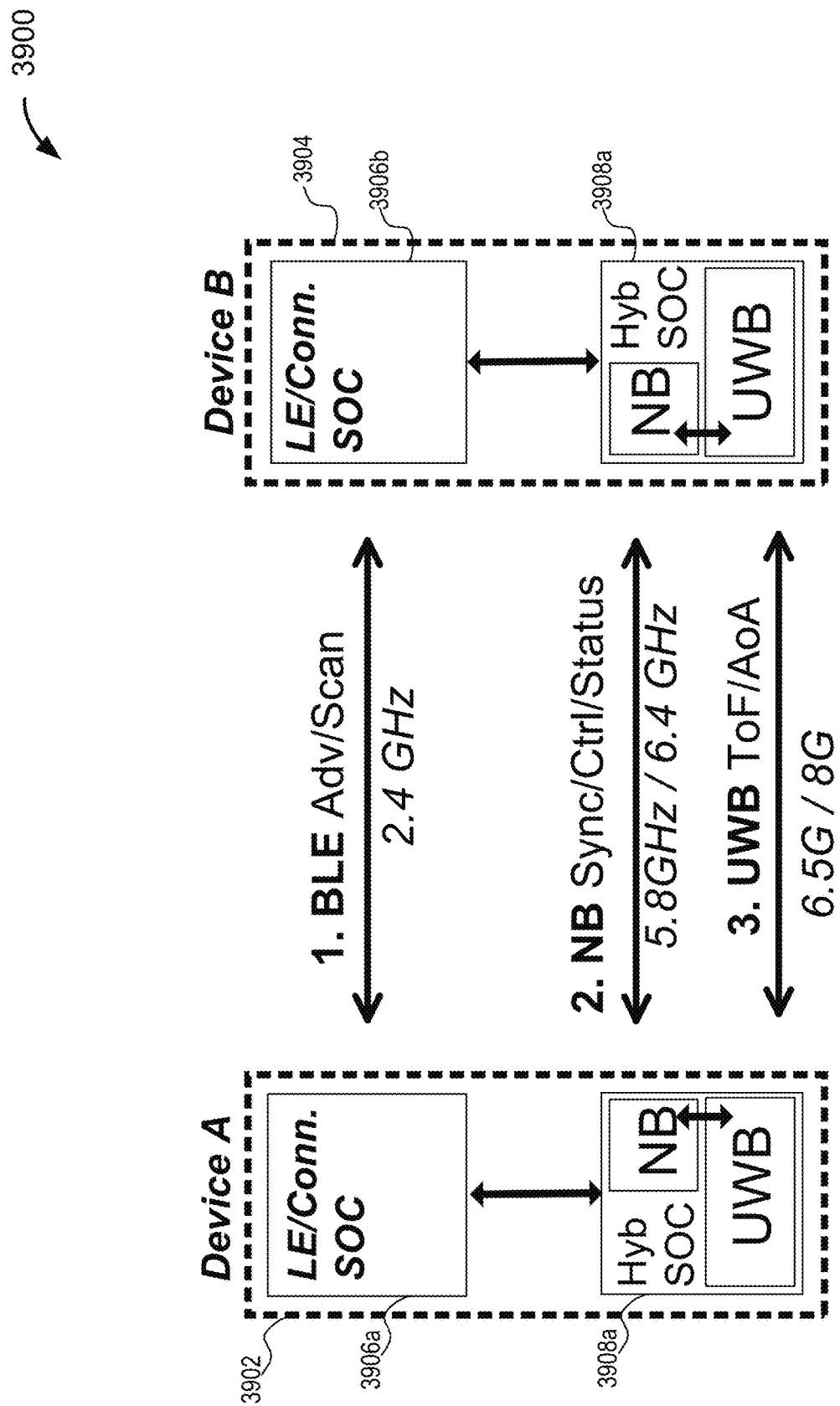
FIG. 39 is another simplified block diagram illustrating use of a separate wireless system for initial device discovery and connection setup, according to some embodiments.

FIG. 39 is another simplified block diagram 3900 illustrating use of a separate wireless system for initial device discovery and connection setup, according to some embodiments. Diagram 3900 of FIG. 39 shows an implementation where the additional wireless system (such as BLE 3802) and the HWT are on separate Systems on Chip (SOCs) 3906a-b and 3908a-b) on the same device (device A 3902 or device B 3904, respectively).

Figure 40:
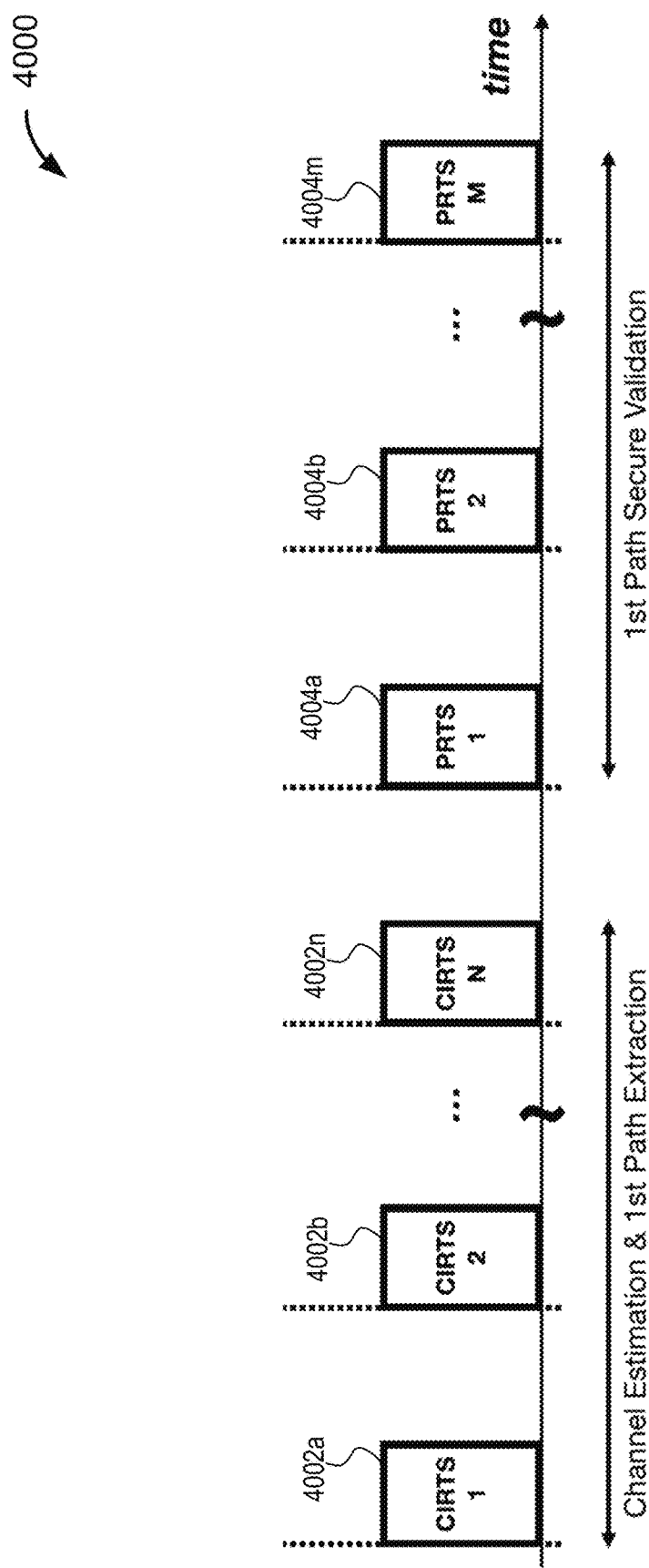
FIG. 40 is a simplified block diagram illustrating use of fragmented UWB signaling that involves a plurality of partitions of a UWB packet, according to some embodiments.

FIG. 40 is a simplified block diagram 4000 illustrating use of fragmented UWB signaling that involves a plurality of partitions of a UWB packet, according to some embodiments. Diagram 4000 shows two partitions (two types) of UWB packet fragments in succession, namely N fragments 4002a-n containing CIRTS (e.g., a type of fragment) in the first partition, followed by M fragments 4004a-m containing Pseudo-Random Training Sequences (PRTS) (e.g., another type of fragment) in the second partition. In one advantageous embodiment of such a partitioned fragmented frame structure, each of the CIRTS fragments 4002a-n in the first partition consists of a periodic pulse sequence as described in reference to FIG. 21. Meanwhile, each of the fragments 4004a-m of the second partition consists of a different sequence of pulse of pseudo-random pulse polarities. Similar to the Scrambled Timestamp Sequence (STS) in IEEE 802.15.4z, the pulse polarities in the PRTS fragments 4004a-m are pseudo-random and only known to the associated devices in a Secure Ranging scenario. Specifically, the CIRTS fragments 4002a-n may be used by the receiving device to efficiently estimate the channel (CTR) estimate and extract the 1st propagation path. The PRTS fragments 4004a-m may then be used by the receiver station to validate (e.g., authenticate) in a secure fashion the legitimacy of this 1st path estimate by means of the CIR obtained in the CIRTS fragments 4002a-n and the (secret but known) pulse polarities contained in the fragments of the PRTS 4004a-m. Using the illustration and nomenclature of possible sequence types in FIG. 21, the N fragments containing periodic CIRTS sequences may be based on rows 3,4,5, and/or 6 of the illustrated Table, while the M PRTS fragments 4004a-m may be based on row 2 in the Table illustrated in FIG. 21.

Figure 41:
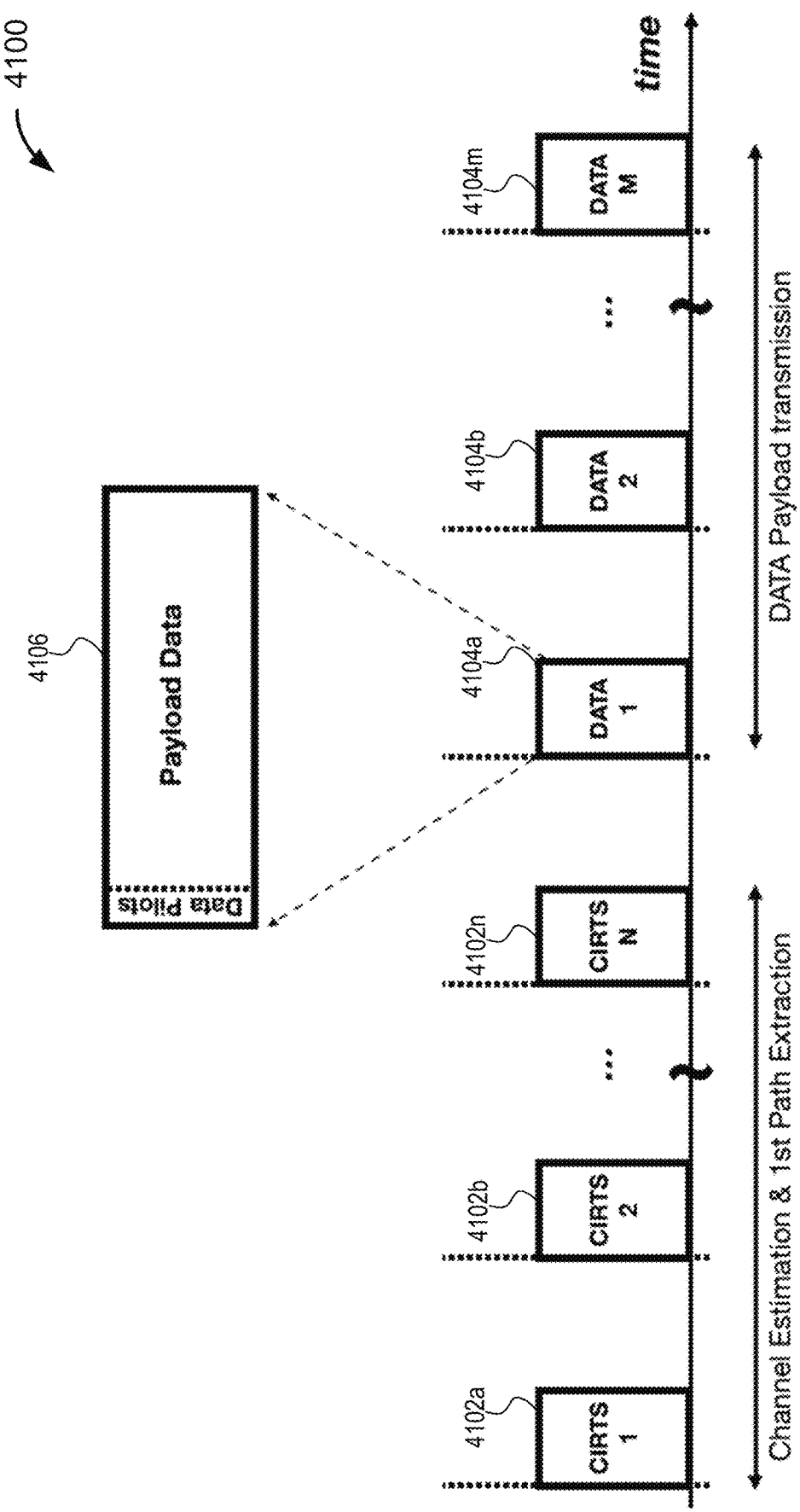
FIG. 41 is another simplified block diagram illustrating use of fragmented UWB signaling that involves a plurality of partitions of a UWB packet, according to some embodiments.

FIG. 41 is another simplified block diagram 4100 illustrating use of fragmented UWB signaling that involves a plurality of partitions of a UWB packet, according to some embodiments. Diagram 4100 of FIG. 41 illustrates a different partitioned fragmented UWB packet embodiment from FIG. 40. Specifically, the first partition contains CIRTS fragments 4102a-n (e.g., a fragment type), while the second partition contains DATA fragments 4104a-m (e.g., a different fragment type). As previously described, the CIRTS fragments 4102a-n can be evaluated by the receiver to obtain the CIR and 1st path estimate. The DATA fragments 4104a-m may be utilized to transfer user payload data 4106. Such user payload data 4106 may include sensor data, such as readings from an Inertial Measurement Unit (IMU) or Accelerometer module, control/management and status data, or data for Audio and/or Video purposes such as microphone data or Audio and/or Video streaming data. Note that DATA fragments 4104a-m may contain short "pilot" data symbols, which are known to both the transmitter and the receiver a priori. Such pilot data symbols may help re-synchronize and/or refine the Channel Estimate (CIR) in order to improve the accuracy and performance of the DATA payload detection.

Figure 42:
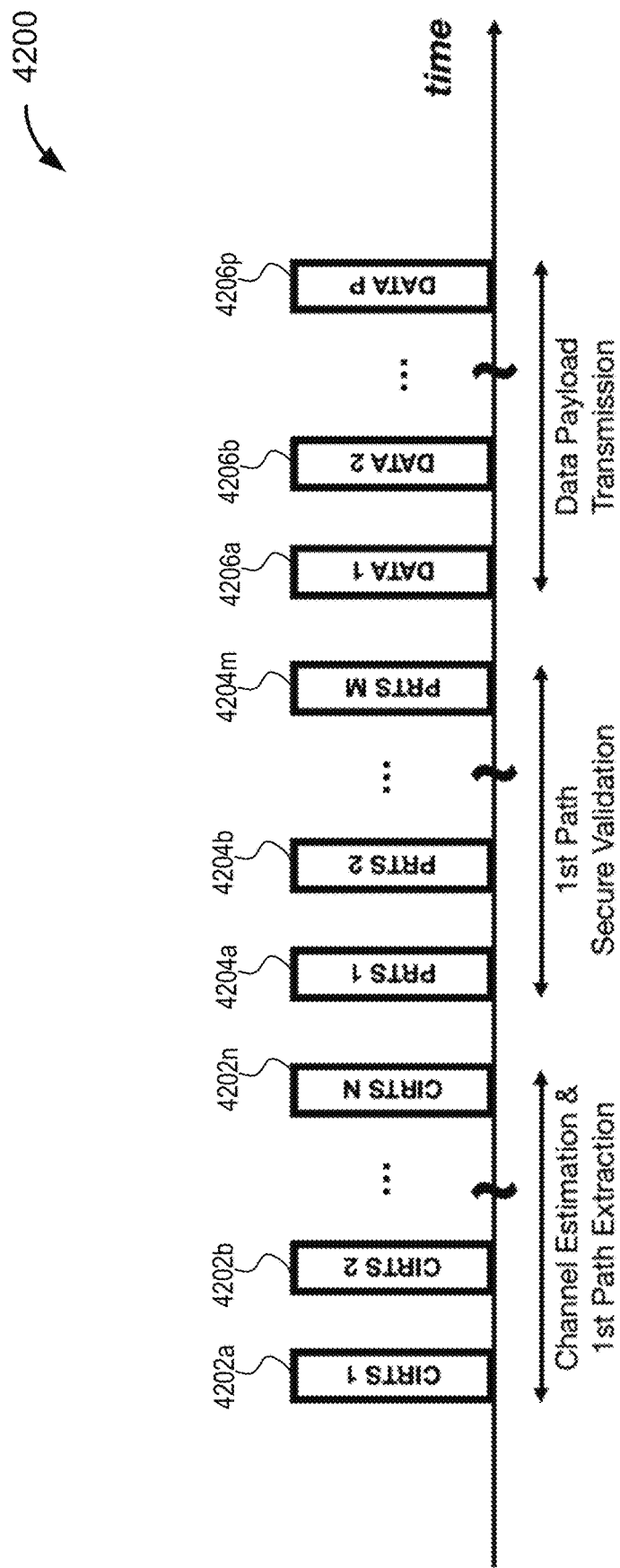
FIG. 42 is another simplified block diagram illustrating use of fragmented UWB signaling that involves a plurality of partitions of a UWB packet, according to some embodiments.

FIG. 42 is another simplified block diagram 4200 illustrating use fragmented UWB signaling that involves a plurality of partitions of a UWB packet, according to some embodiments. Diagram 4200 shows an exemplary embodiments of a fragmentized UWB packet with three partitions. In this example, there are N CIRTS fragments 4202a-n, followed by M PRTS fragments 4204a-m and P DATA fragments 4206a-p. Note that N, M, and P may be 1, 2, 3, or any other integer number; also note that N, M, P may differ between each other.

FIG. 43 is a simplified flow diagram illustrating use fragmented UWB signaling that involves a plurality of partitions of a UWB packet, according to some embodiments. In some embodiments, one or more of the operations of flow 4300 may be similar to as described in reference to FIGS. 40, 41, and/or 42.

At block 4302, a first device transmits a first packet via a narrowband signal to a second device. In some embodiments, the first packet may comprise information indicating to the second device a time period for reception of a second packet. In some embodiments, the information included within the first packet may correspond to any suitable information that may be used to convey synchronization data to the second device, as described herein. This may include, for example, information associated with (e.g., contained within) a sync field and/or a data payload field of the first packet. In some embodiments, the second device may thereby obtain synchronization data (e.g., for scheduling reception of the second packet) based on the information included within the first packet. In some embodiments, one or more operations of block 4302 may be similar to as described herein, for example, with respect to block 2206 of FIG. 22. In some embodiments, second packet may comprise a first partition and a second partition, the first partition comprising a first plurality of fragments and the second partition comprising a second plurality of fragments, whereby respective fragments of each plurality of fragments are transmitted via a UWB signal. In some embodiments, the first partition is associated with a CIR estimation and/or a first propagation path extraction, and the second partition is associated with a secure validation of the first propagation path extraction. However, embodiments, should not be construed to be so limited. For example, as illustrated with respect to FIG. 41, the second partition could be associated with a data payload type (e.g., containing video data or audio data). Accordingly, it should be understood that any suitable type of fragment of a plurality of fragment types (e.g., CIRTS fragments 4202a-n, Data fragments 4204a-m, or PRTS fragments 4206a-p) may be utilized to perform techniques herein.

In some embodiments, the second packet may comprise more than two partitions, as depicted in reference to FIG. 42 (e.g., partition being associated with a particular fragment type). In some embodiments, a fragment type may be associated with (e.g., correspond to) a particular sequence type, as described in reference to FIG. 21 and FIG. 40. For example, the first plurality of fragments (e.g., including CIRTS fragments 4202a-n) may be respectively associated with a periodic sequence type, while the second plurality of fragments (e.g., including PRTS fragments 4204a-m) may be respectively associated with a pseudo-random sequence type. In some embodiments, a first number of the first plurality of fragments may be the same or different from a second number of the second plurality of fragments (e.g., see FIG. 42, depicting N CIRTS fragments 4202a-n, M PRTS fragments 4204a-m, and P Data fragments 4206a-p). In some embodiments, the first packet may comprise a security parameter (e.g., one of a plurality of configurable ranging session parameters) that indicates a pseudo-random sequence secure key (and/or seed or key index or key index offset). In some embodiments, this key or a partial key may be shared between only the first device and the second device (e.g., a secret key), and the key information may be distributed between an a-priori reference key agreed between the first device and second device during connection setup, and a partial key (or seed or key index or key index offset) may be contained in the first packet.

At block 4304, the first device transmits the first plurality of packets to the second device via the UWB signal, the respective fragments of the first plurality of fragments being associated with a first fragment type (e.g., a CIRTS type for performing CIR estimation).

At block 4306, the first device transmits the second plurality of packets to the second device via the UWB signal, the respective fragments of the second plurality of fragments being associated with a second fragment type (e.g., a PRTS type). In some embodiments, the second device may authenticate the first propagation path extraction based at least in part on the second plurality of fragments, as described herein. In some embodiments, the second device may utilize the pseudo-random sequence secure key (e.g., transmitted to the second device as a session parameter, at block 4302) to perform the authentication.

Figure 44:
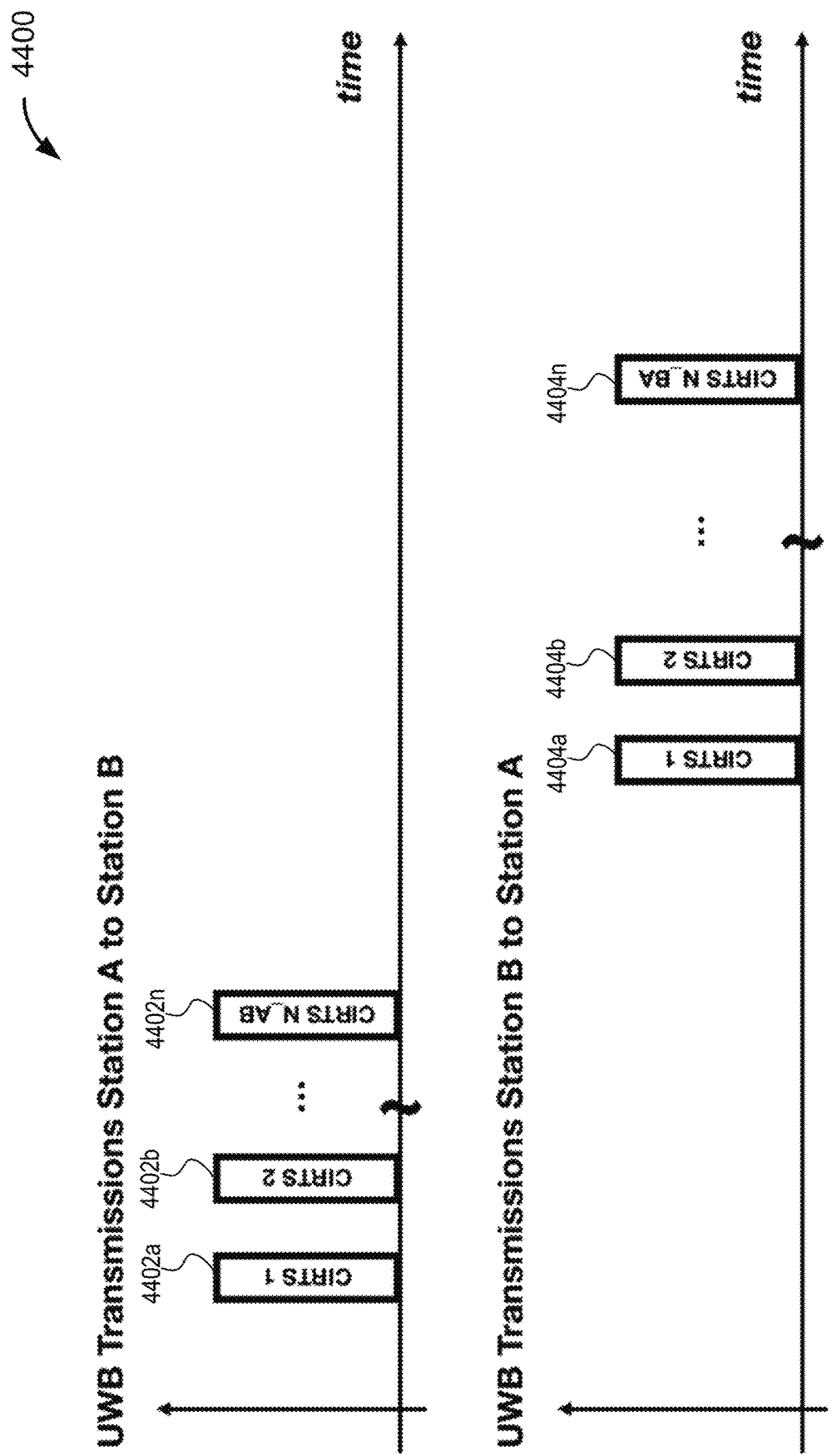
FIG. 44 is another simplified block diagram illustrating a technique whereby asymmetric numbers of fragments are transmitted between two directions of a link, according to some embodiments.

FIG. 44 is another simplified block diagram 4400 illustrating a technique whereby an asymmetric number of fragments are transmitted between two directions of a link, according to some embodiments. Diagram 4400 of FIG. 44 illustrates an embodiment where the number of fragments utilized for CIRTS purposes differs between the two directions of the link. Notably, the A-to-B direction uses N_AB fragments 4402a-n, while the B-to-A direction uses N_BA fragments 4404a-n, where N_AB and N_BA may be an identical integer such as 1, 2, 3, or higher, but may also differ. An asymmetric (unequal) choice for N_AB and N_BA may be beneficial in scenarios where one direction of the link is more heavily stressed due to greater antenna efficiency or radio frontend signal level losses at one of the associated devices, A or B. Using a greater number of fragments can then be used to compensate for the asymmetry in the strength (and operating) range of the link. In some embodiments, a symmetric (balanced) link in both directions is beneficial, as the weaker link tends to dominate the overall system performance in wireless systems requiring communications in both directions to extract all desired quantities.

Figure 45:
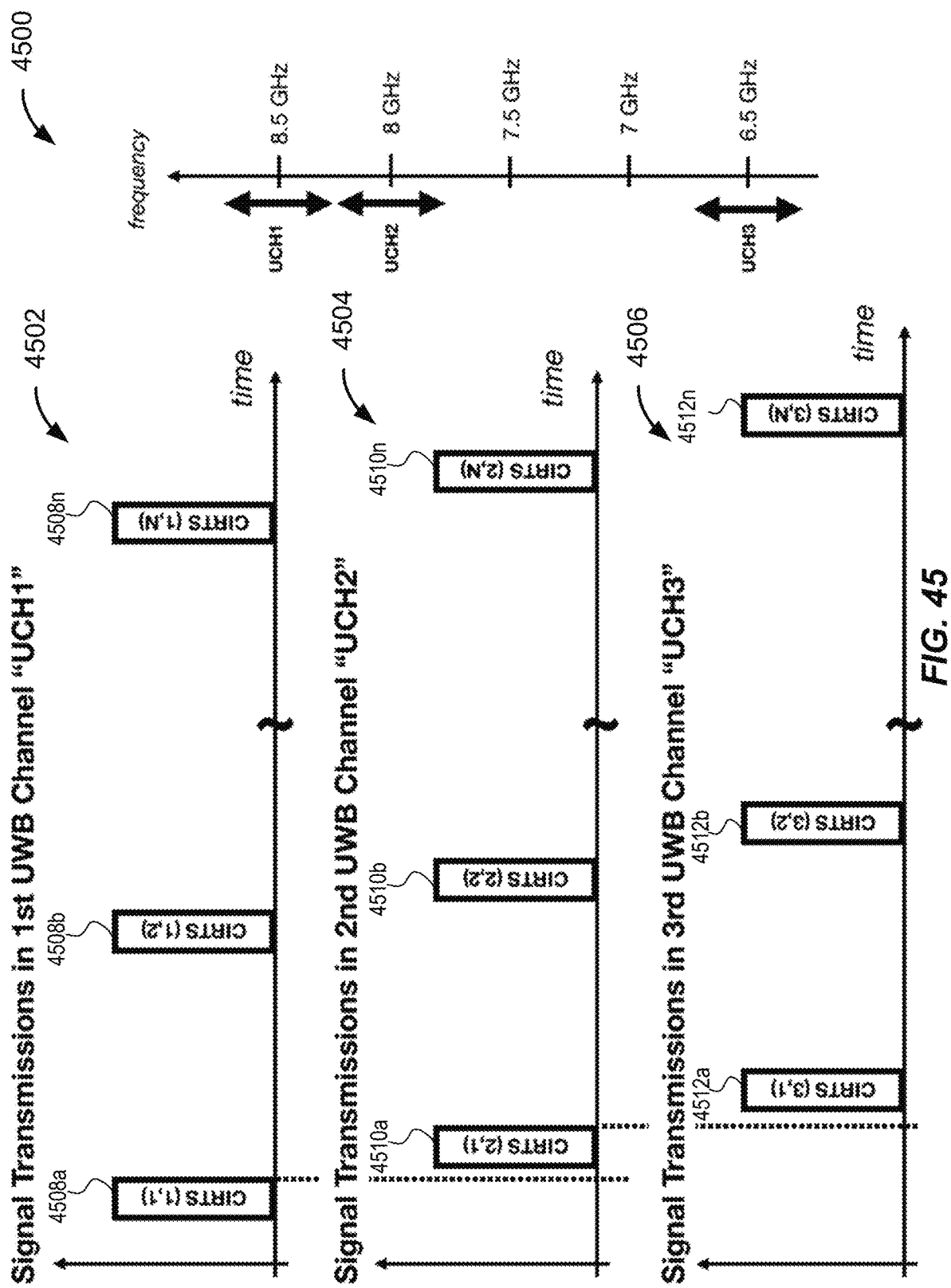
FIG. 45 is another simplified block diagram illustrating a technique whereby a plurality of UWB frequency channels may be used for fragmented transmissions, according to some embodiments.

FIG. 45 is another simplified block diagram 4500 illustrating a technique whereby a plurality of UWB frequency channels may be used for fragmented transmissions, according to some embodiments. Diagram 4500 of FIG. 45 depicts an embodiment where multiple UWB frequency channels may be beneficially used for fragmented transmissions. In some embodiments, UWB signaling according to international standardization may use a spectral bandwidth of approximately 500 MHz, and carrier frequencies (center frequencies) such as approximately 6.5 GHz (so-called UWB channel 5), 8 GHz (so-called UWB channel 9), or 8.5 GHz (UWB channel 10). In the illustration of FIG. 45, which may be interpreted as the UWB transmission from a station A to a station B as part of an NB-assisted fragmented UWB exchange, three UWB channels are used for a total of 3 times N fragments, of which N go out on each of the three channels. The three channels may be referred to as "UCH1" 4502, "UCH2" 4504, and "UCH3" 4506, where each of those labels could be associated with a physical spectrum. In the illustration, UCH1 4502 refers to the 500 MHz channel centered around 8.5 GHz, UCH2 4504 refers to 8 GHz, and UCH3 4506 refers to 6.5 GHz. The fragments being transmitted in UCH1 4502, depicted as CIRTS segments CIRTS (1,1), CIRTS(1,2), ... CIRTS(1,N) 4508a-n in the diagram, are spaced at least T_reg_test, in order to meet regulatory emissions requirements. Fragments CIRTS(2,1), CIRTS(2, 2), ... CIRTS(2,N) 4510a-n, which are transmitted on channel UCH2 4504, can occur within the same period, as each partition of the wireless spectrum is regulated by separate emission limits. That is, CIRTS(1,1) 4508a and CIRTS(2,1) 4510a, both representing the first fragments in their respective sequence of fragments in channel UCH1

4502 and UCH2 4504, respectively, can occur in very fast succession if desired. In some embodiments, they can occur at the same time. In some embodiments, a wireless transceiver may only be able to serve one channel at any given time. The same argument is true for the fragments being transmitted on UCH3 4506 (e.g., 4512*a-n*), which is governed by its own emission limits, and fragments on this channel may occur within the same test period T_reg_test as fragments transmitted on channels UCH1 4502 or UCH2 4504. Note that transmissions on multiple channels (e.g., as depicted in FIG. 45, with the example of 3 channels), may be beneficial for frequency diversity purposes. Due to real-life physical constraints of antenna hardware, radiation in certain directions at one frequency channel may be heavily attenuated due to antenna nulls, while the same direction may have strong support on another frequency channel. Furthermore, utilizing multiple channels can also be beneficial for effectively increasing the bandwidth of the wireless exchange, allowing for better accuracy of estimates such as the range (distance) between devices A and B. While the number of fragments in each channel N may be identical between channels, as is illustrated in FIG. 45, it may also differ, such as N1 fragments for UCH1 4502, N2 for UCH2 4504, and N3 for UCH3 4506. In some embodiments, the number of channels may be 2, 3 or any suitable number.

Figure 46:
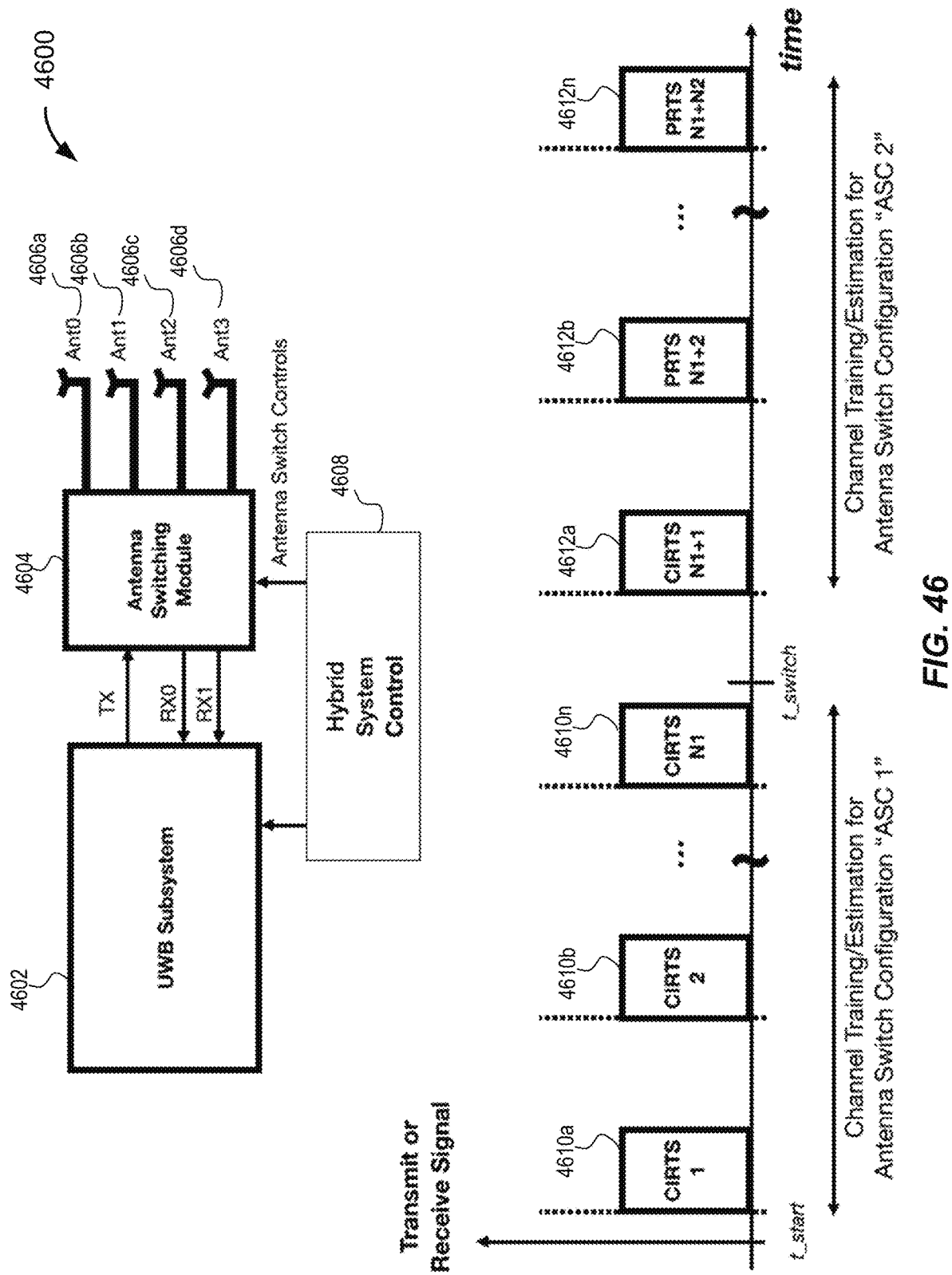
FIG. 46 is another simplified block diagram illustrating a technique for performing antenna switching to facilitate UWB fragmented transmissions, according to some embodiments.

FIG. 46 is another simplified block diagram 4600 illustrating a technique for performing antenna switching to facilitate UWB fragmented transmissions, according to some embodiments. The upper portion of diagram 4600 of FIG. 46 shows an embodiment where an Antenna Switching Module and control thereof during the fragmented transmissions may be beneficial. As depicted by the upper portion of diagram 4600, the UWB Subsystem 4602 has a single UWB transmit chain and two UWB receive chains, which are connected to the Antenna Switching Module 4604. The latter is also connected to a variety of antennas, four of them labeled Ant0 4606*a*, Ant1 4606*b*, Ant2 4606*c*, and Ant3 4606*d* in this example embodiment. In transmit operation, the Antenna Switching Module 4604 allows a selection, or assignment, of the single transmit chain of the UWB Subsystem 4602 with one of the antennas, as a function of the Antenna Switch Control signal from the Hybrid System Control block 4608. In receive operation, the Antenna Switching Module 4604 allows selection of two of the antennas 4606 for forwarding their signal to the UWB Subsystem's 4602 two receive chains. Note that any number of antennas 4606, 1,2,3,4, or more antennas 4606, can be beneficial, and the UWB subsystem 4602 can provision 1 or more transmit chains as well as 1,2, or more receive chains. The purpose of the Antenna Switching Module 4604 is then to select the antennas 4606 used for actual transmit and receive operation. Antenna switching may be beneficial to enable antenna diversity, which, in similarity to Channel/Frequency Diversity, may help overcome antenna nulls or multi-path fading effects. It can also be beneficial for Angle-of-Departure and Angle-of-Arrival estimation techniques. In one embodiment of the invention, antenna switching techniques may be used in conjunction with fragmented UWB transmissions as part of a Hybrid NB/UWB wireless system. This is illustrated by means of the lower part of FIG. 46. The embodiment in the lower part of FIG. 46 uses N1+N2 CIRTS fragments (e.g., 4610*a-n* and 4612*a-n*). Two Antenna Switch Configurations are used, ASC1 and ASC2 during the first N1 and second N2 fragments, respectively. For transmit operation, ASC1 and ASC2 may each refer to a choice of one of the 4 antenna elements for transmission, Ant0/1/2/3 4606*a-d*. For example, ASC1 may refer to Ant0 4606*a*, and ASC2 may refer to Ant3 4606*d*. For receive operation, ASC1 and ASC2 may represent a choice of 2 of the 4 available antennas, such as (Ant0 4606*a*, Ant2 4606*c*) and (Ant0 4606*a*, Ant1 4606*b*), respectively. During the time period between a start time, t_start, and a switch time, t_switch, antenna configuration ASC1 is used, while after time t_switch, the antenna configuration is changed to ASC2. Note that any number of switch configuration intervals is possible, not only two intervals targeting ASC1 and ASC2, but more intervals to provide for more antenna configurations, ASC1, ASC2, ASC3, etc. Also note that in the exemplary embodiment shown in the lower portion of FIG. 46, the fragments represent CIRTS sequences, while in other embodiments other fragment types such as PRTS or DATA may be used, and different antenna switching intervals may use different fragments types. For instance, during interval t_start to t_switch, CIRTS fragments may be used, while between t_switch and the end of the transmission, DATA fragments may be used.

Figure 47:
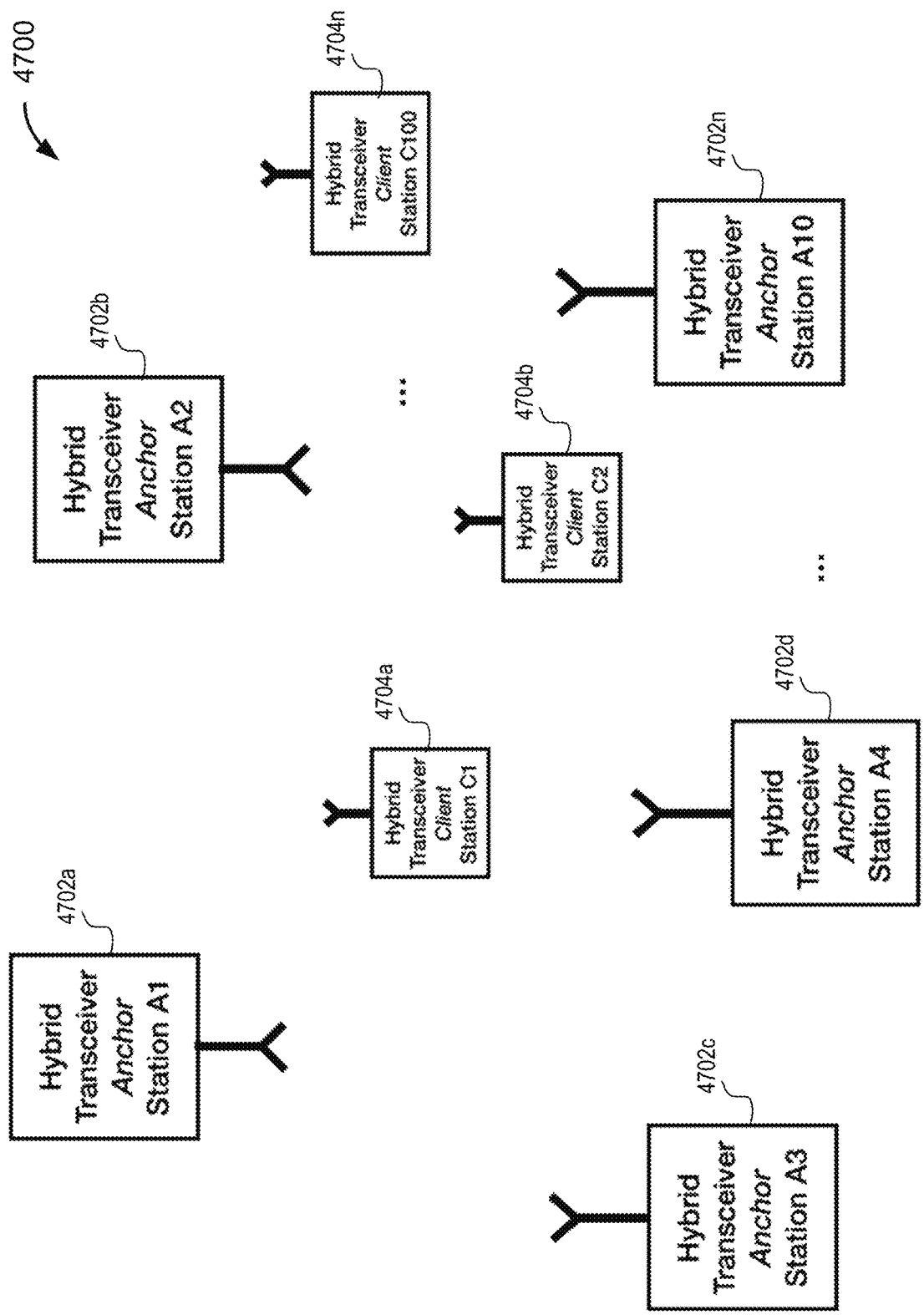
FIG. 47 is a simplified block diagram illustrating a technique for operating a hybrid (UWB/NB) system within an environment that includes anchor stations and client stations, according to some embodiments.

FIG. 47 is a simplified block diagram 4700 illustrating a technique for operating a hybrid (UWB/NB) system within an environment that includes anchor stations and client stations, according to some embodiments. Diagram 4700 of FIG. 47 illustrates an embodiment of the Hybrid System in a multitude of stations in two device classes—Anchor stations and Client stations. In some embodiments, Anchor Stations, A1, A2, . . . A10 4702*a-n* represent Hybrid System capable devices that may be stationary devices, possibly mounted on the wall or ceiling and with a connection to a permanent power supply such as a conventional 110V or 220V main system. In some embodiments, Client Stations, C1, C2, . . . to C100 4704*a-n* could be mobile, battery-operated devices, such as mobile phones or wrist-worn smart watches. The Anchor stations 4702*a-n*, which may be installed in a home, shopping mall, or warehouse, may provide a positioning service to the Client stations 4704*a-n*, possibly in indoor or in outdoor local areas. In such an infrastructure type embodiment of the invention, Anchor stations 4702*a-n* may transmit hybrid signals consisting of NB and fragmented UWB packets according to the present invention in a synchronized fashion at certain time instances offset from one another. This allows Client stations 4704*a-n* in listening-only mode to use the NB signal to assist efficient reception of the fragmented UWB transmission, and to use trilateration techniques to determine their own position in the local geography, assuming the locations of the Anchor stations 4702*a-n* are known. Alternatively, Anchor stations 4702*a-n* may actively and bi-directionally communicate between each other in a peer-to-peer or peer-to-multi-peer fashion, again using NB assisted fragmented UWB signaling; in this case, Client stations 4704*a-n* may listen into these Anchor-to-Anchor communications and, based on that, deduce their respective location.

Figure 48:
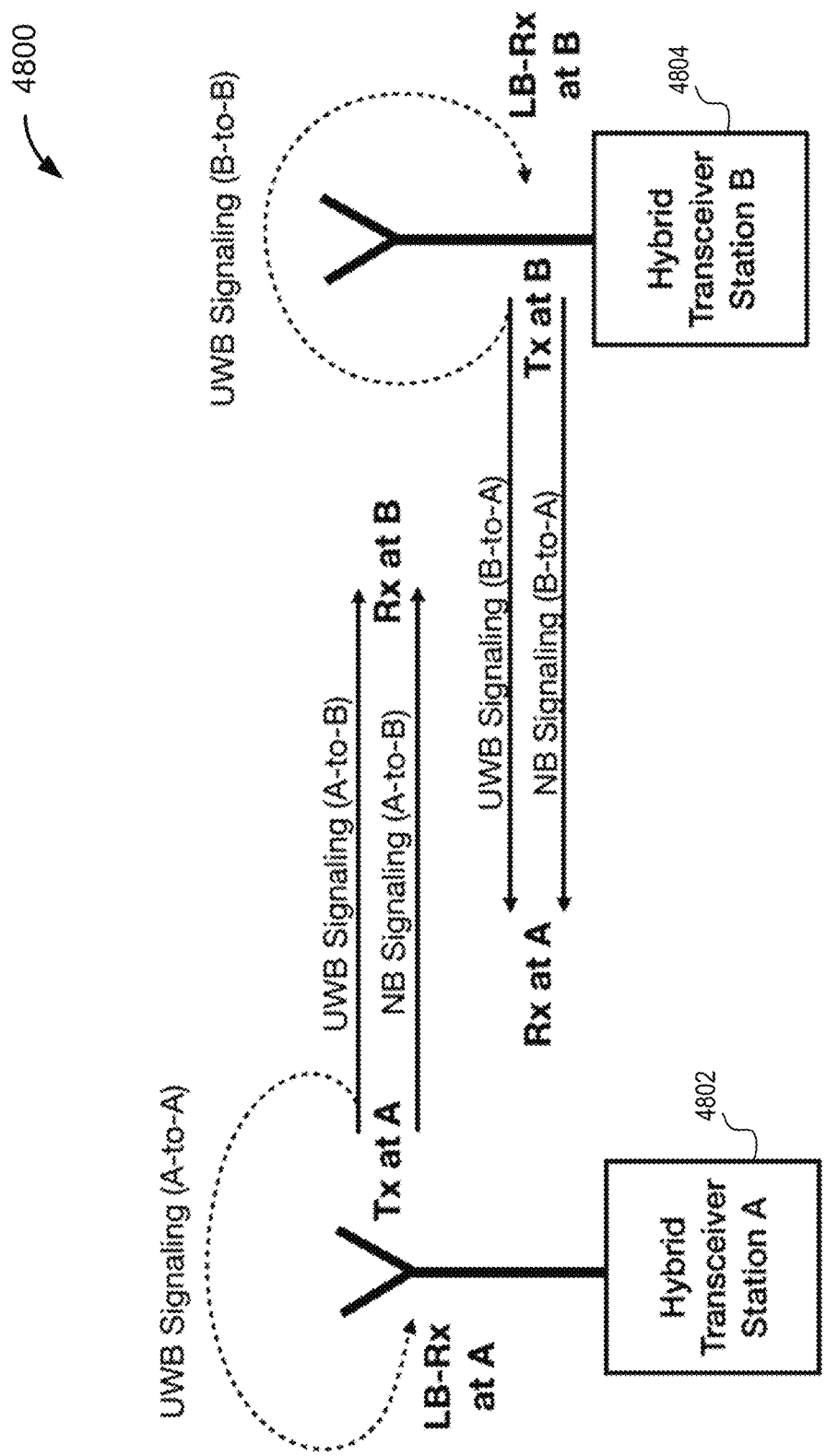
FIG. 48 is another simplified block diagram illustrating a technique for performing environmental sensing via UWB fragmented transmissions, according to some embodiments.

FIG. 48 is another simplified block diagram 4800 illustrating a technique for performing environmental sensing via UWB fragmented transmissions, according to some embodiments. Diagram 4800 of FIG. 48 illustrates use of hybrid NB/UWB signaling for Environmental Sensing (Depth Sensing and Mapping, DSM) techniques. In this embodiment, station A 4802 and station B 4804 perform exchanges of NB and UWB to determine the effective CIR and range (distance), as described herein. Additionally, while transmitting the UWB fragments, in particular, for the case of a sequence of CIRTS fragments, each station (station A 4802 and station B 4804) also receives and correlates for Channel Estimation purposes its own transmission. The CIRs obtained from the A-to-B and B-to-A signaling may be used for "Multi-static Radar" DSM, while the CIRs obtained from A-to-A and B-to-B "loopback" (LB) operation may be used for "mono-static Radar" DSM. The CIRs from the mono-static and multi-static measurements, the latter possibly being derived from communication between a multitude of stations, A, B, C, . . . may subsequently be interpreted to detect presence, movement, or other environmental parameters or events.

Illustrative techniques for transmitting a hybrid of NB and UWB wireless signals are described above. Some or all of these systems and methods may, but need not, be implemented at least partially by architectures such as those shown at least in one or more of FIGS. 1-48 above. It should be understood any suitable device may perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

While there may be many embodiments of the concepts presented herein, one beneficial choice of NB and UWB embodiments may place the Radio Frequency (RF) operating frequencies for the UWB and NB signals close to one another. For instance, a suitable frequency range for NB signaling may be the Unlicensed National Information Infrastructure (UNII) bands in the 5 and 6 GHz range, including the UNII-3 band from 5.725 GHz to 5.850 GHz or the UNII-5 band from 5.925 GHz to 6.425 GHz. These bands tend to allow NB transmission at power levels of up to 10 dBm or 20 dBm or more. For the UWB subsystem, a typical RF operating frequency would be so-called UWB channels 5 and 9 at center frequencies of roughly 6.5 GHz and 8.0 GHz, respectively. The benefit of using NB and UWB frequencies in the vicinity of each other is an easier sharing of antenna hardware between NB and UWB. Note, however, that another suitable operating range for the NB subsystem is in the 2.4 to 2.5 GHz ISM band (often used for ZigBee and Bluetooth and other consumer wireless systems), and a variety of UWB center frequencies from 1 GHz to 10 GHz and beyond 10 GHz can be utilized for the hybrid system concept.

In regards to hardware implementations of the hybrid system concept, it should be noted that the NB and UWB sub-systems can reside on the same System on Chip (SOC), which may also be referred to as an Integrated Circuit (e.g., including suitable processor circuitry). They may also be embodied as separate SOCs, an NB SOC and a UWB SOC, wherein the tight coupling and joint MAC control processing are accomplished through direct control signals exchanged between the two SOCs.

Other preferred and non-limiting embodiments or aspects will be set forth in the following numbered clauses:

Clause 1: A computer-implemented method, comprising: transmitting, by a first device, a first packet via a narrowband (NB) signal to a second device, the first packet comprising information indicating to the second device a time period for reception of a second packet, the second packet comprising a first partition and a second partition, the first partition comprising a first plurality of fragments and the second partition comprising a second plurality of fragments, and respective fragments of each plurality of fragments being transmitted via an ultra-wideband (UWB) signal; transmitting, by the first device, the first plurality of fragments to the second device via the ultra-wideband signal, the respective fragments of the first plurality of fragments being associated with a first fragment type; and transmitting, by the first device, the second plurality of fragments to the second device via the ultra-wideband signal, the respective fragments of the second plurality of fragments being associated with a second fragment type.

Clause 2: The computer-implemented method of clause 1, wherein the first partition is associated with a Channel Impulse Response (CIR) estimation and a first propagation path extraction, and the second partition is associated with a secure validation of the first propagation path extraction.

Clause 3: The computer-implemented method of any of clauses 1-2, wherein the first fragment type of the first plurality of fragments corresponds to a periodic sequence, and wherein the second fragment type corresponds to a pseudo-random sequence.

Clause 4: The computer-implemented method of any of clauses 1-3, wherein a first number of the first plurality of fragments and a second number of the second plurality of fragments is a different number.

Clause 5: The computer-implemented method of any of clauses 1-4, wherein the second device authenticates the first propagation path extraction based at least in part on the second plurality of fragments.

Clause 6: The computer-implemented method of any of clauses 1-5, wherein the first packet comprises a security parameter that indicates a pseudo-random sequence secure key that is shared between only the first device and the second device, and wherein the second device authenticates the first propagation path extraction based at least in part on the security parameter.

Clause 7: The computer-implemented method of any of clauses 1-6, wherein the second packet is associated with a first ranging round, and wherein second packet is one of a sequence of packets that are respectively partitioned to include a first partition and a second partition.

Clause 8: The computer-implemented method of any of clauses 1-6, wherein the second packet further partitioned to include a third plurality of fragments that is collectively associated with a data payload.

Clause 9: The computer-implemented method of any of clauses 1-8, wherein the data payload comprises audio data or video data.

Clause 10: The computer-implemented method of any of clauses 1-9, wherein the first partition is associated with a Channel Impulse Response (CIR) estimation and the second partition is associated a data payload.

Other embodiments of the disclosure may be directed to an apparatus, comprising: a memory comprising computer-executable instructions; and one or more processors in communication with the memory and configured to access the memory and execute the computer-executable instructions to perform the method of any of clauses 1-10.

Other embodiments of the disclosure may be directed to one or more computer-readable storage mediums comprising computer-executable instructions that, when executed by one or more processors, cause the one or more processors to perform the method of any of clauses 1-10.

Other embodiments of the disclosure may be directed to a device comprising: processor circuitry configured to perform the method of any of clauses 1-10.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known for carrying out the disclosure. Variations of those preferred embodiments may become apparent to those of ordinary skill in the art upon reading the foregoing description. Skilled artisans would be expected to employ such variations as appropriate, and it is intended for the techniques to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data to wirelessly transmit a secure frame for authentication. The present disclosure contemplates that in some instances, this gathered data may include personally identifiable information (PII) data that uniquely identifies or can be used to contact or locate a specific person. Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the personal information data can be used to obtain access to a resource that is control by an access control system.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to tracking a user's location (e.g., via the user's mobile device), the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:
   transmitting, by a first device, a first packet via a narrowband (NB) signal to a second device, the first packet comprising information indicating to the second device a time period for reception of a second packet, the second packet comprising a first partition and a second partition, the first partition comprising a first plurality of fragments and the second partition comprising a second plurality of fragments, and respective fragments of each of the first and second plurality of fragments being transmitted via an ultra-wideband signal;
   transmitting, by the first device, the first plurality of fragments to the second device via the ultra-wideband signal, the respective fragments of the first plurality of fragments being associated with a first fragment type; and
   transmitting, by the first device, the second plurality of fragments to the second device via the ultra-wideband signal, the respective fragments of the second plurality of fragments being associated with a second fragment type.

2. The computer-implemented method of claim 1, wherein the first partition is associated with a Channel Impulse Response (CTR) estimation and a first propagation path extraction, and the second partition is associated with a secure validation of the first propagation path extraction.

3. The computer-implemented method of claim 1, wherein the first fragment type of the first plurality of fragments corresponds to a periodic sequence, and wherein the second fragment type corresponds to a pseudo-random sequence.

4. The computer-implemented method of claim 1, wherein a first number of the first plurality of fragments and a second number of the second plurality of fragments is a different number.

5. The computer-implemented method of claim 1, wherein the second device authenticates a first propagation path extraction based at least in part on the second plurality of fragments.

6. The computer-implemented method of claim 1, wherein the first packet comprises a security parameter that indicates a pseudo-random sequence secure key that is shared between only the first device and the second device, and wherein the second device authenticates a first propagation path extraction based at least in part on the security parameter.

7. The computer-implemented method of claim 1, wherein the second packet is associated with a first ranging round, and wherein second packet is one of a sequence of packets that are respectively partitioned to include multiple partitions.

8. The computer-implemented method of claim 7, wherein the second packet is further partitioned to include a third plurality of fragments that is collectively associated with a data payload.

9. A first device, comprising:
   a memory configured to store computer-executable instructions; and
   one or more processors in communication with the memory and configured to access the memory and execute the computer-executable instructions to, at least:
   transmit a first packet via a narrowband (NB) signal to a second device, the first packet comprising information indicating to the second device a time period for reception of a second packet, the second packet comprising a first partition and a second partition, the first partition comprising a first plurality of fragments and the second partition comprising a second plurality of fragments, and respective fragments of each of the first and second plurality of fragments being transmitted via an ultra-wideband signal;
   transmit the first plurality of fragments to the second device via the ultra-wideband signal, the respective fragments of the first plurality of fragments being associated with a first fragment type; and
   transmit the second plurality of fragments to the second device via the ultra-wideband signal, the respective fragments of the second plurality of fragments being associated with a second fragment type.

10. The first device of claim 9, wherein the first partition is associated with a Channel Impulse Response (CIR) estimation and a first propagation path extraction, and the second partition is associated with a secure validation of the first propagation path extraction.

11. The first device of claim 9, wherein the first fragment type of the first plurality of fragments corresponds to a periodic sequence, and wherein the second fragment type corresponds to a pseudo-random sequence.

12. The first device of claim 9, wherein the second packet is associated with a first ranging round, and wherein second packet is one of a sequence of packets that are respectively partitioned to include multiple partitions.

13. The first device of claim 12, wherein the second packet is further partitioned to include a third plurality of fragments that is collectively associated with a data payload.

14. The first device of claim 13, wherein the data payload comprises audio data or video data.

15. The first device of claim 9, wherein the first partition is associated with a Channel Impulse Response (CIR) estimation and the second partition is associated a data payload.

16. One or more non-transitory computer-readable storage media comprising computer-executable instructions that, when executed by one or more processors of a first device, cause the one or more processors to perform operations comprising:
   transmitting a first packet via a narrowband (NB) signal to a second device, the first packet comprising information indicating to the second device a time period for reception of a second packet, the second packet comprising a first partition and a second partition, the first partition comprising a first plurality of fragments and the second partition comprising a second plurality of fragments, and respective fragments of each of the first and second plurality of fragments being transmitted via an ultra-wideband signal;
   transmitting the first plurality of fragments to the second device via the ultra-wideband signal, the respective fragments of the first plurality of fragments being associated with a first fragment type; and
   transmitting the second plurality of fragments to the second device via the ultra-wideband signal, the respective fragments of the second plurality of fragments being associated with a second fragment type.

17. The one or more non-transitory computer-readable storage media of claim 16, wherein the first partition is associated with a Channel Impulse Response (CIR) estimation and a first propagation path extraction, and the second partition is associated with a secure validation of the first propagation path extraction.

18. The one or more non-transitory computer-readable storage media of claim 16, wherein the fragment type of the first plurality of fragments corresponds to a periodic sequence, and wherein the second fragment type corresponds to a pseudo-random sequence.

19. The one or more non-transitory computer-readable storage media of claim 16, wherein the first packet comprises a security parameter that indicates a pseudo-random sequence secure key that is shared between only the first device and the second device, and wherein the second device authenticates a first propagation path extraction based at least in part on the security parameter.

20. The one or more non-transitory computer-readable storage media of claim 16, wherein the second packet further partitioned to include a third plurality of fragments that is collectively associated with a data payload.

* * * * *

UNITED STATES PATENT AND TRADEMARK OFFICE
CERTIFICATE OF CORRECTION

PATENT NO. : 12,015,916 B2
APPLICATION NO. : 17/453165
DATED : June 18, 2024
INVENTOR(S) : Joachim S. Hammerschmidt, Santhoshkumar Mani and Eren Sasoglu It is certified that error appears in the above-identified patent and that said Letters Patent is hereby corrected as shown below:

In the Claims

Column 47, Claim 1, Line 12: After the word ultra-wideband insert --(UWB)--.

Column 47, Claim 1, Line 14: After the word ultra-wideband insert --(UWB)--.

Column 47, Claim 1, Line 19: After the word ultra-wideband insert --(UWB)--.

Column 48, Claim 9, Line 6: After the word ultra-wideband insert --(UWB)--.

Column 48, Claim 9, Line 8: After the word ultra-wideband insert --(UWB)--.

Column 48, Claim 9, Line 12: After the word ultra-wideband insert --(UWB)--.

Column 48, Claim 16, Line 50: After the word ultra-wideband insert --(UWB)--.

Column 48, Claim 16, Line 52: After the word ultra-wideband insert --(UWB)--.

Column 48, Claim 16, Line 56: After the word ultra-wideband insert --(UWB)--.

Signed and Sealed this
Thirtieth Day of July, 2024

Katherine Kelly Vidal
*Director of the United States Patent and Trademark Office*